(12) United States Patent
Tytgat

(10) Patent No.: US 10,565,773 B1
(45) Date of Patent: Feb. 18, 2020

(54) EFFICIENT LIGHT FIELD VIDEO STREAMING

(71) Applicant: Nokia Technologies Oy, Espoo (FI)

(72) Inventor: Donny Tytgat, Oosterzele (BE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/401,816

(22) Filed: May 2, 2019

Related U.S. Application Data

(63) Continuation-in-part of application No. 16/248,399, filed on Jan. 15, 2019.

(51) Int. Cl.
| | |
|---|---|
| *G06T 15/00* | (2011.01) |
| *G06T 15/20* | (2011.01) |
| *H04N 13/279* | (2018.01) |
| *H04N 13/254* | (2018.01) |
| *H04N 13/25* | (2018.01) |

(52) U.S. Cl.
CPC ............ *G06T 15/005* (2013.01); *G06T 15/20* (2013.01); *H04N 13/25* (2018.05); *H04N 13/254* (2018.05); *H04N 13/279* (2018.05)

(58) Field of Classification Search
None
See application file for complete search history.

(56) References Cited

U.S. PATENT DOCUMENTS 6,097,394 A * 8/2000 Levoy ................ G02B 27/2271
345/419

2004/0114807 A1 * 6/2004 Lelescu ..................... G06T 9/00
382/229
2004/0222989 A1 * 11/2004 Zhang ................... G06T 15/205
345/426

(Continued)

FOREIGN PATENT DOCUMENTS

WO     WO 2014/094874 A1     6/2014

OTHER PUBLICATIONS

Chen, B., Novel Methods for Manipulating and Combining Light Fields, Sep. 2006, A Dissertation Submitted to The Department of Computer Sciece and the Committee on Graduate Studies of Standford University, pp. 1-139. (Year: 2006).*

(Continued)

*Primary Examiner* — Said Broome
(74) *Attorney, Agent, or Firm* — Alston & Bird LLP

(57) ABSTRACT

Methods, devices, and computer program products are provided for rendering selective light field representations for new images of a scene by extending the plenoptic function range to include a null radiance term such that rays characterized by the extended plenoptic function $L(x, y, z, \theta, \phi)$ may return the null radiance term to denote that an instantiator should use a non-light field model or rendering engine to generate an appropriate replacement for that ray. Multiple viewers can be grouped based upon viewer behavior and/or virtual viewpoint within the scene. Round-trip time for sending/receiving communications between a server or processor and one or more user devices, as well as viewer behavior, can be used to predict for which light rays the corresponding light field data needs to be transmitted based on a probability that the light ray will be called upon during near-future rendering for a user.

20 Claims, 18 Drawing Sheets

(56) References Cited

U.S. PATENT DOCUMENTS

| | | |
|---|---|---|
| 2012/0069023 A1* | 3/2012 | Hur .................. G06T 15/06 345/426 |
| 2014/0092281 A1 | 4/2014 | Nisenzon et al. |
| 2015/0319423 A1 | 11/2015 | Kim et al. |
| 2016/0307372 A1 | 10/2016 | Pitts |
| 2018/0096494 A1 | 4/2018 | Zhou |
| 2018/0096527 A1 | 4/2018 | Eraker et al. |

OTHER PUBLICATIONS

Ackerman, M, et al., *Weighted Clustering*, [online] [retrieved May 30, 2019] Retrieved from the Internet: <URL: http://mayacckerman.info/pub/weightedClustering.pdf>. (Sep. 2011) 9 pages.

Chen, B., *Novel Methods for Manipulating and Combining Light Fields*, Dissertation—Stanford University (Sep. 2006) 121 pages.

Kim, C., *3D Reconstruction and Rendering From High Resolution Light Fields*, Thesis—Doctor of Science of ETH Zurich (2015) 128 pages.

Tambe, S. et al., *Towards Motion-Aware Light Field Video for Dynamic Scenes*, Computer Vision Foundation ICCV2013 (2013) 1009-1016.

Qian, F. et al., *Optimizing 360 Video Delivery Over Cellular Networks*, AllThingsCellular'16 (Oct. 2016) 1-6.

Xiao, M. et al., *MiniView Layout for Bandwidth-Efficient 360-Degree Video*, MM'18, Session: FF-4, Seoul, Republic of Korea (Oct. 2018) 914-922.

Office Action for U.S. Appl. No. 16/248,399 dated Aug. 22, 2019.

Office Action for U.S. Appl. No. 16/248,399 dated Sep. 30, 2019.

\* cited by examiner

20

```
┌──────────────────────────────────────────────────────────────────────────┐
│ Receiving light field data for a plurality of rays from the scene, each of│ ── 21
│ the plurality of rays being characterized using an extended plenoptic     │
│ function comprising position, direction, and radiance information about   │
│ the plurality of rays.                                                    │
└──────────────────────────────────────────────────────────────────────────┘
                                      │
                                      ▼
┌──────────────────────────────────────────────────────────────────────────┐
│ Determining whether interpolation of one or more rays from among the      │ ── 22
│ plurality of rays is expected to sufficiently improve a visual quality of │
│ the image of the scene.                                                   │
└──────────────────────────────────────────────────────────────────────────┘
                                      │
                                      ▼
┌──────────────────────────────────────────────────────────────────────────┐
│ In an instance in which the one or more rays return a radiance value,     │ ── 23
│ interpolating the one or more rays and generating, using a first renderer,│
│ a light field representation of the one or more rays for the new image of │
│ the scene from the interpolated light field data.                         │
└──────────────────────────────────────────────────────────────────────────┘
                                      │
                                      ▼
┌──────────────────────────────────────────────────────────────────────────┐
│ In an instance in which the one or more rays return a null radiance value,│ ── 24
│ calculating a radiance for the one or more rays using a second renderer   │
│ and generating an alternative representation of the one or more rays.     │
└──────────────────────────────────────────────────────────────────────────┘
```

FIG. 5

EFFICIENT LIGHT FIELD VIDEO STREAMING

CROSS-REFERENCE TO RELATED APPLICATIONS

This application is a continuation-in-part of, and claims priority to and the benefit of, U.S. patent application Ser. No. 16/248,399, filed Jan. 15, 2019, entitled "Automated Selective Light Field Generation," the disclosure of which is hereby incorporated by reference in its entirety.

TECHNICAL FIELD

An example embodiment relates generally to a method, apparatus, and computer program product for video streaming using light field data, and more particularly, for selective representation of portions of a scene using light fields to improve the light field calculation and image rendering by reducing the time and computational intensity of characterizing light rays for each portion of the rendered image.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of functionality that only a few years ago required processing power that could be provided only by the most advanced desktop computers. Consequently, mobile computing devices having a small form factor have become ubiquitous and are used to access network applications and services.

In addition, display devices, such as projectors, monitors, or augmented reality glasses, may provide an enhanced view by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

When generating visual representations of virtual or augmented scenes for viewing by a user, a characterization of light throughout the scene can be generated using images or video stitched together, e.g., within a spherical virtual or augmented reality environment, or by characterizing light field data for each light ray in each applicable direction at each position within the representation. Image or video stitching techniques typically result in relatively low quality representations of light effects within an image or video. Alternatively, light field representation can include computationally intensive and time-consuming characterization of every light ray at every point in the representation. Despite the computationally intensive matching of every ray at every point and despite alternatively using a high sampling rate for interpolative approaches, some points representing occluded objects, for instance, return insufficient characterization data to render the ray and image quality suffers. Additionally, the bandwidth required to transmit light field representations of a scene, e.g., to/from a remote server, to a user device, to a display, etc., can be significantly higher than required to transmit a stitched image or video representation, e.g., 360 video, 3D video, etc., of the same scene. On the other hand, present techniques for mixing light field data of, e.g., different objects or different sources into one image or video are very complex. Thus, there is a long-felt need in the industry for a method, apparatus, and computer program product for generating visual representations having improved image quality according to a less computationally intensive approach.

SUMMARY

Methods, devices, and computer program products are provided for rendering selective light field representations for new images of a scene by extending the plenoptic function range to include a null radiance term such that rays characterized by the extended plenoptic function $L(x, y, z, \theta, \phi)$ may return the null radiance term to denote that an instantiator should use a non-light field model or rendering engine to generate an appropriate replacement for that ray. Multiple viewers can be grouped based upon viewer behavior and/or virtual viewpoint within the scene. Round-trip time (i.e., latency) for sending/receiving communications between a server-side device such as a processor and one or more client-side devices such as a virtual reality headset, as well as viewer behavior, can be used to predict for which light rays the corresponding light field data needs to be transmitted based on a probability that the light ray will be called upon during near-future rendering for a user.

An apparatus of an example embodiment can be configured for selectively transmitting light field data for rendering of a new image of a scene. In some embodiments, the apparatus can comprise at least one processor and at least one memory including computer program instructions. In some embodiments, the at least one memory and the computer program instructions, with the at least one processor, can be configured to cause the apparatus at least to receive light field data from a light field data source, said light field data comprising a plurality of light rays, each light ray of the plurality of light rays defined by a plenoptic function comprising positional terms $(x, y, z)$ and directional terms $(\theta, \phi)$ related to a scene. In some embodiments, the at least one memory and the computer program instructions, with the at least one processor, can be configured to cause the apparatus at least to receive round trip time information related to communication between said apparatus and said user device associated with a user. In some embodiments, the at least one memory and the computer program instructions, with the at least one processor, can be configured to cause the apparatus at least to receive from said user device field of view information related to a particular field of view of said scene. In some embodiments, the at least one memory and the computer program instructions, with the at least one processor, can be configured to cause the apparatus at least to determine, based upon at least said round trip time information and said field of view information, a part of said plurality of light rays pertaining to a region of said scene which is determined to be viewable by said user with a predetermined probability within a predetermined time. In some embodiments, the at least one memory and the computer program instructions, with the at least one processor, can be configured to cause the apparatus at least to transmit data related to said part of light rays to said user device. In some embodiments, the at least one memory and the computer program instructions, with the at least one processor, can be configured to cause the apparatus at least to transmit a null ray term for each light ray of a remaining part of said plurality of light rays not belonging to said part as a null ray together with an alternative representation of a remaining portion of said scene not pertaining to said region to said user device. In some embodiments, the at least one memory and the computer program instructions, with the at least one processor, can be are further configured to cause the apparatus at least to receive other round trip time information related to communication between said apparatus and one or more other user devices associated with one or more other users. In some embodiments, the at least one memory and the computer program instructions, with the at least one processor, can be configured to cause the apparatus at least to receive from said one or more other user devices other field of view information related to one or more other particular fields of view of said scene. In some embodiments, the at least one memory and the computer program instructions, with the at least one processor, can be configured to cause the apparatus at least to determine, based upon at least said round trip information, said field of view information, said other round trip information, and said other field of view information, the part of said plurality of light rays pertaining to said region which is determined to be viewable by said user and said one or more other users with the predetermined probability within the predetermined time. In some embodiments, the at least one memory and the computer program instructions, with the at least one processor, can be configured to cause the apparatus at least to transmit data related to said part of light rays to said user device and said one or more other user devices. In some embodiments, the at least one memory and the computer program instructions, with the at least one processor, can be configured to cause the apparatus at least to transmit data related to light rays of the remaining part of said plurality of light rays not belonging to said part as the null ray together with the alternative representation of the remaining portion of said scene not pertaining to said region to said user device and said one or more other user devices. In some embodiments, the at least one memory and the computer program instructions, with the at least one processor, can be configured to cause the apparatus at least to group said user and said one or more other users into one or more user groups based upon at least one of a user behavior and a field of view difference. In some embodiments, the user behavior can be a rate of change of the particular field of view. In some embodiments, grouping said user and said one or more other users can comprise grouping said user and said one or more other users into a first group of users having a rate of change of the particular field of view below a predetermined threshold and a second group of users having a rate of change of the particular field of view above the predetermined threshold. In some embodiments, grouping the user and the one or more other users can comprise grouping the user and the one or more other users into a first group of users having a virtual viewpoint within a predetermined distance of a first location within the scene and a second group of users having the virtual viewpoint within a predetermined distance of a second location within the scene. In some embodiments, the at least one memory and the computer program instructions, with the at least one processor, are further configured to cause the apparatus at least to determine an error rate for each particular field of view within a particular group of the one or more groups of users. In some embodiments, the at least one memory and the computer program instructions, with the at least one processor, can be configured to cause the apparatus at least to apply a weight function to transform the error rate into a weight value associated with each particular field of view in the particular group of users. In some embodiments, the at least one memory and the computer program instructions, with the at least one processor, can be configured to cause the apparatus at least to group the users from the particular group of users in one or more clusters based upon a maximum distance between the virtual viewpoints of the users. In some embodiments, the at least one memory and the computer program instructions, with the at least one processor, can be configured to cause the apparatus at least to output cluster centers associated with the one or more clusters. In some embodiments, the at least one memory and the computer program instructions, with the at least one processor, can be configured to cause the apparatus at least to determine one or more parameters for a viewpoint location and a viewpoint orientation of the virtual viewpoints of the users. In some embodiments, the at least one memory and the computer program instructions, with the at least one processor, can be configured to cause the apparatus at least to calculate a weighted average of the one or more parameters for the viewpoint location and the viewpoint orientation of the virtual viewpoints of the users. In some embodiments, the at least one memory and the computer program instructions, with the at least one processor, can be configured to cause the apparatus at least to model changes in the one or more parameters for each virtual viewpoint relative to the weighted average of the one or more parameters. In some embodiments, the at least one memory and the computer program instructions, with the at least one processor, can be configured to cause the apparatus at least to determine, based upon at least the changes in the one or more parameters for each virtual viewpoint relative to the weighted average of the one or more parameters, the one or more light rays that from both the first portion and the third portion of the plurality of light rays that are likely to be viewable by the user within the corresponding region within the predetermined time.

In some embodiments, an apparatus, such as a user device, can comprise at least one processor and at least one memory including computer program instructions, the at least one memory and the computer program instructions. In some embodiments, the at least one processor can be configured to cause the user device at least to receive light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the at least one memory and the computer program instructions, with the at least one processor, can be configured to cause the apparatus at least to analyze said light field information to determine a field of view of the scene based on an orientation and a location of a virtual viewpoint of a user within the scene. In some embodiments, the at least one memory and the computer program instructions, with the at least one processor, can be configured to cause the apparatus at least to provide data related to said field of view to said apparatus. In some embodiments, the at least one memory and the computer program instructions, with the at least one processor, can be configured to cause the apparatus at least to render a first portion of a new image of the scene based upon at least said light field data. In some embodiments, the at least one memory and the computer program instructions, with the at least one processor, can be configured to cause the apparatus at least to render a second portion of the new image of the scene based upon at least said alternative representation.

A method for selectively transmitting light field data for rendering of a new image of a scene can comprise receiving light field data from a light field data source, said light field data comprising a plurality of light rays, each light ray of the plurality of light rays defined by a plenoptic function comprising positional terms (x, y, z) and directional terms (θ, ϕ) related to a scene. In some embodiments, the method can further comprise receiving round trip time information related to communication between said apparatus and said user device associated with a user. In some embodiments, the method can further comprise receiving from said user device field of view information related to a particular field of view of said scene. In some embodiments, the method can further comprise determining, based upon at least said round trip time information and said field of view information, a part of said plurality of light rays pertaining to a region of said scene which is determined to be viewable by said user with a predetermined probability within a predetermined time. In some embodiments, the method can further comprise transmitting data related to said part of light rays to said user device. In some embodiments, the method can further comprise transmitting a null ray term for each light ray of a remaining part of said plurality of light rays not belonging to said part as a null ray together with an alternative representation of a remaining portion of said scene not pertaining to said region. In some embodiments, the method can further comprise receiving other round trip time information related to communication between said apparatus and one or more other user devices associated with one or more other users. In some embodiments, the method can further comprise receiving from said one or more other user devices other field of view information related to one or more other particular fields of view of said scene. In some embodiments, the method can further comprise determining, based upon at least said round trip information, said field of view information, said other round trip information, and said other field of view information, the part of said plurality of light rays pertaining to said region which is determined to be viewable by said user and said one or more other users with the predetermined probability within the predetermined time. In some embodiments, the method can further comprise grouping said user and said one or more other users into one or more user groups based upon at least one of a user behavior and a field of view difference. In some embodiments, the method can further comprise determining an error rate for each particular field of view within a particular group of the one or more groups of users. In some embodiments, the method can further comprise applying a weight function to transform the error rate into a weight value associated with each particular field of view in the particular group of users.

A method for rendering a new image of a scene based on selective light field data and an alternative representation can be carried out. In some embodiments, the method can comprise receiving light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the method can further comprise analyzing said light field information to determine a field of view of the scene based on an orientation and a location of a virtual viewpoint of a user within the scene. In some embodiments, the method can further comprise providing data related to said field of view to said apparatus. In some embodiments, the method can further comprise rendering a first portion of a new image of the scene based upon at least said light field data. In some embodiments, the method can further comprise rendering a second portion of the new image of the scene based upon at least said alternative representation.

An apparatus of an example embodiment can be configured for selectively transmitting light field data for rendering of a new image of a scene. In some embodiments, the apparatus can comprise means, such as at least one processor and at least one memory including computer program instructions, for receiving light field data from a light field data source, said light field data comprising a plurality of light rays, each light ray of the plurality of light rays defined by a plenoptic function comprising positional terms (x, y, z) and directional terms (θ, ϕ) related to a scene. In some embodiments, the apparatus can further comprise means for receiving round trip time information related to communication between said apparatus and said user device associated with a user. In some embodiments, the apparatus can further comprise means for receiving from said user device field of view information related to a particular field of view of said scene. In some embodiments, the apparatus can further comprise means for determining, based upon at least said round trip time information and said field of view information, a part of said plurality of light rays pertaining to a region of said scene which is determined to be viewable by said user with a predetermined probability within a predetermined time. In some embodiments, the apparatus can further comprise means for transmitting data related to said part of light rays to said user device. In some embodiments, the apparatus can further comprise means for transmitting a null ray term for each light ray of a remaining part of said plurality of light rays not belonging to said part as a null ray together with an alternative representation of a remaining portion of said scene not pertaining to said region. In some embodiments, the apparatus can further comprise means for receiving other round trip time information related to communication between said apparatus and one or more other user devices associated with one or more other users. In some embodiments, the apparatus can further comprise means for receiving from said one or more other user devices other field of view information related to one or more other particular fields of view of said scene. In some embodiments, the apparatus can further comprise means for determining, based upon at least said round trip information, said field of view information, said other round trip information, and said other field of view information, the part of said plurality of light rays pertaining to said region which is determined to be viewable by said user and said one or more other users with the predetermined probability within the predetermined time. In some embodiments, the apparatus can further comprise means for grouping said user and said one or more other users into one or more user groups based upon at least one of a user behavior and a field of view difference. In some embodiments, the apparatus can further comprise means for determining an error rate for each particular field of view within a particular group of the one or more groups of users. In some embodiments, the apparatus can further comprise means for applying a weight function to transform the error rate into a weight value associated with each particular field of view in the particular group of users.

An apparatus of an example embodiment can be configured for selectively transmitting light field data for rendering of a new image of a scene. In some embodiments, the apparatus can comprise means, such as at least one processor and at least one memory including computer program instructions, for receiving light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the apparatus can further comprise means for analyzing said light field information to determine a field of view of the scene based on an orientation and a location of a virtual viewpoint of a user within the scene. In some embodiments, the apparatus can further comprise means for providing data related to said field of view to said apparatus. In some embodiments, the apparatus can further comprise means for rendering a first portion of a new image of the scene based upon at least said light field data. In some embodiments, the apparatus can further comprise means for rendering a second portion of the new image of the scene based upon at least said alternative representation.

A computer program product of an example embodiment for selectively transmitting light field data for rendering of a new image of a scene can comprise instructions stored thereon for at least receiving light field data from a light field data source, said light field data comprising a plurality of light rays, each light ray of the plurality of light rays defined by a plenoptic function comprising positional terms (x, y, z) and directional terms (θ, φ) related to a scene. In some embodiments, the computer program product can further comprise instructions for receiving round trip time information related to communication between said apparatus and said user device associated with a user. In some embodiments, the computer program product can further comprise instructions for receiving from said user device field of view information related to a particular field of view of said scene. In some embodiments, the computer program product can further comprise instructions for determining, based upon at least said round trip time information and said field of view information, a part of said plurality of light rays pertaining to a region of said scene which is determined to be viewable by said user with a predetermined probability within a predetermined time. In some embodiments, the computer program product can further comprise instructions for transmitting data related to said part of light rays to said user device. In some embodiments, the computer program product can further comprise instructions for transmitting a null ray term for each light ray of a remaining part of said plurality of light rays not belonging to said part as a null ray together with an alternative representation of a remaining portion of said scene not pertaining to said region.

A computer program product of an example embodiment for selectively transmitting light field data for rendering of a new image of a scene can comprise instructions stored thereon for at least receiving light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the computer program product can further comprise instructions for analyzing said light field information to determine a field of view of the scene based on an orientation and a location of a virtual viewpoint of a user within the scene. In some embodiments, the computer program product can further comprise instructions for providing data related to said field of view to said apparatus.

BRIEF DESCRIPTION OF THE DRAWINGS

Figure 1:
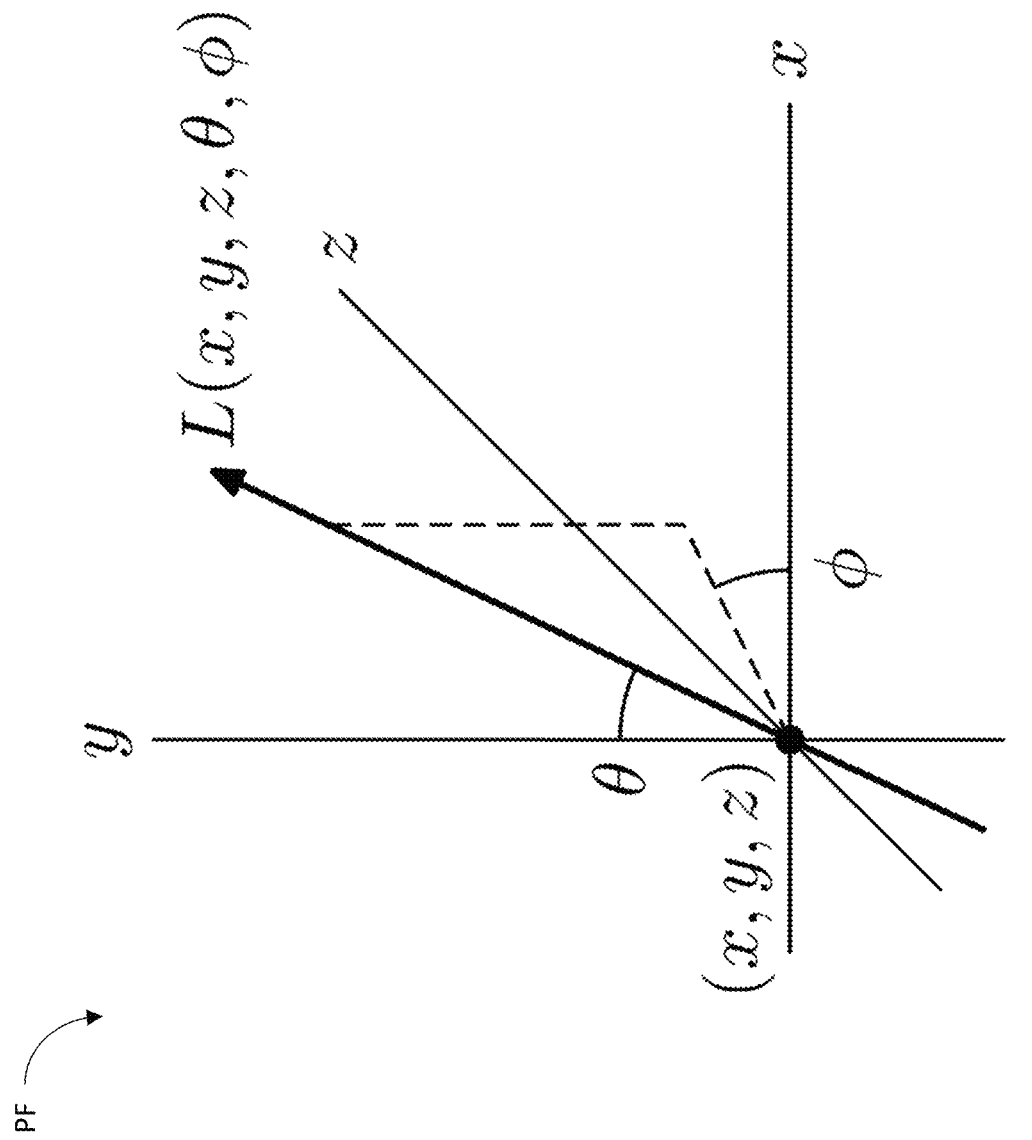
Figure 2A:
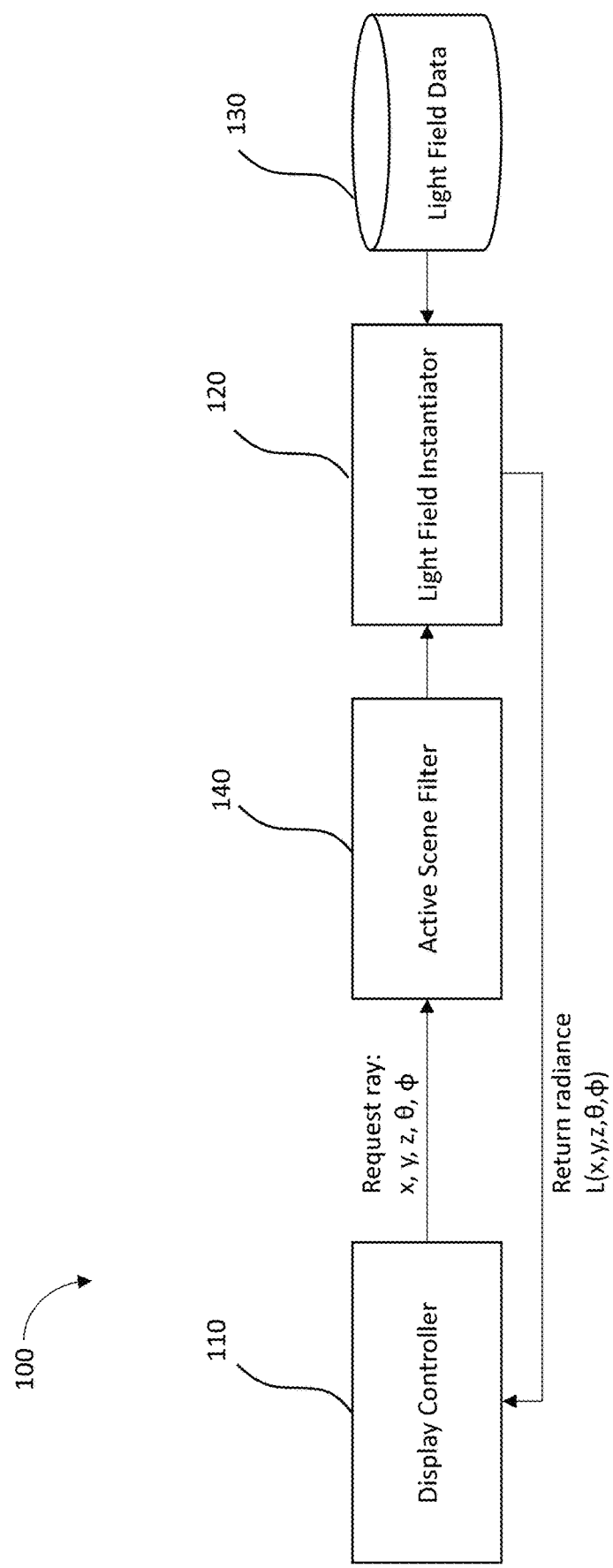
Figure 2B:
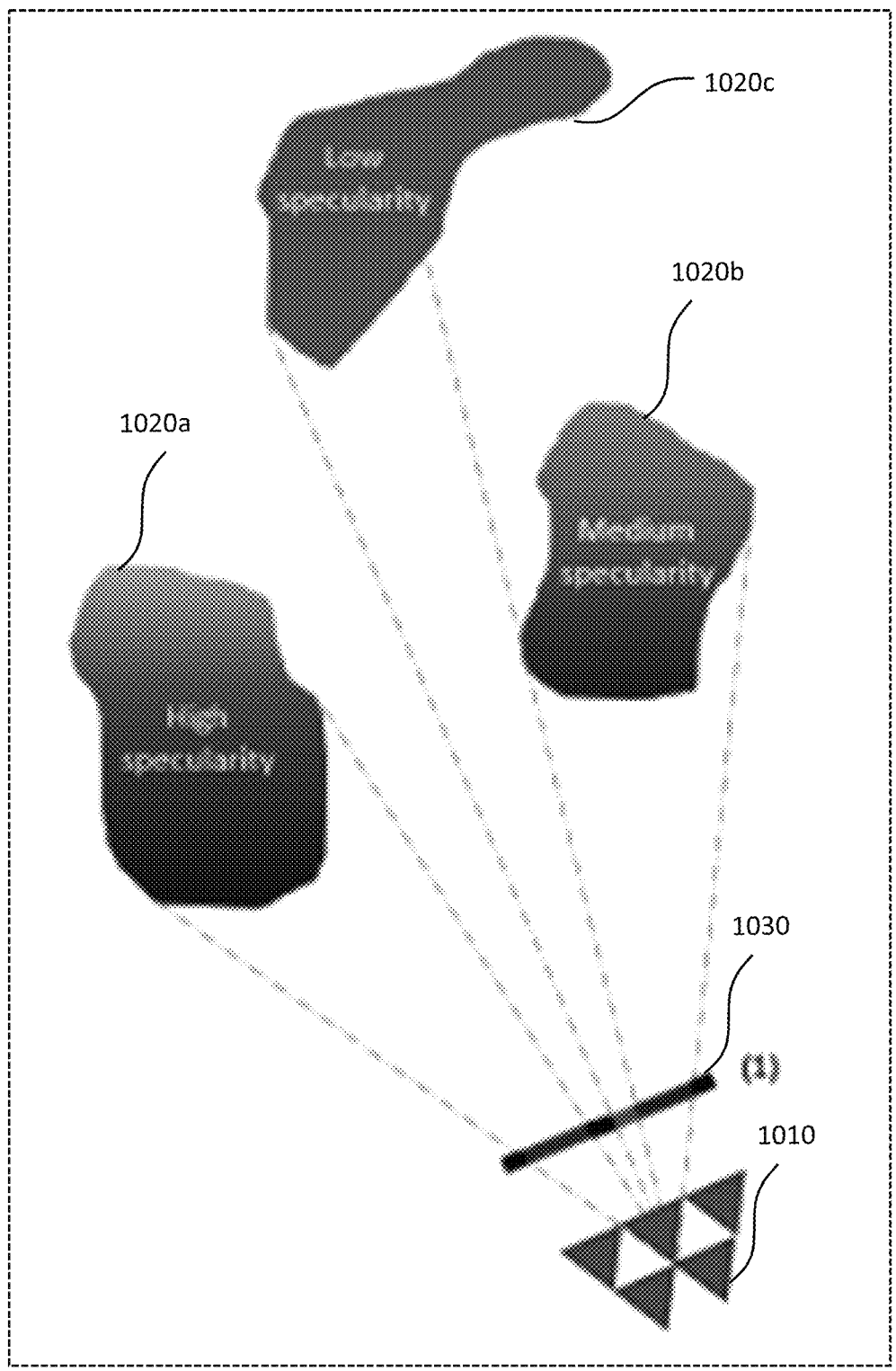
Figure 3:
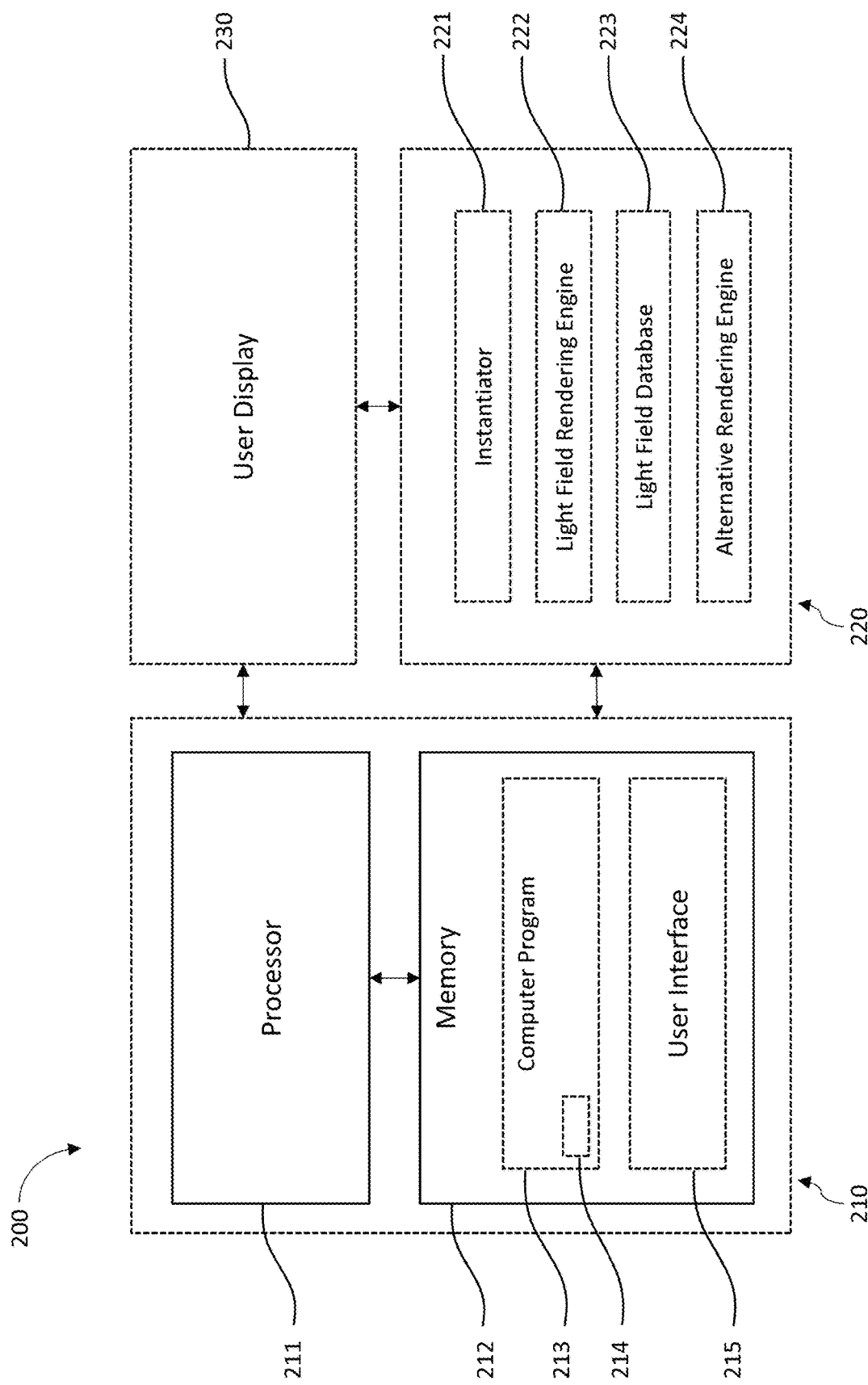
Figure 4:
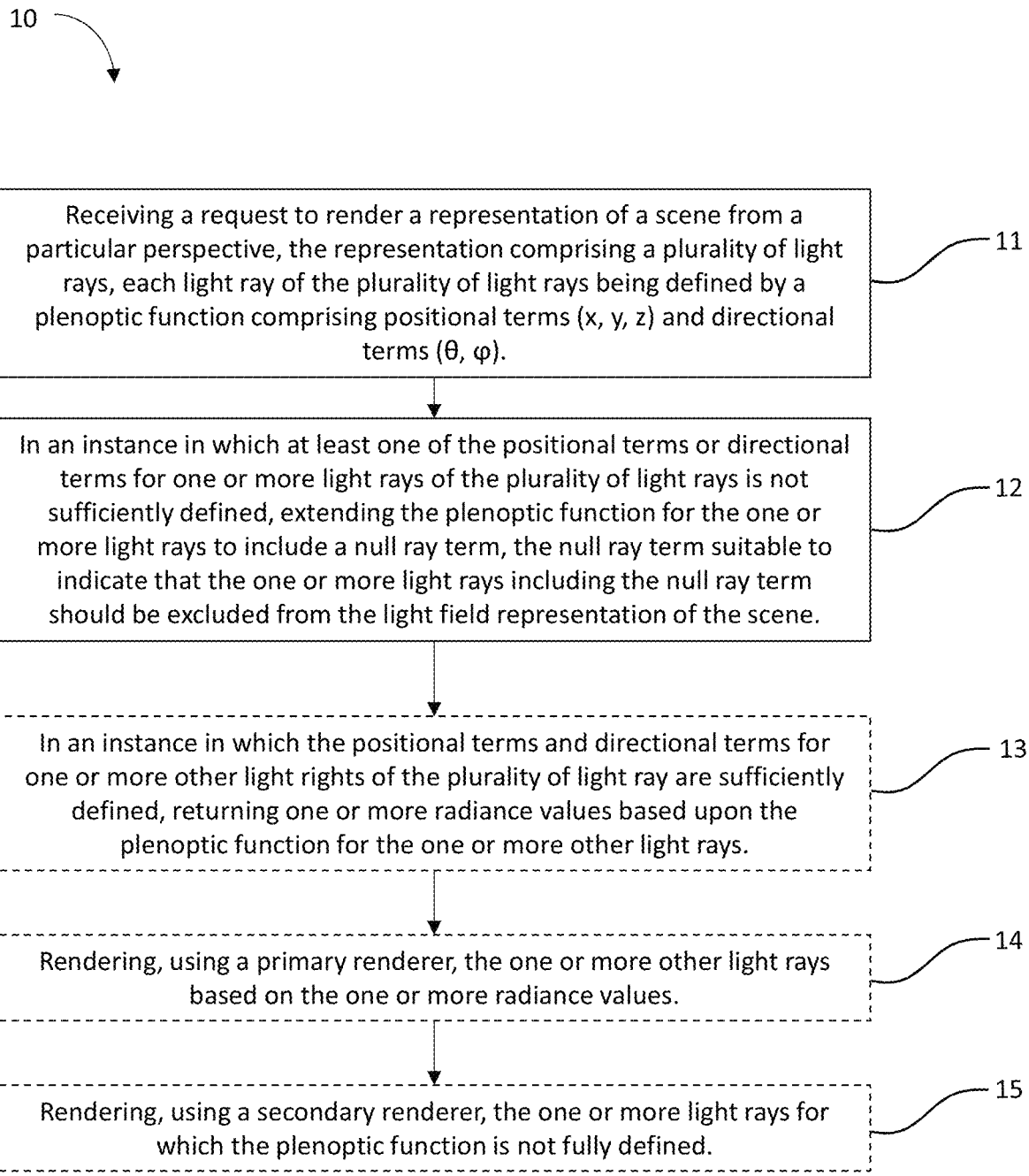
Figure 6:
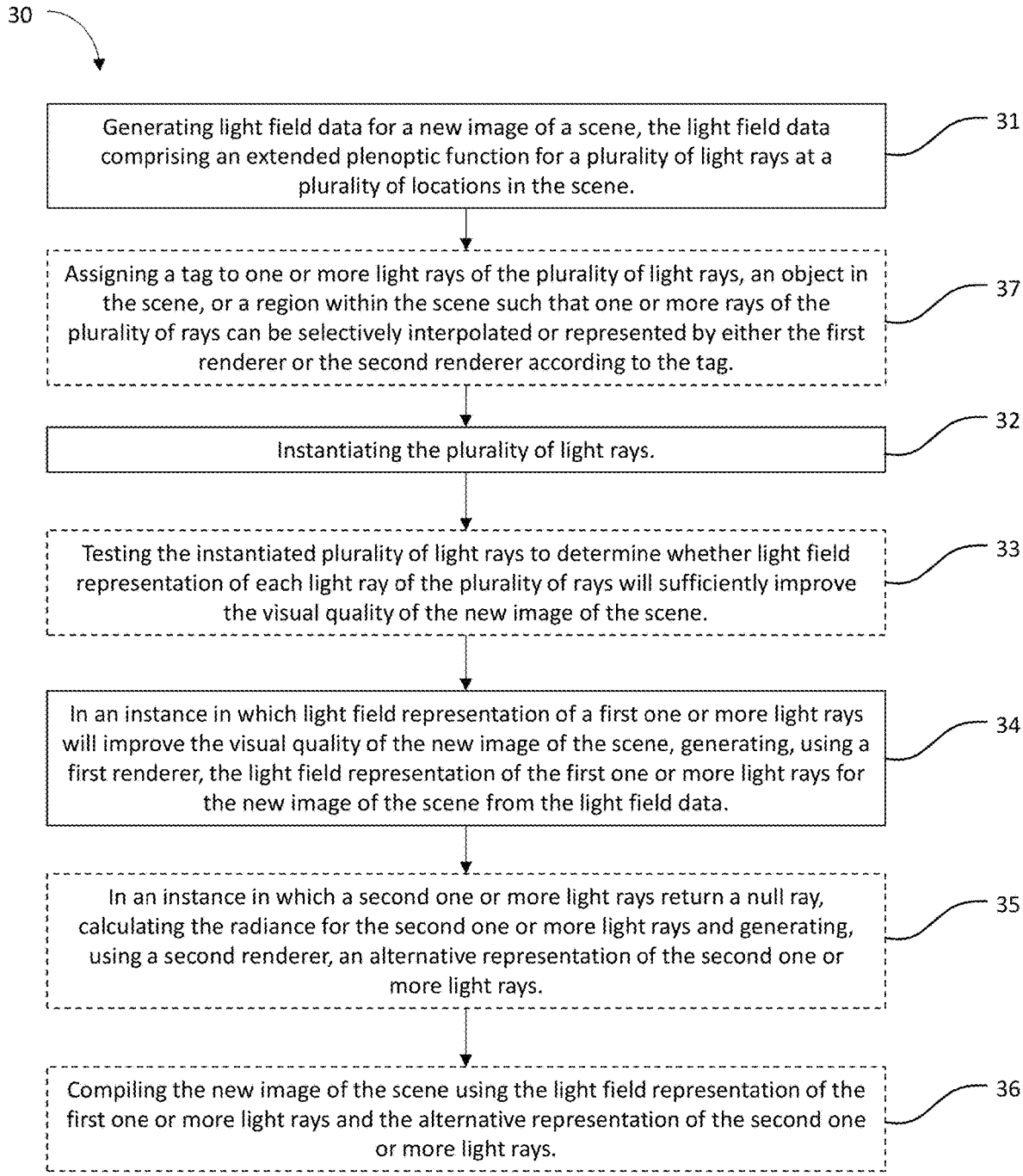
Figure 7A:
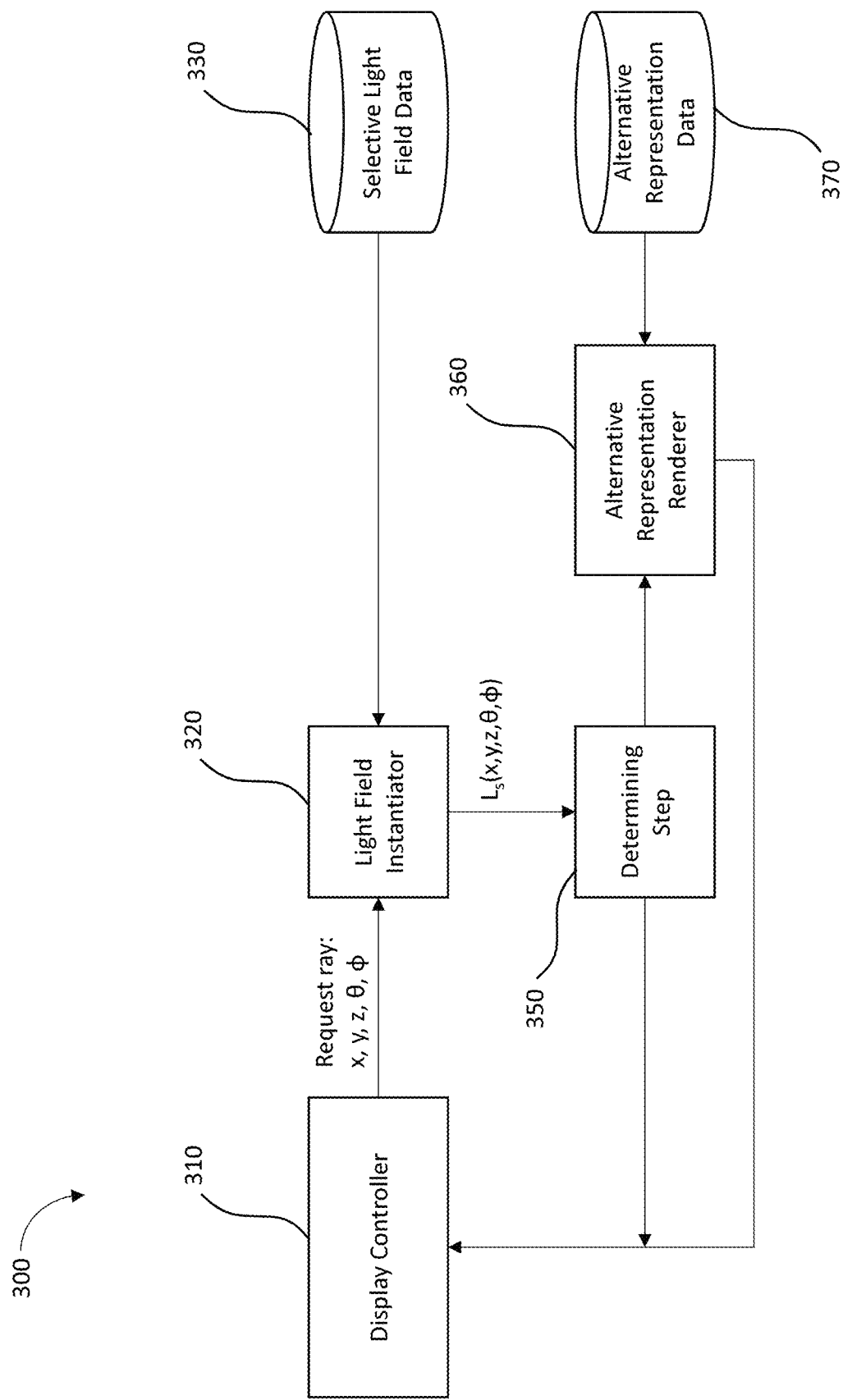
Figure 7B:
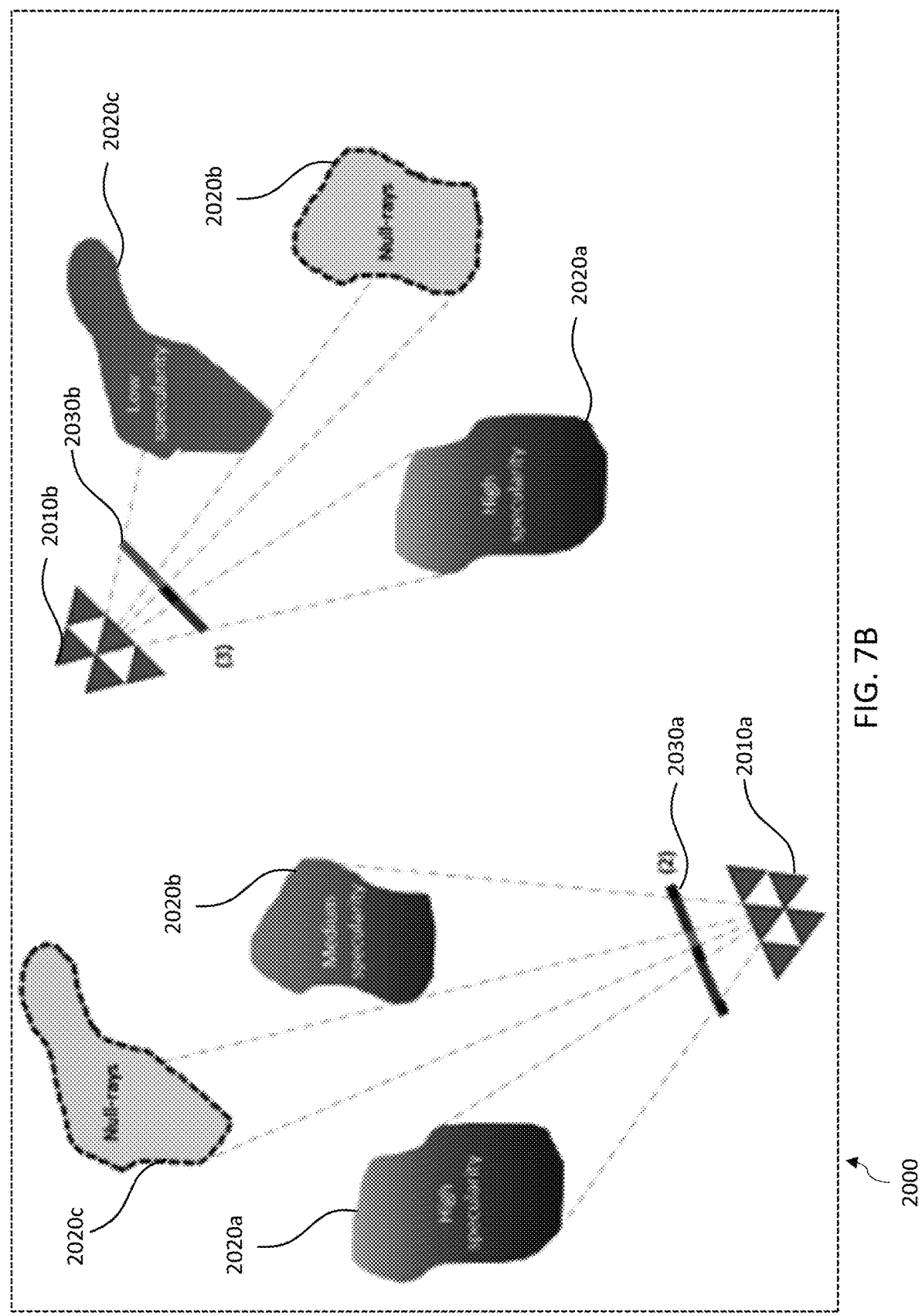
Figure 8A:
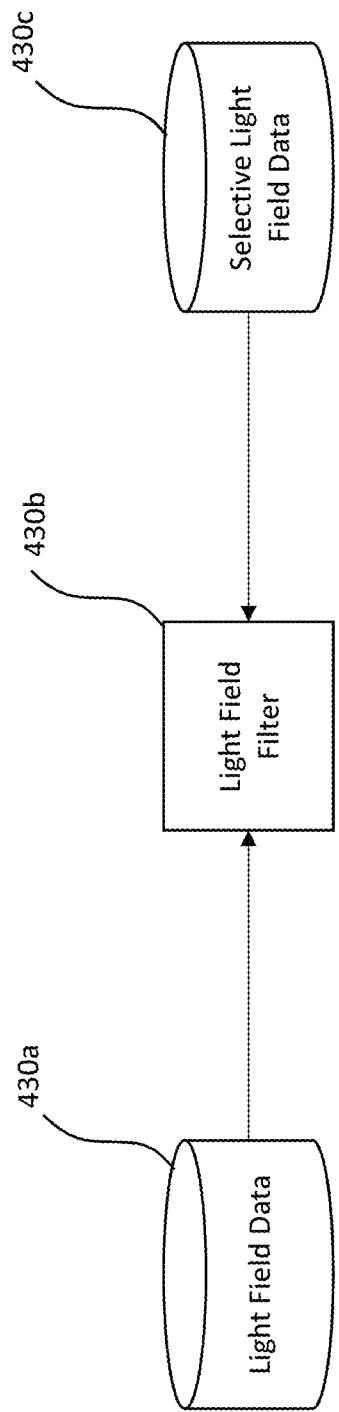
Figure 8B:
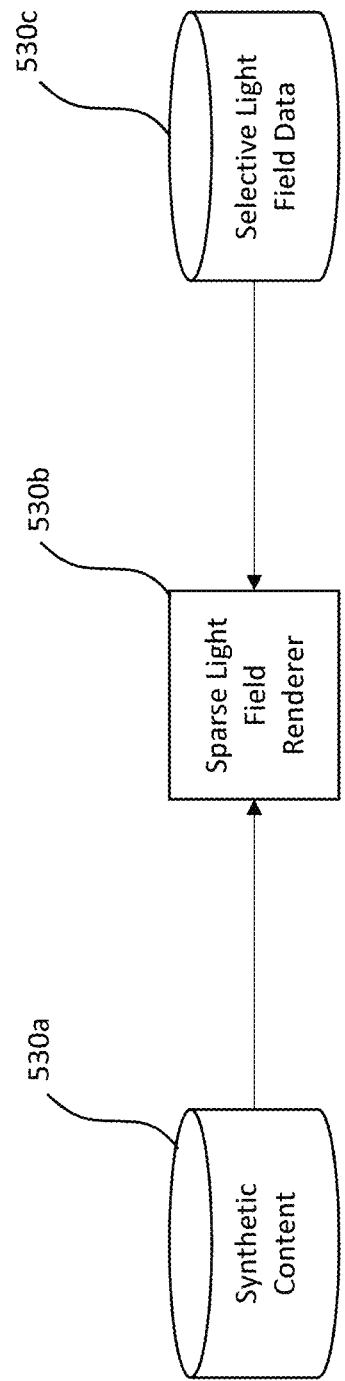
Figure 9:
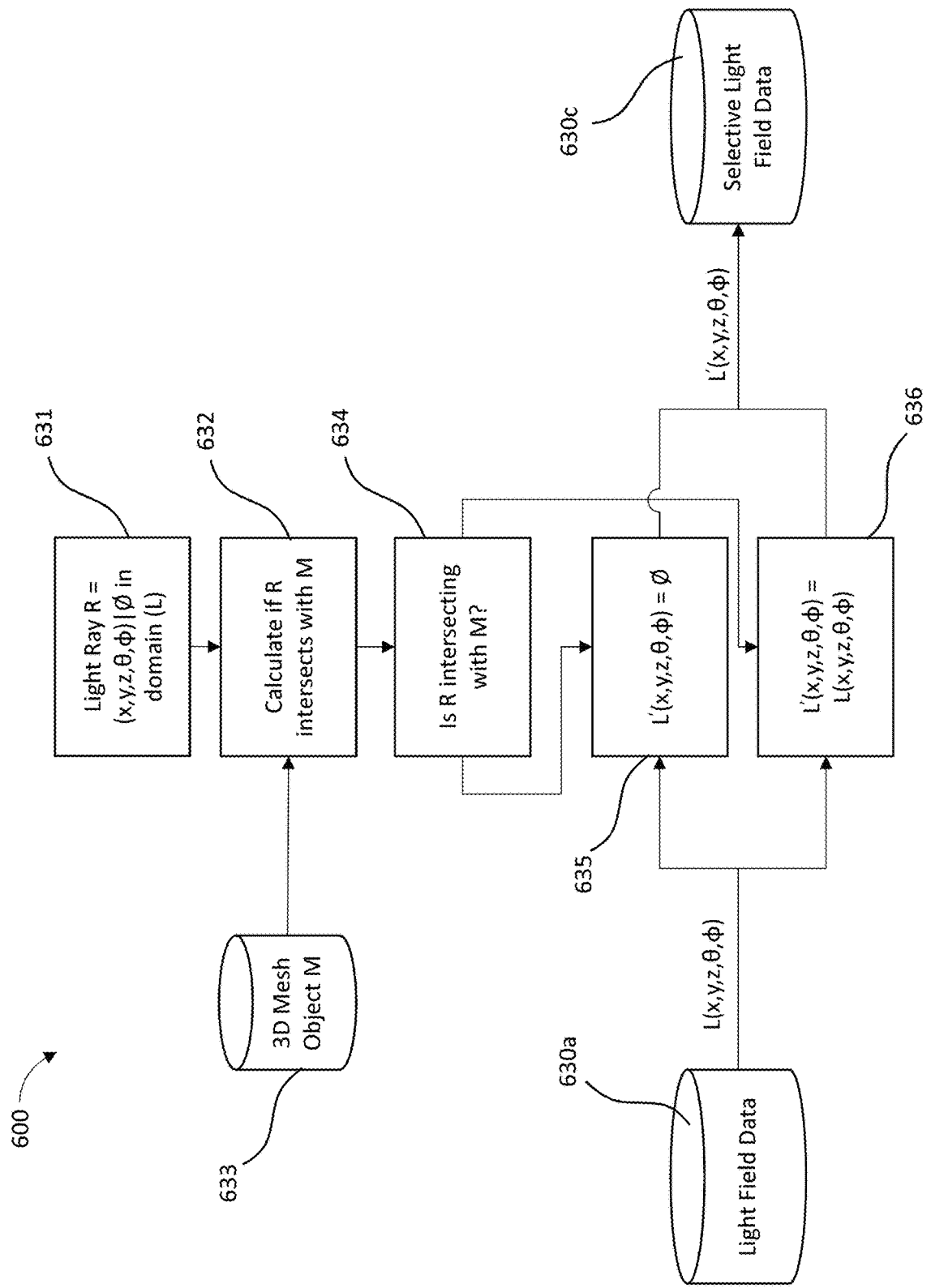
Figure 10:
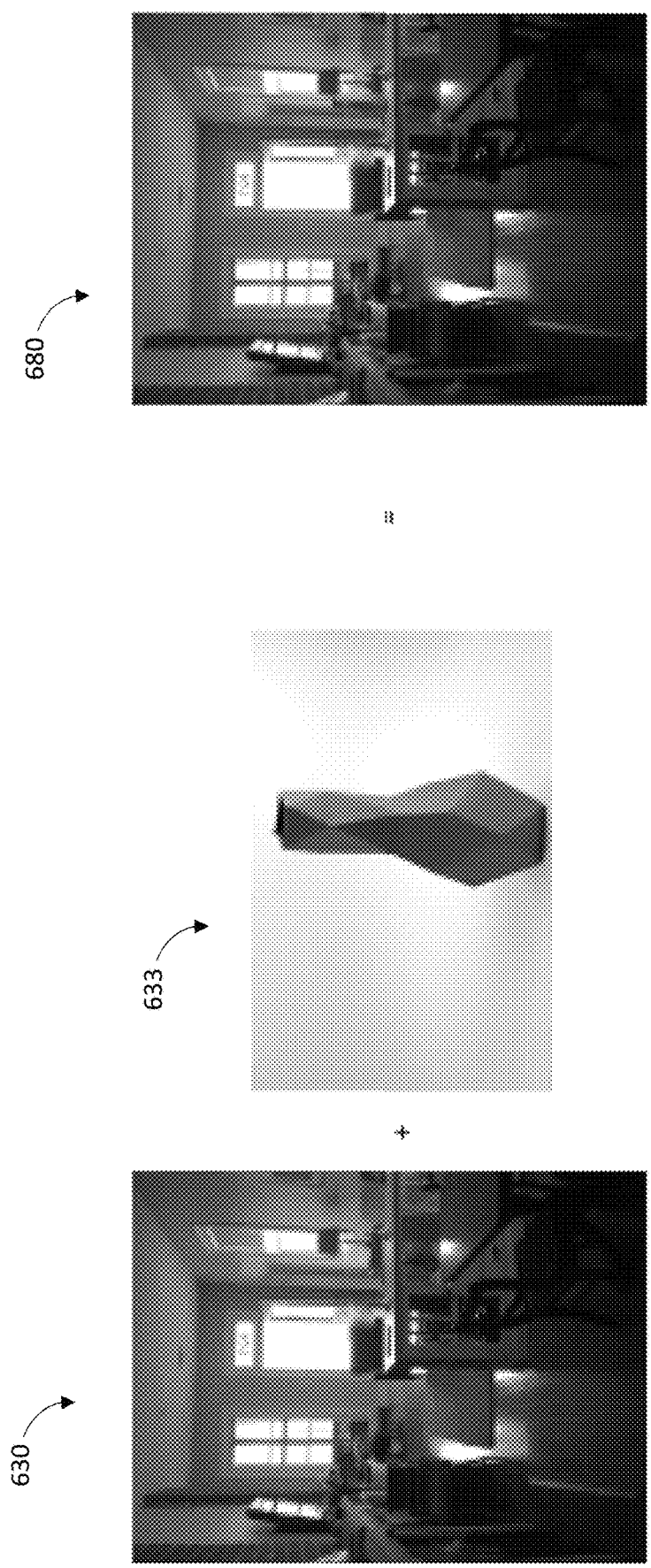
Figure 11:
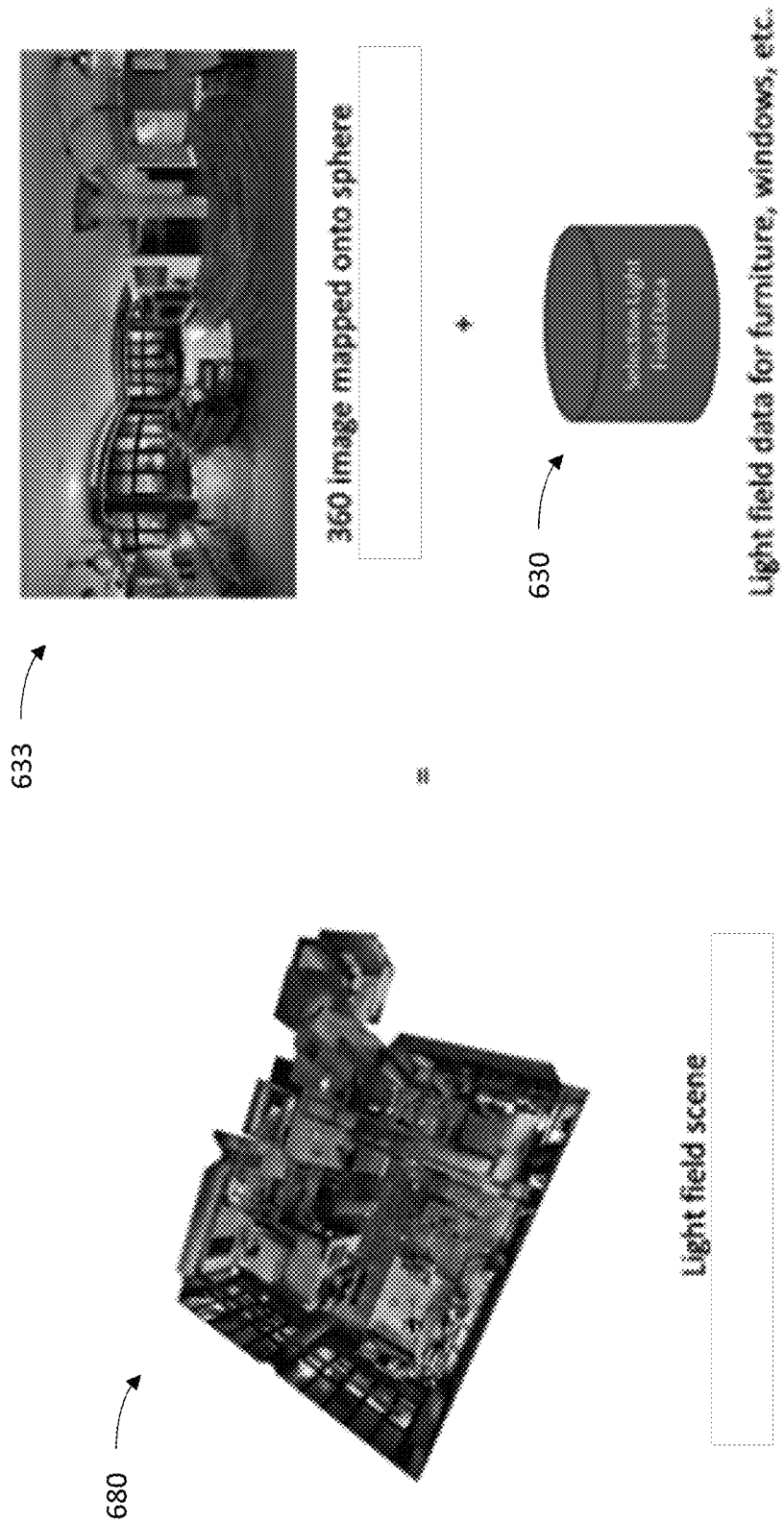
Figure 12:
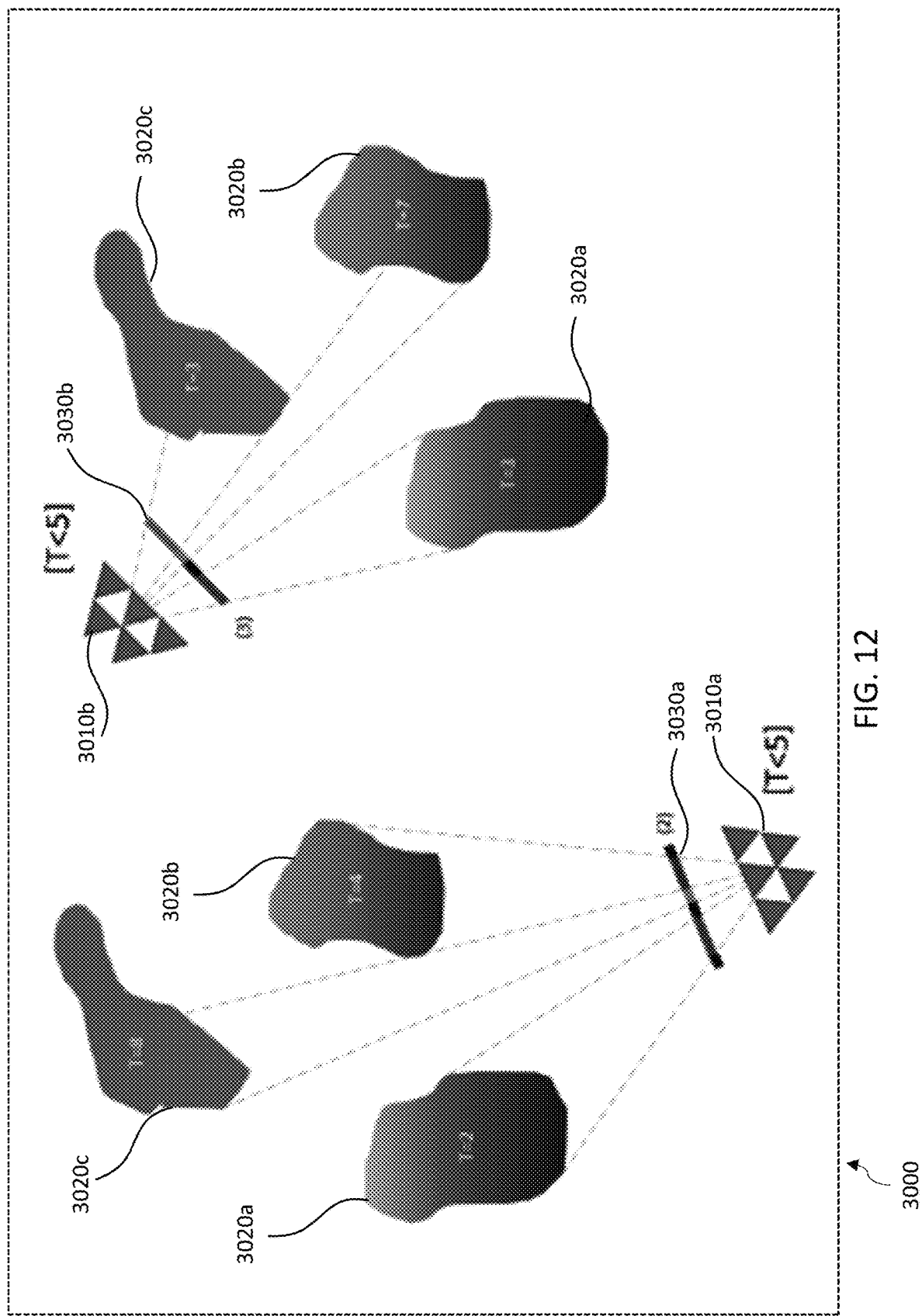
Figure 13:
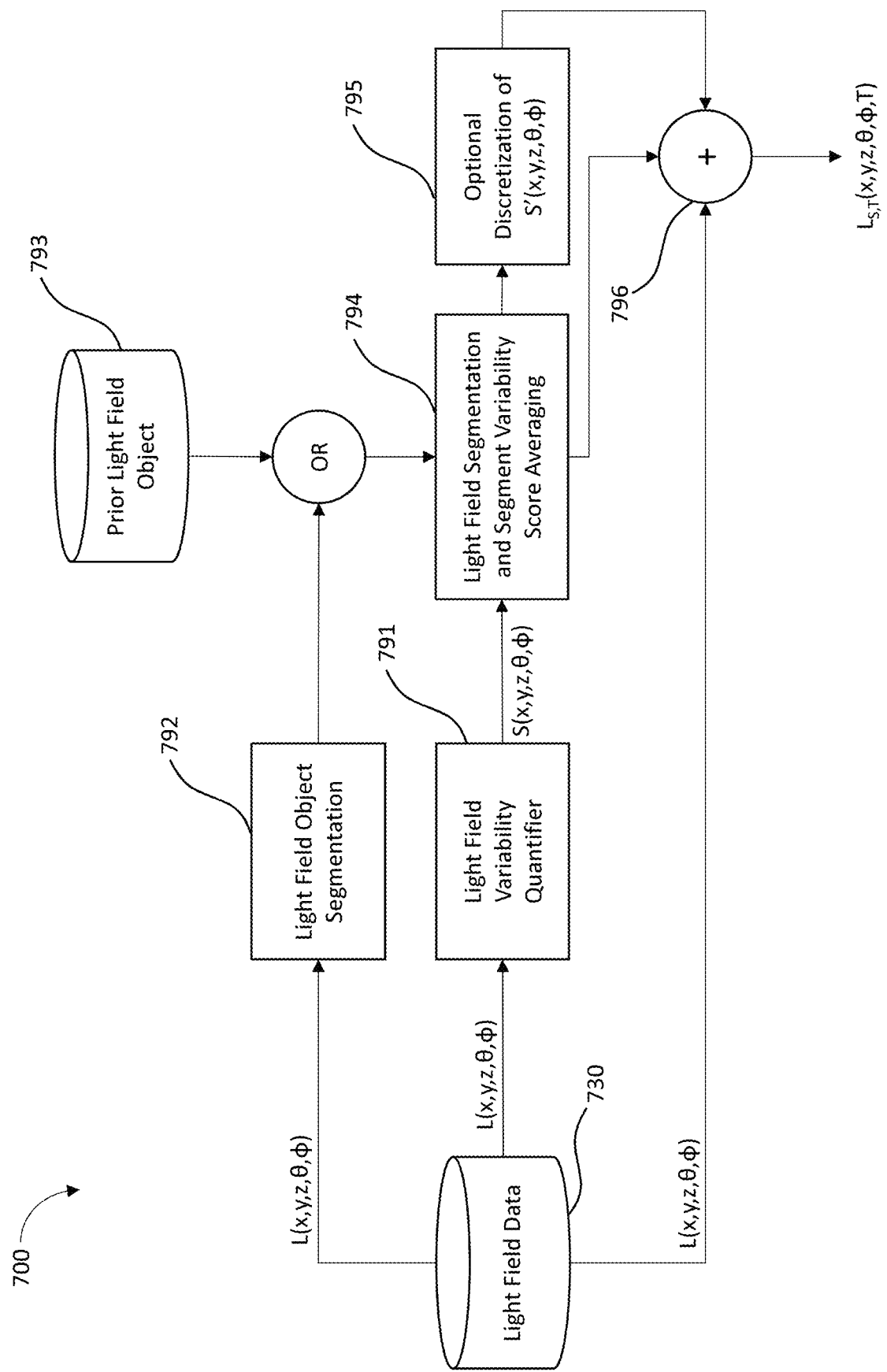
Figure 14:
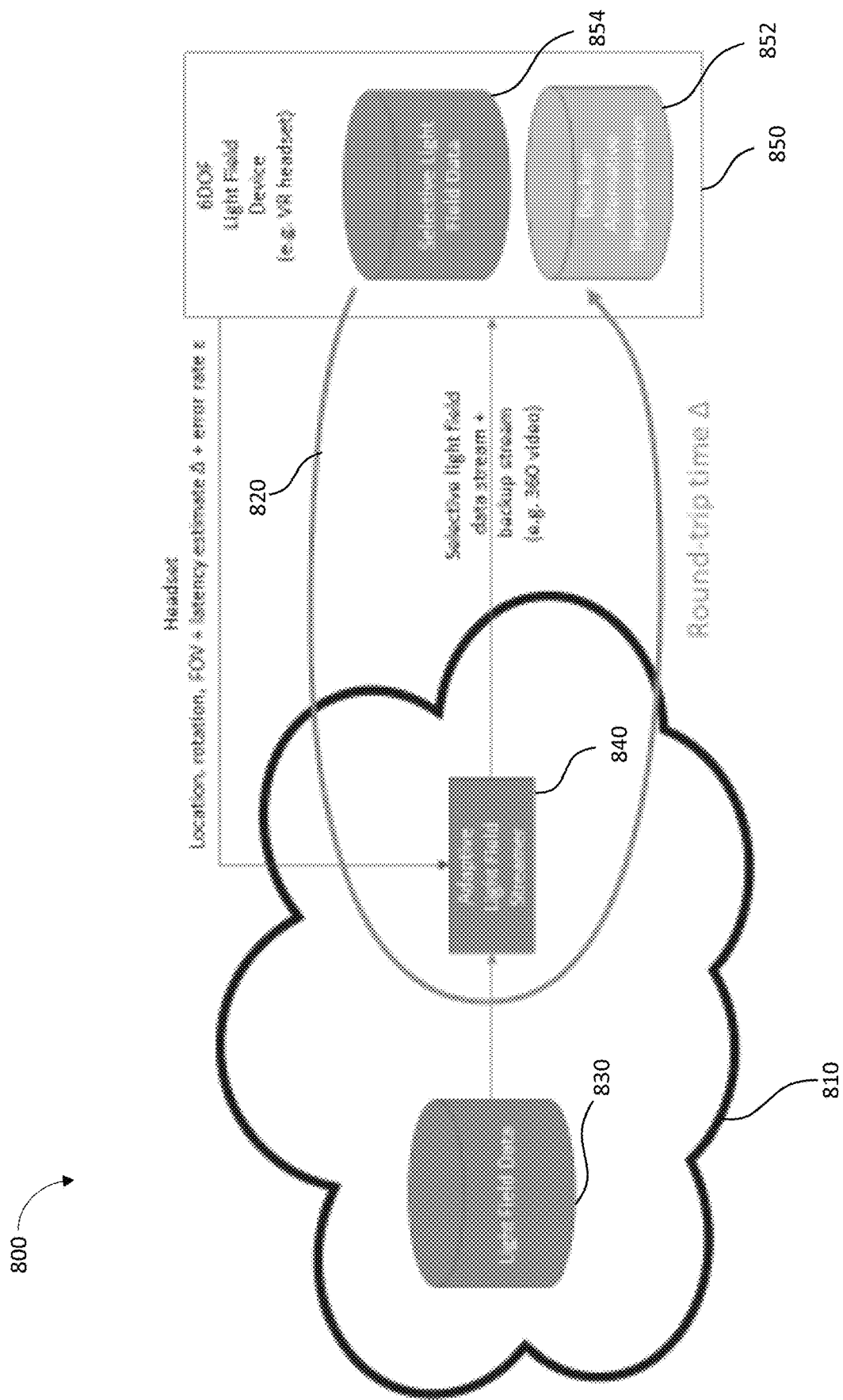
Figure 15:
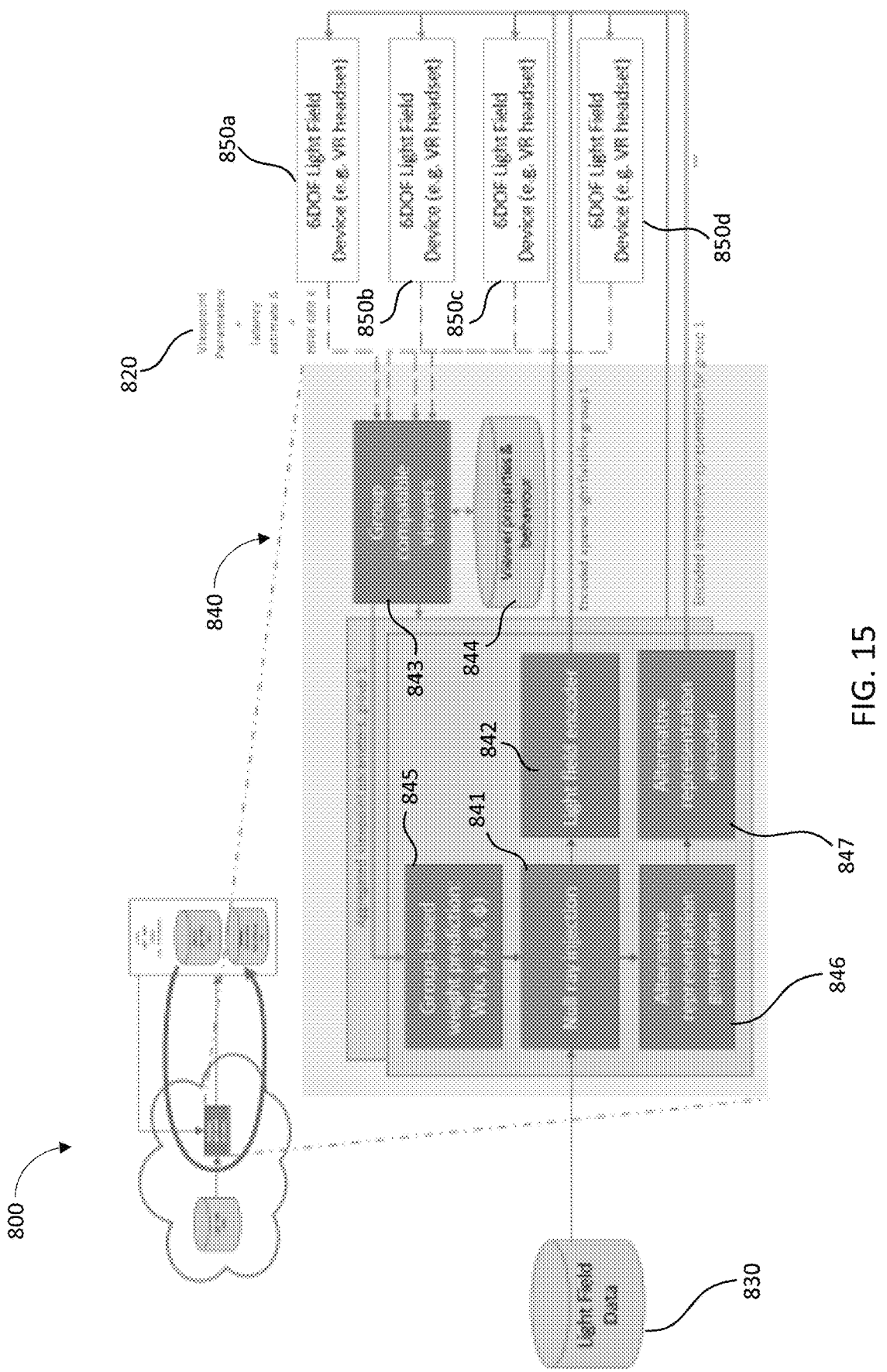
Figure 16:
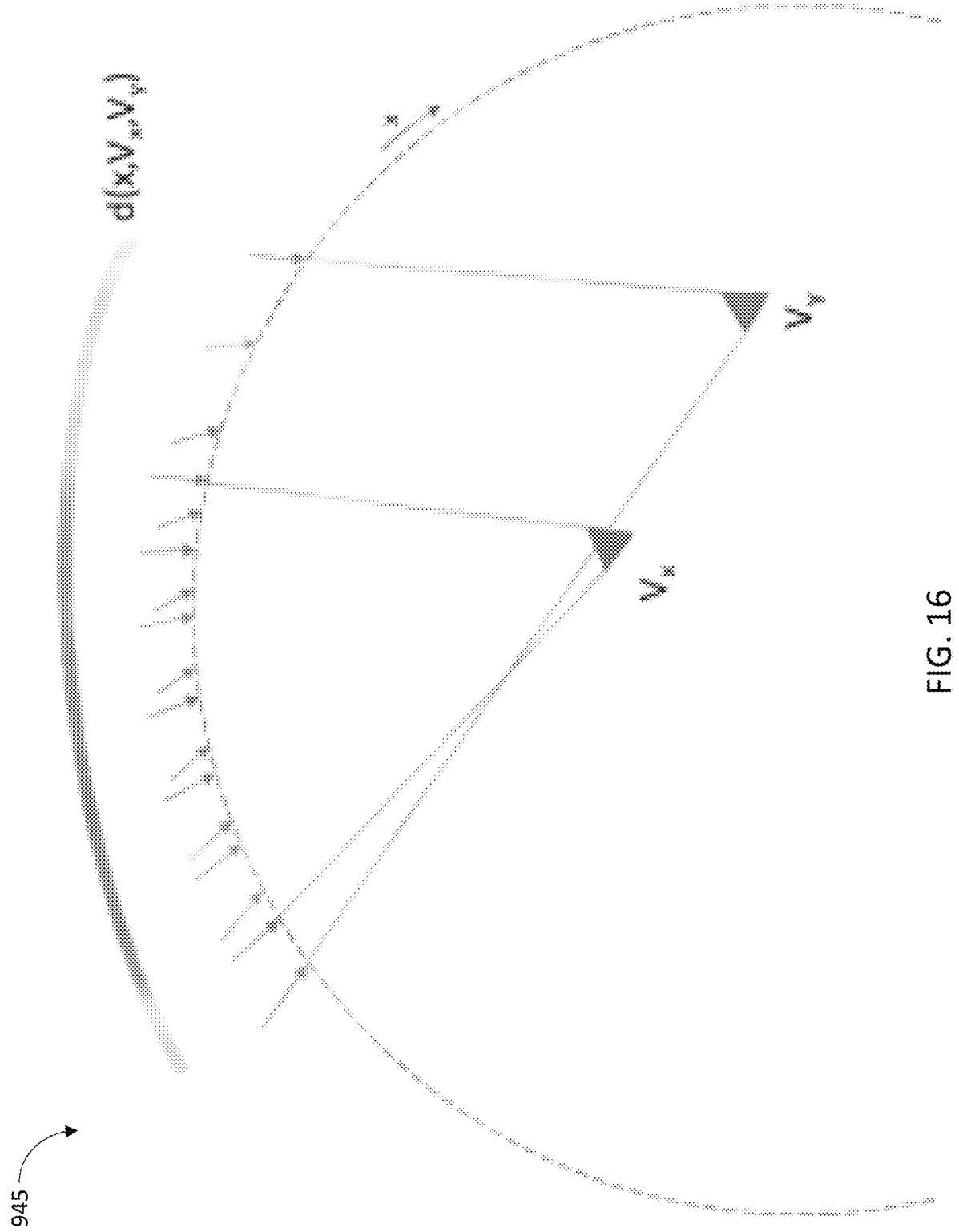

Having thus described certain example embodiments of the present disclosure in general terms, reference will hereinafter be made to the accompanying drawings, which are not necessarily drawn to scale, and wherein:

FIG. 1 graphically represents a light field for a point (x, y, z) in a visual representation;

FIG. 2A illustrates a conventional process by which light field data for a ray can be requested and a scene can be rendered therefrom;

FIG. 2B illustrates objects to rendered according to the conventional process of FIG. 2A, the objects having a wide range of specularity;

FIG. 3 illustrates a schematic of an apparatus, such as a computing device, an optional server, and an optional display device, according to an embodiment;

FIG. 4 illustrates a flow chart of a method for selective rendering of a light field, according to an embodiment;

FIG. 5 illustrates a flow chart of a method for selective rendering of a light field, according to an embodiment;

FIG. 6 illustrates a flow chart of a method for selective rendering of a light field, according to an embodiment;

FIG. 7A illustrates a process for selectively rendering rays for a scene based upon light field instantiation and a conventional rendering approach, according to an embodiment;

FIG. 7B illustrates objects to be rendered according to the selective rendering process of FIG. 7A, objects having high and medium specularity being rendered by light field instantiation and objects having low specularity being rendered by a conventional rendering approach, according to an embodiment;

FIG. 8A illustrates an alternative approach for storing and accessing light field data for selective light field instantiation, according to an embodiment;

FIG. 8B illustrates an alternative approach for storing and accessing light field data for selective light field instantiation, according to an embodiment;

FIG. 9 illustrates a process for selectively rendering rays for a scene based upon light field instantiation or a conventional rendering approach, according to an embodiment;

FIG. 10 illustrates how a captured light field scene and a 3D mesh object having low specularity can be stitched together during rendering in a scene;

FIG. 11 illustrates how a captured light field scene of a room can be generated from a 360 image mapped onto a sphere and selective light field data; and FIG. 12 illustrates objects to be rendered according to a selective rendering process in which objects are tagged and objects having high and medium specularity are rendered by light field instantiation and objects having low specularity are rendered by a conventional rendering approach, according to an embodiment;

FIG. 13 illustrates an automated process for selectively rendering rays for a scene based upon light field instantiation or a conventional rendering approach, according to an embodiment;

FIG. 14 illustrates a process for selectively rendering rays for a scene based upon light field instantiation or a conventional rendering approach, according to an embodiment;

FIG. 15 illustrates a process for adaptive light field streaming of selective light field data, according to an embodiment; and FIG. 16 illustrates an approach for calculating a distance between two viewpoints to facilitate prediction of light rays within a probable viewing area in the near future for two viewers, according to an embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing devices.

As defined herein, a "computer-readable storage medium," which refers to a physical storage medium (e.g., volatile or non-volatile memory device), may be differentiated from a "computer-readable transmission medium," which refers to an electromagnetic signal.

As defined herein, "augmented reality" ("AR") may refer to data processing technologies that integrate computer-generated images or video with a user's view of the real world in a near seamless or seamless manner.

As defined herein, "virtual reality" ("VR") may refer to data processing technologies that replicate a real or imagined environment by simulating a user's physical presence in that environment and, in some cases, allowing the user to interact with that environment.

As defined herein, "6 degrees of freedom" ("6DOF") may refer to the ability to freely rotate and translate the viewpoint, as typically used in the field of AR/VR images and video rendering.

In the field of image and video generation and delivery, and particularly in the fields of augmented reality and virtual reality imaging, light fields are often seen as the next stage for realistic image and video delivery. It is thought that through the effective use of light field characteristics, effects such as specularity and realistic light diffraction can be delivered while maintaining accurate eye accommodation and convergence properties. Specularity is defined as "a quantification of reflectivity of a surface of a rendered object in a generated virtual image or video" while reflectivity is defined as "the fraction of incident electromagnetic power that is reflected by a surface." The light field is defined as "radiance as a function of position and direction in regions of space free of occluders," and in practical terms can be described using a vector function that describes the amount of light flowing in every direction through every point in space. The direction of each ray is given by the five-dimensional (5D) plenoptic function, and the magnitude of each ray is given by the radiance. The 5D plenoptic function is a simplification of a seven-dimensional (7D) plenoptic function for which time and wavelength are also parameterized. It is generally understood that the 7D plenoptic function can be simplified to the 5D plenoptic function without changing the basic concepts and without affecting the outcome in terms of video processing.

FIG. 1 graphically illustrates a 5D plenoptic function PF for a light ray L (ray L) in three-dimensional (3D) space at a position (x, y, z) in a scene and having a direction (θ, ϕ). The radiance (R) for the ray (L) can be calculated as watts per steradian per meter squared, where the steradian is a measure of the solid angle within a geometric column surrounding the ray and meters squared is the cross-sectional area of that column. The plenoptic function PF, then, describes the radiance along all such rays in a region of 3D space illuminated by an unchanging arrangement of lights.

The use of light fields in rendering images and video may represent a great opportunity for delivering users a realistic and immersive experience, however the computational complexity of such rendering, especially dynamic rendering from a changing user perspective for stereo vision of an augmented or virtual reality image or video can sometimes be untenable. In addition, the bitrate and bandwidth required for delivering such realistic images or video having high photorealism can also be prohibitively high. In addition, using light fields to represent every object in every portion at every depth of field is sometimes either not possible or not useful. For instance, objects that are far away from the user in the rendered image will benefit less from the use of light fields than objects that are relatively closer from the perspective of the user. In some cases, objects that have simpler material properties will benefit less from this approach than objects having more complex material properties. Therefore, the use of only light fields for rendering an image or video can often be wasteful in terms of computing resources and bandwidth used for transmitting the images or video. On the other hand mixing of light field data from different sources can also be complex using the state of the art techniques.

Conventional approaches for using light fields when rendering visual representations includes using the light field for the complete scene. FIGS. 2A and 2B illustrate one such conventional approach 100 for rendering images and video using light fields for the entire visual representation. Typically, the display controller 110 requests a number of rays, and the light field is instantiated by a light field instantiator 120 to offer the matching radiances. Light field data, provided by a light field data source 130 is typically densely sampled and the light field instantiator 120 typically carries out a selection step where the neighborhood of the requested ray is being constructed, followed by an interpolation step that creates a new ray by interpolating from the available neighborhood. In cases where light rays are created only for a particular active portion of a scene (e.g., for an active portion to be viewed by the user), when the user's perspective and line of sight moves outside of this particular portion, the image can be gradually blacked out in order to indicate to the user that they are out of range and should move their perspective and line of sight back into the particular portion of the scene. Thus, the conventional approach 100 can include a block or step in which it is determined whether the requested ray is from the active portion of the scene 140. However, this means a portion of the scene is simply not rendered at all rather than being rendered from an alternative or secondary representation. For instance, in rendering a representation of a scene for a user, the display controller 110 might request a particular ray using the 5D plenoptic function PF terms x, y, z, θ, and ϕ to indicate the particular ray L by position and direction. If the particular ray L being requested is determined 140 to be within a particular (e.g., active) portion of the image or video representation, then the light field instantiator 120 requests light field data for that particular ray L from the light field data source 130 and returns the light field data to the display controller 110 to be rendered into a full representation based upon only the light field data of each sampled point in the image or video representation. This conventional approach 100 and other conventional approaches require that any non-active portion of the representation (outside the particular portion of the representation that is intended to be viewed by the user) be either not modeled at all or modeled relatively simply. The is because the conventional approach also requires that the model be transmitted to the renderer with the light field data and more complex models would be undesirable since the bandwidth and computational requirements of transmitting complex light field models for complex objects and rendering based upon these complex models is highly undesirable.

Other conventional approaches employ a 3D rendering engine to conventionally render a scene based upon 3D objects having 3D representations that are stitched together (necessary to render occlusion of objects based upon viewer perspective), for which only a handful of light field objects are rendered as an alternative representation to the conventional representation. This approach and those like it are based upon conventional rendering with complex light field rendering being only carried out for a limited number of objects in the scene at any one time. For a very small number of light field objects in the scene, this approach may be feasible (though still computationally complex in terms of selecting the objects to be rendered using light fields versus those rendered using conventional approaches), and glitching often or always occurs due to the limited pace at which rendering of new images of the scene can occur as the viewer's perspective changes. The finished image is also often of lower quality and is not as immersive for viewers as compared to the light field only rendering approach because it is difficult to trick the human eye and mind into suspending visual disbelief when only a handful of objects exhibit realistic light effects and others exhibit conventional virtual image aesthetics.

For instance, as illustrated in FIG. 2B, the conventional approach requires that any object that is in any way rendered be either fully rendered based on light field data, including light field data for low specularity objects as well as moderate and high specularity objects, fully rendered based upon traditional (e.g., 360 image, 3D mesh, etc.) rendering approaches, or not be rendered at all. There are other limitations that are not listed here, however one of skill in the art will know and recognize the lingering and long-felt need in the industry for a new approach to rendering virtual (synthetic) scenes that provides a light field-based rendering but is also computationally simpler and requires less bandwidth for transmitting than traditional light field only approaches.

Selective Light Field Rendering

Therefore, the inventors have conceived of and fully developed a new approach to visual representation based on light fields is needed that can more efficiently and effectively use computing resources and transmission bandwidth, not to mention that could lead to more rapid rendering of visual representations, leading to a more cohesive and immersive experience for users. Specifically, the inventors have realized that there would be a benefit from combining light fields for objects that benefit from the use of light fields for such renderings, with the use of traditional techniques, e.g., textured meshes, 360° video, etc., for the portions of the scene or objects from the scene that do not benefit or do not benefit sufficiently much from the use of light fields representation, thus saving bandwidth and computer processing. However, there is no existing way in which to only partially use light fields when rendering a visual representation. Conventional wisdom dictates that rays are defined using light fields over the entire domain of the representation, and thus there is no way in which to know when to use a different representation. In other words, each ray from each position within the visual representation intersects with many other rays from other points within the visual representation to add to the cumulative light field at any particular point within the visual representation, so none of the rays are separable from the rest. In addition, the task of tracking and selecting from among all of the rays from all of the points in a scene is not currently possible. For other representations, e.g., 3D representations, one can typically easily combine various processes because a geometrical representation is embed within each representation of each point or object or region within a scene. For instance, one can combine 360° video with 3D meshes, for instance, because the 3D video is projected onto a 3D sphere and one can place items within or on this sphere to merge the content. For light fields, however, this is not the case. A light field is, by definition, the end result of a typical rendering pipeline (the rays that are sent towards the user's eyes), and as such are not embedded with such geometrical information during rendering.

A method, apparatus and a computer program product are provided for selective representation of portions of a scene using light fields and, more particularly, for extending a plenoptic function range to improve the light field calculation and image rendering by reducing the time and computational intensity of characterizing light rays for each portion of the rendered image. In do so, in some embodiments, an additional term (Ø) is added to the representation of the plenoptic function. As such, the plenoptic function is now:

$$L_S(x,y,z,\theta,\phi)=[R|\emptyset]$$

where x, y, and z are positional terms, θ and φ are the angles of the ray with respect to positional axes, R is the radiance if the ray is not a null ray, and Ø is a constant symbol denoting that the ray is a null ray.

Whereas the plenoptic function L(x, y, z, θ, φ) may typically return the radiance for most rays of the rendered image, by adding a so-called null radiance to denote that the plenoptic function is not defined for this ray, the return of a null radiance to the renderer can indicate that a different model needs to be used in order to generate an appropriate replacement for that ray. By extending the plenoptic function to include null-rays, a renderer or rendering engine can selectively represent parts of a scene by light fields, and other parts of the scene by other (e.g., more traditional) representations. In a hybrid light-field instantiation, the light field instantiator can often carry out a selection and interpolation step to initiate a requested ray. In an instance in which the neighborhood contains null-rays, an additional step can be introduced between the selection and the interpolation steps, during which step a decision can be made whether the interpolation is expected to be of sufficient quality. When the neighborhood consists, for instance, of 6 rays roughly at the same distance from the requested ray, and 5 of them are null-rays, it may be expected that the interpolation from that single ray will not be of sufficient quality and a null-ray can be returned instead of an interpolated ray. In such a case, a secondary renderer can be called upon to generate a radiance for this null-ray using alternative representations. The alternative representation is a representation of the part of the content which can be 'seen' by the null-rays. Some but not all representations for which this method can be used are 360° video, point clouds, mesh models, voxel models, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

In some embodiments an apparatus for generating light field data can comprise means, such as at least one processor and at least one memory including computer program instructions, configured to receive a signal, e.g., from one or more cameras and/or a synthetic light field generation source, the signal indicative of one or more light rays being defined by a plenoptic function comprising positional terms (x, y, z) and directional terms (θ, φ), generate one or more other light rays by extending the plenoptic function for the one or more other light rays to include a null ray term (Ø), provide the one or more light rays and the one or more other light rays as light field data to an output of said apparatus, and/or cause provision of an alternative representation of the one or more other light rays to the output of said apparatus. In some embodiments, the apparatus can include means, such as at least one processor or the like, for generating the alternative representation for the one or more other light rays to the output of the apparatus.

In some embodiments, the apparatus can comprise means, such as at least one processor or the like, for analyzing whether a light ray of a plurality of light rays has a nearest intersection with an object positioned greater than a predetermined distance from a virtual viewpoint and, in an instance in which the outcome of the analysis is affirmative, generate the one or more other light rays by extending the plenoptic function for the one or more further light rays to include the null ray term (Ø). In some embodiments, the apparatus can comprise means, such as at least one processor or the like, for analyzing whether a light ray of a plurality of light rays has a radiance value below a predetermined radiance and, in an instance in which the outcome of the analysis is affirmative, generate the one or more other light rays by extending the plenoptic function for the one or more further light rays to include the null ray term (Ø). In some embodiments, the apparatus can comprise means, such as at least one processor or the like, for analyzing whether a light ray of a plurality of light rays is associated with an object from the scene having a specularity below a predetermined specularity value and, in an instance in which the outcome of the analysis is affirmative, generate the one or more other light rays by extending the plenoptic function for the one or more further light rays to include the null ray term (Ø). In some embodiments, the apparatus can comprise means, such as at least one processor or the like, for analyzing, for a light ray in a light ray neighborhood, whether a variability value associated with the neighborhood is less than a predetermined threshold and, in an instance in which the outcome of the analysis is affirmative, generate the one or more other light rays by extending the plenoptic function for the one or more further light rays to include the null ray term (Ø).

Another or the same apparatus can comprise means, such as at least one processor or the like, for receiving the light field data output from the apparatus described above. In some embodiments, the apparatus can comprise means, such as at least one processor or the like, for analyzing the light field data to check for the presence of light rays having a plenoptic function including the null ray term (Ø), rendering the one or more light rays using a light field renderer, and/or rendering the one or more light rays using an alternative renderer.

As described herein, a method for generating light field data can comprise receiving a signal, the signal indicative of one or more light rays being defined by a plenoptic function comprising positional terms (x, y, z) and directional terms (θ, ϕ). In some embodiments, the method can comprise generating one or more other light rays by extending the plenoptic function for the one or more other light rays to include a null ray term (Ø). In some embodiments, the method can comprise providing the one or more light rays and the one or more other light rays as light field data to an output of said apparatus. In some embodiments, the method can comprise causing provision of an alternative representation of the one or more other light rays to the output of said apparatus. In some embodiments, receiving can be receiving a signal from one or more cameras or from a synthetic light field generation source.

In some embodiments, the method can comprise analyzing whether the one or more other light rays have a nearest intersection with an object positioned greater than a predetermined distance from a virtual viewpoint and, in an instance in which the outcome of the analyzing is affirmative, generating the one or more other light rays by extending the plenoptic function for the one or more other light rays to include the null ray term (Ø). In some embodiments, the method can comprise analyzing whether each of the one or more other light rays is associated with a light ray neighborhood having a variability value less than a predetermined threshold and, in an instance in which the outcome of the analyzing is affirmative, generating the one or more other light rays by extending the plenoptic function for the one or more further light rays to include the null ray term (Ø). In some embodiments, the method can comprise analyzing whether the one or more other light rays have a radiance value below a predetermined radiance and, in an instance in which the outcome of the analyzing is affirmative, generating the one or more other light rays by extending the plenoptic function for the one or more other light rays to include the null ray term (Ø). In some embodiments, the method can comprise analyzing whether the one or more other light rays are associated with an object within a scene having a specularity below a predetermined specularity value and, in an instance in which the outcome of the analyzing is affirmative, generating the one or more other light rays by extending the plenoptic function for the one or more other light rays to include the null ray term (Ø). In some embodiments, the method can comprise extending the plenoptic function for the one or more light rays to include a tag term (T). In some embodiments, the tag term (T) can be indicative of a light field characteristic of the one or more light rays.

As described herein, a method of rendering a new image of a scene can comprise receiving light field data for a plurality of light rays, a first portion of the plurality of light rays defined by a first plenoptic function comprising positional terms (x, y, z) and directional terms (θ, ϕ)) and a second portion of the plurality of light rays defined by a second plenoptic function comprising the positional terms (x, y, z) and directional terms (θ, ϕ)) and further defined by a null ray term (Ø). In some embodiments, the method can comprise, in an instance in which a light ray of the plurality of light rays is defined by the first plenoptic function, generating a light field representation of the light ray using a light field renderer. In some embodiments, the method can comprise, in an instance in which the light ray of the plurality of light rays is defined by the second plenoptic function, generating an alternative representation of the light ray using a second renderer. In some embodiments, the alternative representation can comprise at least one of a 360° video, a point cloud, a mesh model, a voxel model, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

In some embodiments, a method for rendering a new image of a scene can include, generally, receiving light field data for a plurality of rays from the scene, each of the plurality of rays being characterized using an extended plenoptic function comprising position, direction, and radiance information about the plurality of rays. The method can include determining whether interpolation of one or more rays from among the plurality of rays is expected to sufficiently improve a visual quality of the image of the scene. In an instance in which the one or more rays return a radiance value, the method can include interpolating the one or more rays and generating, using a first renderer, a light field representation of the one or more rays for the new image of the scene from the interpolated light field data. In an instance in which the one or more rays return a null radiance value, the method can include calculating a radiance for the one or more rays using a second renderer and generating an alternative representation of the one or more rays.

The method can include generating the light field data for the new image, the light field data comprising the extended plenoptic function for the plurality of rays at a plurality of locations in the scene, instantiating the plurality of rays, and testing the instantiated plurality of rays to determine whether interpolating the plurality of rays will sufficiently improve the visual quality of the new image of the scene. In the instance in which a first one or more rays return the radiance value, the method can include interpolating the one or more rays and generating, using the first renderer, the light field representation of the first one or more rays for the new image of the scene from the interpolated light field data. In the instance in which a second one or more rays return the null radiance value, the method can include calculating the radiance values for the second one or more rays and generating, using the second renderer, the alternative representation of the second one or more rays. The method can include compiling the new image of the scene using the light field representation of the first one or more rays and the alternative representation of the second one or more rays.

The method according to some embodiments can include an alternative representation having a representation type comprising at least one of a 360° video, a point cloud, a mesh model, a voxel model, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

In some embodiments, the second renderer, when instantiating the second one or more rays from among the plurality of rays, can create or be caused to create the alternative representation such that the alternative representation type is the same as a representation type of the light field representation. In some embodiments, the method can include storing and compressing the light field data. In some embodiments, the method can include filtering out light field data for which the alternative representation type is different from the light field representation type. In some embodiments, the method can include assigning a tag to a portion of the scene such that one or more rays of the plurality of rays can be selectively interpolated or represented by either the first renderer or the second renderer according to the tag. In some embodiments, the method can include determining a spatial variability of a neighborhood for each of the plurality of rays such that rays can be selectively interpolated or represented by either the first renderer or the second renderer based upon the spatial variability of the neighborhood. For instance, if the variability of the neighborhood is above or below a predetermined threshold, the tag can be used to return the null ray term (Ø) or otherwise instruct the instantiator as to whether an alternative representation or light field representation should be rendered for a particular requested light ray.

The method, such as described in multiple embodiments herein, but also according to other embodiments not described herein, can be carried out by an apparatus, system, device, or any suitable machine, such as described later in this disclosure. In some embodiments, an apparatus for rendering a new image of a scene can include a specialized computing device, e.g., at least one processor and at least one memory including computer program instructions, the specialized computing device configured to carry out a method such as described herein. For instance, the apparatus can be configured to render a new image of a scene. Generally, the apparatus can include at least one processor and at least one memory including computer program instructions. In some embodiments, the apparatus can be configured to receive a request to render a representation of a scene from a perspective, the representation comprising a plurality of light rays, each light ray of the plurality of light rays being defined by a plenoptic function comprising positional terms (x, y, z) and directional terms (θ, φ)). In some embodiments, the apparatus can be configured to, in an instance in which at least one of the positional terms or directional terms for one or more light rays of the plurality of light rays is not sufficiently defined, extend the plenoptic function for the one or more light rays to include a null ray term, the null ray term suitable to indicate that the one or more light rays including the null ray term should be excluded from the light field representation of the scene.

In some embodiments, the apparatus can be configured to, in an instance in which the positional terms and directional terms for one or more other light rays of the plurality of light ray are sufficiently defined, return one or more radiance values based upon the plenoptic function for the one or more other light rays. In some embodiments, the apparatus can be configured to render, using a primary renderer, a light field representation of the one or more other light rays based on the one or more radiance values. In some embodiments, the apparatus can be configured to render, using a secondary renderer, an alternative representation of the one or more light rays for which the plenoptic function is not fully defined. In some embodiments, the apparatus can be configured to instantiate the plurality of light rays. In some embodiments, the apparatus can be configured to test the instantiated plurality of light rays to determine whether light field representation of the plurality of light rays will sufficiently improve the visual quality of the new image of the scene.

In some embodiments, the apparatus can be configured to assign a tag value to at least a portion of the plurality of light rays by adding a tag term to the plenoptic function associated with a light ray characteristic. In some embodiments, the apparatus can be configured to, in an instance in which the tag value is not within a predefined range of acceptable tag values for light field representation, return the null ray term to indicate that the one or more light rays including the null ray term should be excluded from the light field representation of the scene. In some embodiments, the apparatus can be configured to filter the tagged light rays to eliminate light rays from the light field representation of the scene. In some embodiments, the apparatus can be configured to quantify light field variability within a neighborhood of each light ray from the plurality of light rays, wherein the tag term is indicative of the light field variability.

In some embodiments, the apparatus can be configured to, in an instance in which the positional terms and directional terms for one or more other light rays of the plurality of light ray are sufficiently defined, interpolate the one or more other light rays plurality of light rays and generate, using a light field renderer, a light field representation of the one or more rays for the new image of the scene from the interpolated light field data.

The apparatus can be configured to receive light field data for a plurality of rays from the scene, each of the plurality of rays being characterized using an extended plenoptic function comprising position, direction, and radiance information about the plurality of rays. The apparatus can be configured to determine whether interpolation of one or more rays from among the plurality of rays is expected to sufficiently improve a visual quality of the image of the scene. In an instance in which the one or more rays return a radiance value, the apparatus can be configured to interpolate the one or more rays and generate, using a first renderer, a light field representation of the one or more rays for the new image of the scene from the interpolated light field data. In an instance in which the one or more rays return a null radiance value, the apparatus can be configured to calculate a radiance for the one or more rays using a second renderer and generate an alternative representation of the one or more rays.

The apparatus can be configured to generate the light field data for the new image, the light field data comprising the extended plenoptic function for the plurality of rays at a plurality of locations in the scene, instantiate the plurality of rays, and test the instantiated plurality of rays to determine whether interpolating the plurality of rays will sufficiently improve the visual quality of the new image of the scene. In the instance in which a first one or more rays return the radiance value, the apparatus can be configured to interpolate the one or more rays and generate, using the first renderer, the light field representation of the first one or more rays for the new image of the scene from the interpolated light field data. In the instance in which a second one or more rays return the null radiance value, the apparatus can be configured to calculate radiance for the second one or more rays and generate, using the second renderer, the alternative representation of the second one or more rays. The apparatus can be configured to compile the new image of the scene using the light field representation of the first one or more rays and the alternative representation of the second one or more rays.

In some embodiments, an alternative representation can have a representation type comprising at least one of a 360° video, a point cloud, a mesh model, a voxel model, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

In some embodiments, the second renderer, when instantiating the second one or more rays from among the plurality of rays, can create or be caused to create the alternative representation such that the alternative representation type is the same as a representation type of the light field representation. In some embodiments, the apparatus can be configured to store and compress the light field data. In some embodiments, the apparatus can be configured to filter out light field data for which the alternative representation type is different from the light field representation type. In some embodiments, the apparatus can be configured to assign a tag to a portion of the scene such that one or more rays of the plurality of rays can be selectively interpolated or represented by either the first renderer or the second renderer according to the tag. In some embodiments, the apparatus can be configured to determine a spatial variability of a neighborhood for each of the plurality of rays such that rays can be selectively interpolated or represented by either the first renderer or the second renderer based upon the spatial variability of the neighborhood.

In some embodiments, an apparatus for rendering a new image of a scene can include means, such as a specialized computing device, e.g., at least one processor and at least one memory including computer program instructions, for carrying out a method such as described herein. For instance, the apparatus can include means, such as at least one processor or the like, for rendering a new image of a scene. The apparatus can include means, such as at least one processor or the like, for receiving light field data for a plurality of rays from the scene, each of the plurality of rays being characterized using an extended plenoptic function comprising position, direction, and radiance information about the plurality of rays. The apparatus can include means, such as at least one processor or the like, for determining whether interpolation of one or more rays from among the plurality of rays is expected to sufficiently improve a visual quality of the image of the scene. The apparatus can include means, such as at least one processor or the like, such that, in an instance in which the one or more rays return a radiance value, the one or more rays can be interpolated and further means, such as at least one processor or the like, can be used to generate a light field representation of the one or more rays for the new image of the scene from the interpolated light field data. The apparatus can include means, such as at least one processor or the like, such that, in an instance in which the one or more rays return a null radiance value, a radiance value can be calculate for the one or more rays and an alternative representation of the one or more rays can be generated.

The apparatus can include means, such as at least one processor or the like, for generating the light field data for the new image, the light field data comprising the extended plenoptic function for the plurality of rays at a plurality of locations in the scene, means, such as at least one processor or the like, for instantiating the plurality of rays, and means, such as at least one processor or the like, for testing the instantiated plurality of rays to determine whether interpolating the plurality of rays will sufficiently improve the visual quality of the new image of the scene. The apparatus can include means, such as at least one processor or the like, such that, in the instance in which a first one or more rays return the radiance value, the one or more rays can be interpolated and the light field representation of the first one or more rays for the new image of the scene can be generated from the interpolated light field data. The apparatus can include means, such as at least one processor or the like, such that, in the instance in which a second one or more rays return the null radiance value, radiance values for the second one or more rays can be calculated and the alternative representation of the second one or more rays can be generated. The apparatus include means, such as at least one processor or the like, for compiling the new image of the scene from at least the light field representation of the first one or more rays and the alternative representation of the second one or more rays.

In some embodiments, an alternative representation can have a representation type comprising at least one of a 360° video, a point cloud, a mesh model, a voxel model, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

In some embodiments, when instantiating the second one or more rays from among the plurality of rays, the apparatus or means, such as at least one processor or the like, for instantiating thereof can create or cause creation of the alternative representation such that the alternative representation type is the same as a representation type of the light field representation. In some embodiments, the apparatus can include means, such as at least one processor, the memory or the like, for storing and compressing the light field data. In some embodiments, the apparatus can include means, such as at least one processor or the like, for filtering out light field data for which the alternative representation type is different from the light field representation type. In some embodiments, the apparatus can include means, such as at least one processor or the like, for assigning a tag to a portion of the scene such that one or more rays of the plurality of rays can be selectively interpolated or the representation can be generated, according to the tag. In some embodiments, the apparatus can include means, such as at least one processor or the like, for determining a spatial variability of a neighborhood for each of the plurality of rays such that rays can be selectively interpolated or represented based upon the spatial variability of the neighborhood.

The method, such as described in multiple embodiments herein, but also according to other embodiments not described herein, can be carried out by a computer or other suitable apparatus, system, device, or machine, according to commands and instructions provide by a computer program product and associated computer code. In some embodiments, a computer program product can be configured to render a new image of a scene. In some embodiments, the computer program product can include at least one non-transitory computer-readable storage medium bearing computer program instructions embodied therein for use with a computer. In some embodiments, the computer program instructions including program instructions, when executed, can cause the computer at least to receive light field data for a plurality of rays from the scene, each of the plurality of rays being characterized using an extended plenoptic function comprising position, direction, and radiance information about the plurality of rays. The computer program code can further cause the computer to determine whether interpolation of one or more rays from among the plurality of rays is expected to sufficiently improve a visual quality of the image of the scene. In an instance in which the one or more rays return a radiance value, the computer program code can cause the computer to interpolate the one or more rays and generate, using a first renderer, a light field representation of the one or more rays for the new image of the scene from the interpolated light field data. In an instance in which the one or more rays return a null radiance value, the computer program code can cause the computer to calculate a radiance for the one or more rays using a second renderer, and to generate an alternative representation of the one or more rays.

In some embodiments, the computer program code can cause the computer to generate the light field data for the new image, the light field data comprising the extended plenoptic function for the plurality of rays at a plurality of locations in the scene, instantiate the plurality of rays, and test the instantiated plurality of rays to determine whether interpolating the plurality of rays will sufficiently improve the visual quality of the new image of the scene. In the instance in which a first one or more rays return the radiance value, the computer program code can cause the computer to interpolate the one or more rays and generate, using the first renderer, the light field representation of the first one or more rays for the new image of the scene from the interpolated light field data. In the instance in which a second one or more rays return the null radiance value, the computer program code can cause the computer to calculate radiance for the second one or more rays and to generate, using the second renderer, the alternative representation of the second one or more rays. The computer program code can further cause the computer to compile the new image of the scene using the light field representation of the first one or more rays and the alternative representation of the second one or more rays.

In some embodiments, the alternative representation can have a representation type comprising at least one of a 360° video, a point cloud, a mesh model, a voxel model, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

In some embodiments, the computer program code can cause the computer, when instantiating the second one or more rays from among the plurality of rays, to create the alternative representation such that the alternative representation type is the same as a representation type of the light field representation. In some embodiments, the computer program code can cause the computer to store and/or compress the light field data. In some embodiments, the computer program code can cause the computer to filter out light field data for which the alternative representation type is different from the light field representation type. In some embodiments, the computer program code can cause the computer to assign a tag to a portion of the scene such that one or more rays of the plurality of rays can be selectively interpolated or represented by either the first renderer or the second renderer according to the tag. In some embodiments, the computer program code can cause the computer to determine a spatial variability of a neighborhood for each of the plurality of rays such that rays can be selectively interpolated or represented by either the first renderer or the second renderer based upon the spatial variability of the neighborhood.

In some embodiments, a renderer that generates the data used to drive a display (this might be a 2D display, VR/AR goggles, or a full light field display) can then be adapted based upon the extended plenoptic function in order to render a scene based primarily but not exclusively upon light field data. In this case, the light field data generated according to the extended plenoptic function can be called selective light field data and can consist of a light field that can output radiance, but also the null-ray symbol Ø if the radiance is not available.

FIG. 3 illustrates an embodiment of an apparatus 200 configured to carry out the methods described herein, for instance, to selectively represent light fields for some rays of a scene and represent other rays according to conventional approaches. As illustrated, the apparatus 200 can include a computing device 210 that includes at least one processor 211 configured to carry out the method with at least one memory 212. In some embodiments, the memory 212 can include a computer program 213, such as in the form of computer program code 214 configured to instruct the processor 211 to carry out the method. In some embodiments, the computing device 210 can include a user interface 215 configured to allow a user to input commands, such as to initiate the computer program 213 to cause the processor 211 and memory 212 to carry out the a method, such as described herein.

In some embodiments, the apparatus 200 can include a second computing device 220, such as a processor, a memory, a server, a cloud computing environment, combinations thereof, or the like. In some embodiments, the second computing device 220 can include an instantiator 221, a light field rendering engine 222, a light field database 223, and/or an alternative rendering engine 224. Alternatively, in some embodiments, the computing device 210 can include the instantiator 221, the light field rendering engine 222, the light field database 223, and/or the alternative rendering engine 224. The instantiator 221 can include a computer program, software, computer logic, a mathematical model, an algorithm, a rendering platform, a visual display software, combinations thereof, or the like.

The instantiator 221 can be configured to initiate and control, at least in part, the creation of digital objects in a visual representation of a virtual or augmented reality scene. In some embodiments, the memory device 212 can cause the processor 211 to cause the instantiator 221 to request one or more light rays for a particular perspective of a visual scene in a digital environment. In some embodiments, the light field rendering engine 222 can use the light rays requested by the instantiator 221 to render a light field representation of objects in a new image of the scene. In some embodiments, the light field database 223 can be configured to house data related to objects in the scene, light sources in the scene, light rays at particular points within the scene, object material characteristics, object and surface reflectivity, and the like.

In some embodiments, the computing device 210 or a component thereof, such as the processor 211, can cause the instantiator 221 to retrieve light field data related to a particular one or more rays from the light field database 223 and deliver the retrieved light field data to the light field rendering engine 222. In some embodiments, for example if the instantiator 221 retrieves light field data for a ray that has or has been assigned a null radiance (a null ray), the instantiator 221, the processor 211 or another such component of the apparatus 200 can cause the alternative rendering engine 224 to calculate a radiance value for the null ray and render a mathematical and/or visual representation of the null ray. The apparatus 200 or a component thereof, can further compile light field representations and the alternative representations into a combined representation of the scene and each object within the scene for the new image of the scene from the particular perspective.

The apparatus 200 or components thereof can carry out such processes and methods once, more than once, iteratively at timed intervals, according to a set schedule, or in response to a change in a convent viewer's perspective, posture, line of sight, or the like. The methods, processes, approaches, calculations, retrievals, receptions, or other actions disclosed herein can be cause to be carried out by any suitable component of the apparatus 200, for instance by the processor 211, at the command of specialized computing devices such as the instantiator 221, the light field rendering engine 222, the alternative rendering engine 224, the computer program 213, in response to a direct command from a user via the user interface 215, in response to receiving a wireless or wired signal indicative of a command to initiate the methods, processes, approaches, calculations, retrievals, receptions, or other actions, or the like. For instance, the apparatus 200 can include a receiver (not shown), such as an antenna, a transceiver, a wired input, a communications cable, a graphics processor, an audio processor, or any other such equipment or devices.

The light field representation, alternative representation, compiled representation of the new image of the scene from the particular perspective, and any other digital or mathematical content can be stored in the memory 212, for instance by the processor 211 at the command of specialized computing devices such as the instantiator 221, the light field rendering engine 222, the alternative rendering engine 224, the computer program 213, in response to a direct command from a user via the user interface 215, in response to receiving a signal indicative of a command to store the content in the memory 212, or the like.

In some embodiments, the apparatus 200 can include a user display 230 configured to display visually information related to the method be carried out, such as a visual representation of the scene. In some embodiments, the user display 230 can be housed nearby or within the apparatus 200, can be a remote display, can include a plurality of displays, can be a heads-up display or headset, can be a computer or television screen, or can be or include any other suitable equipment or devices. In some embodiments, the user display 230 can be configured to track viewer/wearer/user use of the user display 230 and/or reception of displayed content, e.g., the selective light field representation of the scene from the particular perspective or a series of such selective light field representations of the scene viewed over time from a series of changing perspectives corresponding to the viewer's/wearer's/user's orientation and/or line of sight. In other words, the user display 230 can collect or be caused to collect, for instance by the processor 211, user data related to consumption of the content.

In some embodiments, such collected user data can be used to set the particular perspective for the apparatus 200 to instantiate and render the representations for the new image of the scene. In some embodiments, the user display 230 can include a sensor, a circuitry, a processor, a memory device, and/or the like, configured to capture and interpret user orientation and/or line of sight, attentiveness, interest in a particular perspective, object, or depth of field, or the like. In some embodiments, the user of the apparatus 200, e.g., the user interface 215, can be a different user than the user of the user display 230. In some embodiments, the viewer of the finished images or video of the scene based upon selective light field representations can be different from the user of the apparatus 200, the user of the user interface 215, the initiator of the methods described herein (which may also be automated), and/or the user of the user display 230.

FIG. 4 illustrates a method 10 for generating selective light field data for a plurality of rays in a scene, according to an embodiment. The method 10 can include Receiving a request to render a representation of a scene from a particular perspective, the representation comprising a plurality of light rays, each light ray of the plurality of light rays being defined by a plenoptic function comprising positional terms $(x, y, z)$ and directional terms $(\theta, \phi)$, at 11. The method 10 can include, in an instance in which at least one of the positional terms or directional terms for one or more light rays of the plurality of light rays is not sufficiently defined, extending the plenoptic function for the one or more light rays to include a null ray term, the null ray term suitable to indicate that the one or more light rays including the null ray term should be excluded from the light field representation of the scene, at 12. The plenoptic function can be extended by adding a null ray term $\emptyset$, such as described hereinbelow.

In some embodiments, the method 10 can, optionally, include, in an instance in which the positional terms and directional terms for one or more other light rays of the plurality of light ray are sufficiently defined, returning one or more radiance values based upon the plenoptic function for the one or more other light rays, at 13. In some embodiments, the method 10 can, optionally, include rendering, using a primary renderer, the one or more other light rays based on the one or more radiance values, at 14. In some embodiments, the method 10 can, optionally, include rendering, using a secondary renderer, the one or more light rays for which the plenoptic function is not fully defined, at 15.

FIG. 5 illustrates a method 20 for selecting between light field representation and conventional representation of a light ray in a scene based upon the estimated effect on rendered representation quality. The method 20 can include receiving light field data for a plurality of rays from the scene, each of the plurality of rays being characterized using an extended plenoptic function comprising position, direction, and radiance information about the plurality of rays, at 21. The method 20 can include determining whether interpolation of one or more rays from among the plurality of rays is expected to sufficiently improve a visual quality of the image of the scene, at 22. In an instance in which the one or more rays return a radiance value, the method 20 can, optionally, include interpolating the one or more rays and generating, using a first renderer, a light field representation of the one or more rays for the new image of the scene from the interpolated light field data, at 23. In an instance in which the one or more rays return a null radiance value, the method 20 can, optionally, include calculating a radiance for the one or more rays using a second renderer and generating an alternative representation of the one or more rays, at 24.

FIG. 6 illustrates a method 30 for selecting between light field representation and conventional representation of light rays in a scene based upon the estimated effect on rendered representation quality. In some embodiments, the method 30 can include generating the light field data for the new image, the light field data comprising the extended plenoptic function for the plurality of light rays at a plurality of locations in the scene, at 31. In some embodiments, the method 30 can include instantiating the plurality of light rays, at 32. In some embodiments, the method 30 can, optionally, include testing the instantiated plurality of light rays to determine whether light field representation of each light ray of the plurality of rays will sufficiently improve the visual quality of the new image of the scene, at 33. In an instance in which light field representation of a first one or more light rays will improve the visual quality of the new image of the scene, the method 30 can include generating, using a first renderer, the light field representation of the first one or more light rays for the new image of the scene from the light field data, at 34. In the instance in which a second one or more rays return the null ray term, the method 30 can, optionally, include calculating the radiance values for the second one or more rays and generating, using a second renderer, an alternative representation of the second one or more light rays, at 35. The method 30 can, optionally, include compiling the new image of the scene using the light field representation of the first one or more light rays and the alternative representation of the second one or more light rays, at 36. The method 30 can, optionally, include assigning a tag to one or more light rays of the plurality of light rays, an object in the scene, or a region within the scene such that one or more rays of the plurality of rays can be selectively interpolated or represented by either the first renderer or the second renderer according to the tag, at 37.

Referring now to FIGS. 7A and 7B, an approach 300 for light field instantiation using selective light field data 330, similar to the methods 10, 20, 30 described above. According to some embodiments of the approach 300, a display controller 310 can request a particular ray (e.g., ray L) and a light field instantiator 320 (instantiator 320) will try to instantiate the requested ray. The light field data or a filter for analyzing, processing, instantiating, and/or rendering light rays using said light field data can be configured such that the plenoptic function for each light ray at each position within the scene can be extended to include a null ray term. By doing so, the plenoptic function can return a radiance value or the null ray term as appropriate. This light field data that is selectively renderable based upon light field representation or an alternative representation by one or more renderers can comprise the selective light field data 330.

As compared to the conventional approach 100, however, a neighborhood of the requested ray according to approach 300 can contain both rays having a radiance and rays having an insufficiently defined plenoptic function (e.g., null-rays). In some embodiments, a determining step 350 can be introduced between the light field instantiator 320 and the alternative representation renderer 360. In some embodiments, the determining step 350 can be carried out by a computing device, such as the apparatus 200. In some embodiments, the system or apparatus (e.g., 200) can include means, such as a processor and a memory device, for deciding whether interpolation of the requested ray L will expected to be of sufficient quality during the determining step 350. As described herein, the nearest neighbor approach can be used, where the neighborhood surrounding a requested light ray is analyzed to determine if a nearby light ray can be used to render the requested light ray. If, for instance, the neighborhood consists of six rays, each of the six rays positioned roughly at the same distance from the requested ray, and five of them are null-rays, it might be decided 350 that the interpolation of the ray L radiance from the single light ray in the neighborhood that is not a null ray will not provide a light field representation having sufficient quality, and a null-ray may be returned for the requested light ray, e.g., by the light field instantiator 320, in response to determining 350 instead of rendering the requested ray L using selective light field data 330.

In some embodiments, when the light field instantiator 320 instantiates (calls up) the selective light field data 330, a test can further be carried out as part of the step to determine 350 whether the requested ray is a null-ray. Additionally or alternatively, in some embodiments, when the light field instantiator 320 or a corresponding light field rendering engine (e.g., 222) creates, renders, causes creation of, or causes rendering of a representation based upon light field data 330, a test can further be carried out as part of the step to determine 350 whether the requested ray L can be interpolated based upon values and variability of values in the neighborhood of the requested ray L. If the ray is null or if variability is sufficiently high, a secondary renderer 360 (alternative representation renderer 360) can be called upon, e.g., by the computing device 210 or a component thereof, to alternatively generate a radiance for this null-ray using alternative and/or conventional techniques to eventually render an alternative representation 370, such as described elsewhere herein. As such, the mechanism by which it is decided 350 whether a ray is null or not is embedded within the light field and can be of arbitrary complexity. Without wishing to be bound by any particular theory, this may allow for more flexibility than the conventional or light field only approaches. In some embodiments, the alternative representation 370 can be a representation of the part of the content which can be 'seen' by the null-rays. When using null-rays for bandwidth/processing optimization, the alternative representation 370 can typically contain a lower quality version of select portions of the content and may therefore be represented within the same reference domain. In some embodiments, the rendering apparatus 360 or other rendering apparatus can then use the requested ray light field data 330 'as is' because the ray is defined within the same domain as the alternative representation 370. If this is not the case, an additional transformation of the ray may be carried out to configure this ray representation such that it conforms or can be compiled with the alternative representation 370.

In some embodiments, alternative representations 370 can include 360° video, point clouds, mesh models, voxel models, or even other light field data from, e.g., a different light field source, e.g., having a lower quality or, e.g., of another scene or object from the scene, from a different source. This may present a simple way for mixing several light field data into a single image or video, and is a simpler approach than the conventional approaches that rely upon solely light field representation of all light rays for the full image or video.

When a certain ray is requested to the alternative representation renderer 360, this renderer 360 can render a representation having a particular desired representation type. When the use case results in the request of many null-rays in the same area (e.g., filtering out complete objects from the light field in order to use alternative representations to represent them), one can employ rasterized rendering as this allows for grouping many rays together and render them at once. This is the approach that is also typically used for real-time rendered applications and is quite efficient. When the use case would result in spatially sparser null-rays requests however (e.g. when the alternative representation as a backup in case a portion of the light field data is not available yet), one could employ a ray tracing rendering approach instead since ray tracing rendering is often more efficient for singular rays. Regardless of the rendering approach, however, the alternative representation renderer 360 can create a radiance for the null-ray and this is sent to the display controller 310.

In contrast to the approach 100 illustrated in FIG. 2B, the approach 300 illustrated in FIG. 7B results in lower computational complexity and less bandwidth requirements, among other benefits. As illustrated, the approach 300 is shown illustratively from two different perspectives 2010a, 2010b within a scene 2000, representing two different perspectives of the same three objects 2020a, 2020b, 2020c. As illustrated, the objects 2020a, 2020b, 2020c have, respectively, high specularity, medium specularity, and low specularity. From the first perspective 2010a, a first projection line 2030a is formed based upon returned radiance values for rays associated with the objects 2020a, 2020b, 2020c, sampled from the first perspective 2010a. From the second perspective 2010b, a second projection line 2030b is formed based upon returned radiance values for rays associated with the objects 2020a, 2020b, 2020c, sampled from the second perspective 2010b.

In some embodiments, the approach 300 can eliminate specific rays, objects, or regions of the scene 2000 based upon an insufficient characterization of the plenoptic function or based upon another such metric, such that a null ray term is returned and the instantiator causes a secondary renderer to render an alternative (non-light field) representation of the requested ray. For instance, the low specularity object 2020c, the region defined by or surrounding the low specularity object 2020c, or specific rays associated with the low specularity object 2020c can be eliminated from the light field representation such that light field data 330 need not be characterized for these objects and elements, but rather null rays are returned and the secondary renderer 360 is called upon to render the object 2020c using an alternative rendering technique. Herein, objects, regions of the scene, and specific rays are described in particular embodiments as being eliminated from the light field representation—one of skill in the art will understand that these terms are used interchangeably to indicate, respectively, rays associated with the objects, rays associated with the regions of the scene, or the specific rays.

In some embodiments, the object orientation of the low specularity object 2020c, for which light rays were needlessly rendered using light field data in the approach 100 illustrated in FIG. 2B, can be maintained such that an alternative representation of the object 2020c and/or other portions of the scene 2000 can be compiled with the light field representation rendered according to the approach 300. In some embodiments, the secondary renderer 360 can then be called upon to render the object having null rays, e.g., 2020c, independent of the primary renderer that is called upon to render the medium specularity object 2020b and the high specularity object 2020a. Additionally or alternatively, the gradation of specularity can include more or less grades of specularity and/or can be a binary indication of availability of a radiance value for the particular ray. In terms of the second perspective 2010b, it was decided 350, e.g., during or following instantiation by the light field instantiator 320, that the high specularity object 2020a and low specularity object 2020c should be represented in the light field while the medium specularity object 2020b returned null rays to the second projection line 2030b. Thus, according to the example embodiment of FIG. 7B, new images of the scene rendered from the first perspective 3010a will include light field representations of objects 2020a and 2020b but an alternative representation of object 2020c. However, new images of the scene rendered from the second perspective 2010b will include light field representations of objects 3020a and 3020c but an alternative representation of object 2020b.

In some embodiments, representing select objects or portions of a scene 2000 using an alternative representation approach may optimize rendering the new image of the scene 2000 in terms of bandwidth use and/or processing speed/complexity. As previously mentioned, transmission of light field data and light field representations requires a lot of bandwidth due to the highly sampled nature of light field representation in all dimensions. While a 3D mesh with local rendering doesn't take additional bandwidth when moving the viewpoint, this is not the case with a light field representation. For light field representation, each of the rays needs to be distributed and rendered each time the perspective or viewpoint changes.

In some embodiments, the selective light field approach 300 utilizes a plurality of sampling locations and accounts for null rays by calling upon a second renderer, e.g., the alternative representation renderer 360, to render the null rays according to a conventional approach.

By way of example only, only two sampling points 2010a, 2010b for only a portion of a scene 2000 are illustrated in FIG. 7B, however a full scene could include many additional sampling points. As illustrated in FIG. 7B, the first perspective 2010a is relatively close to the medium specularity object 3020b and high specularity object 2020a, and these objects 2020a, 2020b are thus represented by the light field data, e.g., according to method 10, method 20, method 30, and/or approach 300, because that is where the light field representation truly shines. Null rays are returned for the low specularity object that is too far from the viewpoint to benefit from light field rendering. The viewpoint that belongs to slice (3) is closer to this low specularity object, and it was deemed close by a computing device carrying out the described approach to warrant its inclusion within the light field data since not doing so would reduce the quality of the scene too much. Instead, the rays belonging to the medium specularity object have been replaced by null rays because the computing device determined that the viewpoint was far enough from this object such that conventional rendering of the medium specularity for the third perspective would not unnecessarily affect scene quality. As illustrated in FIG. 7B, both sampling events utilize selective light field instantiation and thereby eliminating the need to render objects that are low specularity, positioned further from the perspective for the sampling event, and/or for which rendering without using light field data will not sufficiently degrade scene quality to the extent that the object should be included in the light field in order to achieve sufficient scene quality. The use of null rays, therefore, can enable avoidance of full scene light field instantiation and rendering, reducing computational complexity and bandwidth requirements.

As illustrated in FIG. 7A, the various blocks and process steps support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Accordingly, approaches described herein can be carried out fully or partially by an apparatus comprising specialized computing device(s) configured to select between alternative renderers based upon the plenoptic function of light field data. In some embodiments, the apparatus can comprise a processor (and/or co-processors or any other circuitry assisting or otherwise associated with the processor), the processor being in communication with a memory device, e.g., via a bus, for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with some embodiments. For example, the memory device could be configured to buffer input data for processing by the processor. Additionally or alternatively, the memory device could be configured to store instructions for execution by the processor.

In some embodiments, any of the approaches, methods, or embodiments described herein can be carried out by a specialized computing device or caused to be carried out by a specialized computing device according to one or more algorithms. In some embodiments, algorithms such as volume ray tracing algorithms, ray casting algorithms, scanline rendering algorithms, beam tracing algorithms, cone tracing algorithms, distributed ray tracing algorithms, global illumination algorithms, Gouraud shading algorithms, phong shading algorithms, progressive refinement algorithms, shading algorithms, specular reflection algorithms, or the like. In some embodiments, a method for producing visual images constructed in 3D computer graphics environments can include an algorithm for modeling the light field with more photorealism. Briefly, the computing device can trace or cause tracing of a path from the user's virtual "eyes" through each pixel in a virtual screen, and can calculate the color of the object visible through it. Scenes can then be described mathematically by the computing device, for instance using an algorithm. Scenes may also incorporate data from images and models captured by means such as digital photography. The computing device can then test or be caused to test for intersection with some subset of the objects in the scene. Once the nearest object has been identified, the computing device can use the algorithm to estimate the incoming light at the point of intersection, examine the material properties of the object, and combine this information to calculate the final color of the pixel. Certain illumination algorithms and reflective or translucent materials may require more rays to be re-cast into the scene.

The apparatus may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor may be configured to execute instructions stored in the memory device or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an audio processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Representations described herein rendered according to various embodiments of the methods disclosed can be compiled to generate the new image of a scene. Such representations can be digital in nature and can be transmitted to a user's device, a network, a display, or the like. One or more communication nodes (e.g., the computing device) such as mobile terminals or fixed computer terminals may be in communication with each other via a network and each may include an antenna or antennas for transmitting signals to and for receiving signals from a base site (e.g., an access point), which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the communication nodes. In some embodiments, the network may employ one or more mobile access mechanisms such as wideband code division multiple access (W-CDMA), CDMA2000, global system for mobile communications (GSM), general packet radio service (GPRS), long term evolution (LTE) and/or the like may be supported.

In some embodiments, communications can include transmission of representations, such as via signals sent and/or received by the computing device. In some embodiments, signal transmission can include signaling information in accordance with an air interface standard of an applicable cellular system, and/or any number of different wireline or wireless networking techniques, comprising but not limited to Wi-Fi, wireless local area network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the computing device may be capable of operating in accordance with fourth-generation (4G) or fifth-generation (5G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the computing device may be capable of operating according to Wi-Fi or Worldwide Interoperability for Microwave Access (WiMAX) protocols.

FIGS. 8A-8B illustrate alternative approaches for how light field data can be stored, constructed, and/or used in the approach according to some embodiments. For instance, the light field data can be filtered by a light field filter to filter out the light field data that will not be used due to the presence of a null ray term value and/or the use of an alternative approach to render the corresponding rays. As the shape of the object that needs to be ingested is already known, rays can be removed from the light field that will not be seen because they are occluded by the object. The light field can thus become more sparse, saving bandwidth and computational complexity while allowing other objects to be included, such as according to the approach illustrated in FIG. 9. In some embodiments, the selection and instantiation process can be iterated over each of the required rays in the light field and determine whether the ray intersects with the given 3D object. In such embodiments, if the ray intersects with the given 3D object, a null ray is returned in the resulting selective light field $L_s(x, y, z, \theta, \phi)=\emptyset$. In such embodiments, if the ray does not intersect with the given 3D object, the original light field data $L_s(x, y, z, \theta, \phi)=R$ will be used for this ray.

As illustrated in FIG. 8A, a first example starts with pure light field (e.g., a light field without null rays), at 430a. A light field filter 430b applies an operation to replace rays from the light field data 430a with null rays. In this particular example, where a synthetic object is to be inserted into the light field, the filtering operation can use the knowledge of the synthetic object to remove rays that will not be used because they are occluded by the synthetic object. In general, however, the light field filter 430b can use various selection procedures to filter out actual rays and replace them with null rays. For example, according to some embodiments, the light field filter 430b may analyze the variability in the ray data to determine the 'usefulness' of the representation, such as described in the section above titled 'Selective Light Field Rendering'. Once the light field data 430a is filtered 430b to replace actual light ray data with a null ray, selective light field data 430c is generated for use in generating or rendering the new image of the scene.

As illustrated in FIG. 8B, a second example starts from synthetic content 530a (e.g., the digital assets from an animation movie) and uses these digital assets to determine which rays should be null-rays and which rays shouldn't. Digital assets with materials that are largely diffuse (as opposed to a highly specular material) at medium viewing distance would be a suitable candidate for being represented by null rays, for instance, as does any asset that is far away. Because the digital assets are available, one can accurately predict the impact of a light field versus the alternative representations and an accurate selective light field 530c can thus easily be constructed by a sparse light field renderer 530b. An example of a practical implementation of this could be to make a decision based on the object material that was used to create each of the light field elements (which is known in typical synthetic content). By way of example only, when $L_s(x, y, z, \theta, \phi)$ is influenced by a highly specular material, for instance for an object at a reasonable distance, the light field data and radiance value will be returned rather than returning a null ray for this data. If it was influenced by a diffuse material on the other hand at further than a reasonable distance, the null ray will be returned rather than light field data and a radiance value. In other words, as described above, an apparatus can comprise means, such as at least one processor or the like, for determining whether the nearest object with which the light ray intersects is positioned less or greater than a predetermined distance from a virtual viewpoint for the image. In some embodiments, the apparatus can be configured to extend the plenoptic function to include the null ray term (Ø) if a light ray is requested that intersects with a nearest object positioned beyond the predetermined distance from the virtual viewpoint as light field representation of that light ray may not improve rendered image quality sufficiently to warrant light field representation. Likewise, the distance between the origination point (x, y, z) of the light ray with regard to either the nearest intersected object or the virtual viewpoint can be used in determining when a light ray is represented in the light field or an alternative representation.

FIG. 9 illustrates an approach for rendering a scene using selective light field data generated by filtering a 3D object. Light fields represent a very promising way of delivering photorealistic 6DOF content to the end-users. The characteristics of a light field enable advanced effects to be visualized without the need for advanced rendering on the end-user device. However, it can be difficult to fully capture a light field of a typical real-world scene. Typically, either a static scene, or a huge amount of cameras are required to fully capture a light field of a typical real-world scene. Neither approach is very practical. As such, it is expected that the combination of light fields with other representations will be important. By using the methods, approaches, apparatuses, and computer products described herein, the composition of a light field with alternatively represented models is enabled for the first time. An example of the original light field scene 630, a 3D mesh object to be rendered in the scene 633 and the resulting composite scene 680 is illustrated in FIG. 10. In order to selectively render the scene using light rays while rendering the low specularity 3D mesh object 633 using alternative rendering approaches, null rays are injected into the light field where the alternative representation should be used (e.g., according to the approach of FIG. 9), and the composite scene 680 is created, e.g., at the time of rendering.

By replacing portions of the light field rays with null-rays, one can significantly reduce the number of light field rays that need to be transmitted. One does off course need to transmit the alternative representation, however this representation typically does not need to be highly detailed (both in geometry and texture) because it is either only seen from afar (as a nearby object is typically included in the light field) or can be sufficiently represented using a conventional rendering approach. One can, for instance, heavily reduce the amount of light rays rendered and transmitted by creating a 360 image or video of the background and returning null rays for each of the light rays representing this background. For instance, as illustrated in FIG. 12, a light field scene 680 and 360 image 633 mapped onto a sphere are provided for illustrative purposes only and are not considered representative of actual content and/or rendered scenes. One can create the 360 image 633 of the scene from a perspective or viewpoint that is far away and contains a minimal amount of reflections while the remaining objects from the scene can be encoded in the selective light field 630, such as according to the methods 10, 20, or 30.

Null-Rays with Tags

Sometimes, for a particular sampled viewpoint, an object may have a low specularity but be positioned relatively close to the viewer or an object can have a higher specularity but be further from the viewer for the sampled viewpoint. In such embodiments, the computing device such as a rendering engine might instantiate the scene from that particular viewpoint and identify a distant, higher specularity object as being required to be rendered using light field data, when there may actually be little benefit to light field rendering of the distant object. Likewise, the rendering engine might instantiate the scene from that particular viewpoint and identify a nearby, lower specularity object as not being required to be rendered using light field data, and would assign a null radiance value to the rays corresponding to that object, when there may actually be large relative benefit to light field rendering the nearby object. Therefore, it can be helpful to tag specific light rays, regions of a scene, or objects within the scene, for each perspective or viewpoint, in order to either force or disallow rendering an object using light field data based upon distance, occlusion, light source(s) position(s), and/or other factors. In some embodiments, tags for light rays, objects, and/or regions within a scene can change depending upon the perspective, viewer location, angle of viewing, etc. The reasoning for using tags, at least in part, can be that tags allow for a finer granularity in deciding whether to return a null ray or not. Without tags, the decision regarding light field representation or returning a null ray is typically binary. With tags, the decision regarding light field representation or returning a null ray can include using tags to encode a certain metric that allows for a more gradual or nuanced decision about whether to use the light field data or return a null ray.

In some embodiments, the plenoptic function can be further extended to include a tag T, such that the plenoptic function is as follows:

$$L_{S,T}(x,y,z,\theta,\phi,T).$$

This tag can be used as a selector for the content. For example, in some embodiments, if the ray with a certain tag T is not defined, the null ray is returned. In some embodiments, the tag T can provide a gradient by which a metric or parameter of the light ray (e.g., positional, directional, radiance, etc.) can be rendered as a light field representation or an alternative representation. For instance, in some embodiments, a ray can have a tag T associated with a distance from a viewpoint such that, from a first, second and third viewpoint the tag T is about 7, about 5, and about 3, respectively. In such an embodiment, if there is a predetermined cutoff for the distance from viewpoint parameter of 4, meaning rays having a position closer than or equal to a distance score of 4 are included in the light field representation, then the ray would be rendered according to an alternative representation for viewpoints one and two but included in the light field representation for viewpoint three. In some embodiments, the tag can be used to segment the scene using various criteria. One such criterion could be the 'usefulness' of the light field. In some embodiments, T==1 could mean very useful (e.g., lots of specularity in a nearby object), while T==10 could mean a far object and/or an object with little specularity. As described herein, the tags are viewpoint specific, meaning that a ray, object, or region of a scene assigned a certain tag for a certain viewpoint does not necessarily mean that same tag will hold for the same ray, object, or region of the scene when rendered for a different viewpoint. Among other reasons, this can be because the distance from the ray, object, or region of the scene may be a factor that influences the 'usefulness' of the light field, and is thus reflected in the corresponding tag. In other words, as a viewer's viewpoint changes and new images of the scene are rendered according to the approaches and methods described herein, any tags used can be different for each perspective or viewpoint.

In some embodiments, an apparatus, such as described herein, can comprise means, such as at least one processor or the like, for extending the plenoptic function for the one or more light rays of the plurality of light rays to include a tag term (T). In some embodiments, the tag term (T) can be indicative of a light field characteristic of the one or more light rays of the plurality of light rays. In some embodiments, the apparatus can comprise means, such as at least one processor or the like, for, in an instance in which the tag value is not within a predefined range of acceptable tag values for light field representation, generating and returning the null ray term (Ø). In some embodiments, the apparatus can comprise means, such as at least one processor or the like, for quantifying light field variability within a neighborhood of each light ray from the plurality of light rays, wherein the tag term is indicative of the light field variability. In some embodiments, the apparatus can comprise means, such as at least one processor or the like, for, in an instance in which the tag value is not within a predefined range of acceptable tag values for light field representation, returning the null ray term (Ø) to indicate that the one or more light rays for which the null ray term (Ø) was returned should be excluded from a light field representation of the scene. In some embodiments, the apparatus can comprise means, such as at least one processor or the like, for quantifying light field variability within a neighborhood of each light ray from the plurality of light rays, wherein the tag term is indicative of the light field variability.

As illustrated in FIG. 12, for a first viewpoint 3010a and a second viewpoint 3010b of portions of a scene 3000, viewpoint dependent tags can be applied to particular rays, objects within the scene 3000, or regions of the scene 3000. For the first viewpoint 3010a, the rays associated with objects 3020a, 3020b, and 3020c, which may be the same or different from objects 2020a, 2020b, 2020c, can be reflected As illustrated, the use of tags is shown illustratively from two different perspectives 3010a, 3010b within a scene 3000, representing two different perspectives of the same three objects 3020a, 3020b, 3020c. As illustrated, the objects 3020a, 3020b, 3020c have been tagged and/or rays associated with the objects have been tagged such that a further extended plenoptic function can be used, which includes a tag T such as described above. From the first perspective 3010a, a first projection line 3030a is formed based upon returned radiance values from the objects 3020a, 3020b, 3020c sampled from the first perspective 3010a. From the second perspective 3010b, a second projection line 3030b is formed based upon returned radiance values from the objects 3020a, 3020b, 3020c sampled from the second perspective 3010b.

In some embodiments, the approach 300 can eliminate rays based upon a tag value applied such that light field data need not be characterized for these objects and elements, but rather null rays are returned and the secondary renderer is called upon to render the eliminated rays using an alternative rendering technique. The tag T can be associated with a region of the scene 3000, with objects 3020a, 3020b, 3020c within the scene 3000, or with specific rays. As illustrated in FIG. 12, from the first perspective 3010a, the first object 3020a has been assigned a tag T=2, the second object 3020b has been assigned a tag T=4, and the third object 3020c has been assigned a tag T=8. From the second perspective, 3010b, the first object 3020a has been assigned a tag T=3, the second object 3020b has been assigned a tag T=7, and the third object 3020c has been assigned a tag T=3. The tags and objects are for illustrative purposes only. There can be more and different objects within a scene 3000 and tags T can be any number or value or term sufficient to provide a filtering process with a term that can be used to eliminate rays, objects, or regions of the scene 3000 from the light field representation, or alternatively, from the alternative representation. In some embodiments, the tag can be a number, a letter, a numeral, an equation, a referencing equation, a value or equation linked to another tag for another ray, object, or region of the scene 3000 or the like.

By way of example only, and not to limit in any way the manner in which tags can be used according to the scope of the present disclosure, the tags can be applied to the rays, objects, or regions of the scene 3000 in order to indicate distance from the viewpoint or perspective, relative distance between other points or objects or regions of the scene 3000, specularity, a magnitude of radiance, specularity, variability within the neighborhood of the light ray, a light ray type (incident ray, reflected ray, refracted ray, transmitted ray, or the like), and other suitable characteristics. In other words, for a certain perspective, rays, objects, or regions of the scene 3000 can be assigned a tag (tagged) based upon a magnitude of a similar characteristic, metric, or value relative to other rays, objects, or regions of the scene 3000.

For instance, in some embodiments, the rays, objects, or regions of the scene 3000 can be tagged with an integer value between 1 and 10, the integer value inversely indicative of the variability within the neighborhood surrounding each light ray, meaning a tag=1 has a high variability and a tag=10 has a low variability. In some embodiments, for example when an acceptable tag value range of between 5 and 10 is defined, a filtering process can be carried out to eliminate rays, objects, or regions of the scene 3000 that have an undesirably high variability (e.g., having a tag value of 1, 2, 3, or 4). In such embodiments, the rays having a T<5 can be filtered out of the light field representation by automatically assigning a null ray term to each ray, object, or region of the scene 3000.

In other embodiments, the rays, objects, or regions of the scene 3000 can be tagged with an integer value between 1 and 10, the integer value indicative of the distance between the position of the ray and the perspective or viewpoint (3010a, 3010b), meaning a tag=1 is quite close to the viewpoint or perspective while a tag=10 is located quite far from the viewpoint or perspective. In some embodiments, for example when an acceptable tag value range of between 5 and 10 is defined, a filtering process can be carried out to eliminate rays, objects, or regions of the scene 3000 that are quite far from the viewpoint or perspective for the new image of the scene (e.g., having a tag value of 5, 6, 7, 8, 9, or 10). In such embodiments, the rays having a T>4 can be filtered out of the light field representation by automatically assigning a null ray term to each ray, object, or region of the scene 3000.

In some embodiments, for rays, objects, or regions of the scene 3000 that return a null ray term, a secondary renderer can then be called upon to render the ray, object, or region having null rays independent of the primary renderer that is called upon to render the rays, objects, or regions for which a null ray is not returned. Whereas the first object and second object have a tag=2 and 4, respectively, for the first perspective, 3010a, these objects have respective tag values of 3 and 7 when rendered according to the second perspective 3010b. Therefore, for embodiments in which an acceptable tag value range is defined, the second object 3020b may be rendered according to an alternative representation when rendering the scene 3000 from the first perspective 3010a and may be included in the light field representation when rendering the scene 3000 from the second perspective 3010b, or vice versa. Alternatively, the third object 3020c was assigned a tag value of 8 for the first perspective 3010a and a tag value of 3 for the second perspective 3010b, which may mean, in some embodiments, that the third object 3020c is rendered according to an alternative representation when rendering the scene 3000 from the first perspective 3010a and may be included in the light field representation when rendering the scene 3000 from the second perspective 3010b, or vice versa. Thus, according to some embodiments, new images of the scene rendered from the first perspective 3010a might include light field representation of objects 3020a and 3020b but an alternative representation of object 3020c, or vice versa, or another combination thereof, depending upon the perspective of the specific scenario.

In some embodiments, representing select objects or portions of a scene 3000 using an alternative representation approach may optimize rendering the new image of the scene 3000 in terms of bandwidth use and/or processing speed/complexity. As previously mentioned, transmission of light field data and light field representations requires a lot of bandwidth due to the highly sampled nature of light field representation in all dimensions. While a 3D mesh with local rendering doesn't take additional bandwidth when moving the viewpoint, this is not the case with a light field representation. For light field representation, each of the rays needs to be distributed and rendered each time the perspective or viewpoint changes.

In some embodiments, the selective light field approach 300 utilizes a plurality of sampling locations and accounts for null rays by calling upon a second renderer, e.g., the alternative representation renderer 360, to render the null rays according to a conventional approach.

By way of example only, only two sampling points 3010a, 3010b for only a portion of a scene 3000 are illustrated in FIG. 12, however a full scene could include many additional sampling points. In some embodiments, both sampling events illustrated in FIG. 12 may utilize selective light field instantiation and thereby eliminate the need to render a light field representation of all light rays, objects, or regions of the scene 3000, for instance, light rays, objects, or regions of the scene 3000 for which a tag value is outside a suitable or acceptable tag value range or light rays for which rendering without using light field data will not sufficiently degrade scene quality to the extent that the object should be included in the light field in order to achieve sufficient scene quality. The use of a null ray term, therefore, can enable avoidance of full scene light field instantiation and rendering, reducing computational complexity and bandwidth requirements.

According to some embodiments, these tags can be used as a selector in order to limit computational capacity or bandwidth usage during light field data selection and selective instantiation. On bandwidth limited devices, for instance, one might only request the light field data for rays that have a selector [T<3]. In the example of FIG. 12, the slices (2) and (3) show the result when selecting [T<5]. By using tags during selection of rays, the amount of light field data received for rays from a scene during instantiation can be reduced, sometimes substantially.

Note that light field instantiation can have different computational performance statistics when returning a null ray rather than returning an actual radiance from the light field. As such, determining whether the ray represents a null ray can be a lot faster, more efficient, and cheaper than actually instantiating the light field to get an actual radiance value. In some embodiments, it can be helpful to determine whether the ray represents a null ray using the tags, which can limit computational resources on an end-user device.

Automated Selective Light Field Generation

Similar to the concept above with respect to using tags such that a reduced set of rays are sampled for light field data during instantiation, the spatially local variability of the light field can be analyzed in order to assess what the impact would be when a representation is used that models the appearance less accurately for viewpoint changes (e.g., in positional translation according to x, y, z or positional rotation according to $\theta$, $\phi$. In some embodiments, light fields that are most appropriate for sampling are those that have a high degree of variability within their local neighborhood. Without wishing to be bound by any particular theory, this may be because the light field captures the variability explicitly while an alternative representation typically employs models in order to approximate this same variability. Alternatively, this may mean for some embodiments that a light field sample with low neighborhood variability can be more easily replaced by an alternative representation as it is easy to model this low variability using conventional rendering techniques and does not require the explicit sampling as is done during instantiation and rendering of the light field representation.

As described above, in some embodiments, the representation of the plenoptic function can be extended with an extra symbol: Ø. As such, the plenoptic function can then become $L_S(x, y, z, \theta, \phi)=[R|Ø]$ with R being the radiance if the ray is not a null-ray, and Ø being a constant symbol that denotes that the ray is actually a null-ray. According to some embodiments, when rendering the light field, the system can determine if the required rays are null rays. If the required rays are null rays, an alternative representation renderer can be called upon to create the radiance for this ray. If the required rays are not null rays, the original ray and associated light ray data and plenoptic function is used.

In some embodiments, a further extension of the plenoptic function added tags to the plenoptic function; for tag T, the plenoptic function can be extended to: $L_{S,T}(x, y, z, \theta, \phi, T)$. This tag can be used as a selector for the content. In some embodiments, for instance if the ray with a certain tag T is not defined, the null ray can be returned. In some embodiments, the tag can be used to segment the scene using various criteria, such as the 'usefulness' of the light field. Building upon these embodiments, additional filtering can be carried out to further simplify and expedite instantiation and improve selection of either interpolating using light field data or rendering using a conventional rendering approach.

Referring now to FIG. 13, automated selective light field generation is illustrated and described hereinbelow according to an approach 700. In some embodiments, the approach can include provision of a light field based upon light field data 730 for light rays at points through the scene. In some embodiments, the light field can be passed through a light field variability quantifier 791 that can, for each of the light field rays, assess the variability of these rays with respect to the local neighborhood. As described herein, the local neighborhood includes a number of rays that are positioned nearby the current ray in either the x, y, z, $\theta$, or $\phi$ dimensions). In some embodiments, high variability can mean that it will be more important to use the light field as high variability means that small viewpoint changes can have a large effect on the perceived rays. In some embodiments, the light field variability quantifier 791 can depend on the properties of an alternative representation. In some embodiments, when the alternative representation has different modelling properties along certain dimensions in the spatial neighborhood, for instance, the calculation can reflect this impact. In some embodiments, this can be done by modifying a kernel function that is used to calculate variability in the spatial neighborhood.

In some embodiments, for the considered neighborhood of the light field sample (for instance, when varying the x, y, z, $\theta$, or $\phi$ variables over the considered range) a kernel function can be used (e.g., by the computing device carrying out the light field data instantiation and rendering and/or conventional rending steps) as a weighting factor on the neighborhood of each of the light field samples. This function can be modelled very simply as a constant when the neighborhood should be treated equally across all dimensions and distances, however one will typically have the function decrease with an increasing distance from the 0-center. In some embodiments, the kernel function can be a Gaussian kernel. In such embodiments, each of the dimensions are treated equally. In some embodiments, the kernel function can be made anisotropic, however, by weighting each of the dimensions with a specific weight factor (e.g., by multiplying x, y, z, $\theta$, $\phi$ by a certain factor in the calculation).

In some embodiments, the approach 700 can include light field object segmentation 792 which can divide light rays into groups that belong to the same object/object parts, region of the scene, or the like. In some embodiments, this segmentation data could be created automatically (e.g., using a light field segmentation algorithm), a process which can be carried out by a computing device such as the apparatus 200. In some embodiments, such as where object orientation has been maintained as the perspective or viewpoint changes, a new image of the scene can be generated using prior light field object data 793 which can reduce or eliminate the need for light field object segmentation 792.

The variability score, e.g., as generated by the kernel function, can then be sent to a light field segmentation and segment variability score averaging step 793. The light field segmentation and segment variability score averaging step 793 can take in the variability scores along with segmentation data. In some embodiments, the light field segmentation and segment variability score averaging step 793 can be used to aggregate values for comparison, e.g., by calculating an average, a median, a maximum, a minimum, etc. In some embodiments, the light field segmentation and segment variability score averaging step 793 can be used to aggregate the variability scores of rays that are in the same segment, portion, or related to the same object, for instance. This averaged score can then already be seen as a tag T (e.g., a continuous tag T). In some embodiments, such as when a discrete tag is required, an optional discretization step 795 can be used to divide the variability range into a predefined set of tags.

A further extended plenoptic function $[L_{S,T}(x, y, z, \theta, \phi, T)]$ can then be generated, as illustrated by circle 796, such that selective light field generation using two or more renderers can be carried out as an automated process. In some embodiments, pure light field data 730, light field data from the light field segmentation and segment variability score averaging step 794, and/or discretized variability-score tagged light field data from the optional discretization step 795 can be combined to form the further extended plenoptic function $[L_{S,T}(x, y, z, \theta, \phi, T)]$. In some embodiments, automated selective light field generation can be simplified by removing the use of tags. In such embodiments, a fixed threshold will be set for the variability score such that no discretization is required, and all light field samples that have a variability score that is higher than the threshold will preserve their light field data, while the others will be set to null-rays and a second renderer will be called upon, such as described hereinabove.

In some embodiments, such approaches for automated generation of selective light field data may be carried out without the need for prior scene knowledge or knowledge of the scene materials. In other words, the regions in the light field that benefit most from light field representation can be automatically determined, for instance by a computing device, and areas that do not require light field representation can likewise be automatically tagged and null rays can be returned. As light fields are a very dense way of representing 6DOF data, certain embodiments described herein allow for creation of a selective light field that uses this dense and expensive (e.g., in terms of bandwidth, computation, etc.) way of representing volumetric data only for the regions where it is beneficial, while using a conventional approach for representing scene data for regions where light field representation is not sufficiently beneficial, making the full scene more effective to render, store, transmit, and represent.

Efficient Light Field Video Streaming

Streaming light field videos can be a challenging task in part because of the size and complexity of storing and transmitting the video stream. The nature of a light field requires high bitrates, even when moving through a static scene. As an example, a static scene with sampling points every 2 cm in a 1 $m^3$ cube (this is the space the user is allowed to move in) consists of over 1.5 TB of raw data (2048×2048 resolution per sampling point). As such, streaming light field video of large scenes would require major transformations within the network in order to bring such bitrates down to manageable rates. However, an alternative approach is to stream only a selective light field and an alternative representation for any rays characterized by a plenoptic function that returns a null ray term, as described above.

In terms of the bandwidth efficiency for transmitting light field data, the approaches described hereinabove may reduce computational complexity during instantiation and may reduce the bandwidth requirements somewhat by transmitting synthetic rendering data rather than light field rendering data, however it was found that identifying only a portion of the full scene that needs to be transmitted to an instantiator and/or a user device based upon the current and predicted near-future viewing perspective of the user can further reduce computational complexity and bandwidth requirements. While viewpoint change prediction can be carried out using one or multiple static fields of view of a user, it may be beneficial to characterize a user's dynamic field of view for such an approach. As such, described herein are approaches for characterizing one or more user's dynamic fields of view, predicting near-future viewpoint changes, a total "likely" field of view of the one or more users based on the current and predicted near-future viewpoints, and transmitting/rendering only those portions of the scene that are within the total "likely" fields of view of the one or more users. Furthermore, an approach is described in which users can be grouped based upon similarly positioned virtual viewpoints such that a single "likely" field of view can be developed for the users in said group. An approach is also described in which users can be grouped based upon viewer behavior, such as by the rate of virtual viewpoint change.

Referring now to FIG. 14, an approach 800 is illustrated for characterizing light field data 830 according to a user's virtual viewpoint within a scene and the streaming light field data only for non-null rays that are "highly likely" to be viewed by the user in the near future. In other words, if a field of view of a user comprises only 40% of the full scene, and if there is expected to be a 10% or less field of view shift per unit time, then for that unit of time light field data can be transmitted for only the 40% currently in the user's field of view and an additional 10% of the scene on either side of the user's field of view. As such, as the user's virtual viewpoint in the scene changes over time the field of view will change and the rate of virtual viewpoint change will change. In other words, over time more or less light field data and/or a greater or lesser portion of the scene will need to be transmitted to the user device to ensure that rays in the user's field of view (e.g., light rays that are close enough to the user's virtual viewpoint, not occluded by an object in the scene, or the like) can be rendered in the light field rather than according to a synthetic representation (e.g., 360-video, 3D mesh, or the like).

As such, the approach 800 can include an adaptive light field streamer 840 that is configured to stream only non-null rays for the rays that have a "highly likely" chance of being viewed by the user in the near future. In some embodiments, "highly likely" can refer to a specific statistical probability as a function of, at least, a latency period (Δ) 820, i.e., round-trip time for transmitting a signal between a server-side device 810 and a client-side device 850 (e.g., a virtual reality headset) based on any rotation (i.e., pitch, roll, yaw) and translation (i.e., lateral movement) of the client-side device 850 will take the latency period (Δ) 820 to impact the received data stream. In other words, it may take about ½ the latency period (Δ) 820 for a signal to be transmitted from the client-side device 850 that a rotational or translational movement has occurred and that the virtual viewpoint of the user in a scene has now changed, and about another ½ the latency period (Δ) 820 for an updated data stream to be transmitted back from the server-side device 810 to the client-side device 850 based on the updated virtual viewpoint of the user in the scene (for illustrative purposes ignoring the computational delays occurring at both sides). For instance, in some embodiments, the round-trip time (latency period 820) can also include the computational delay, the total motion-to-photon time (e.g., the time between moving the headset or other such user device and seeing the server-processed data resulting from this motion and/or newly rendered image of the scene based on the new viewpoint established from this motion). The latency period (Δ) 820 may additionally include a computation time and/or the like.

However, the user may make erratic or unpredictable movements, which may lead to or contribute to greater than expected changes in the virtual viewpoint of the user, which can cause the Δ time 820 to rise momentarily since the server-side device 810 may be in the process of transmitted the video stream updated for a changed virtual viewpoint of the user at the same moment that the next virtual viewpoint change is being transmitted back to the server-side device 810 from the client-side device 850. In some embodiments, the Δ time 820 does not necessarily rise because of erratic movements, or only because of erratic movements. In some embodiments, the Δ time 820 can rise due to a failure of the prediction of motion of the user device. In some embodiments, there can be different causes for the prediction to fail, such as the user motion model cannot predict an erratic movement, resulting in insufficient non-null light field rays (even with a stable Δ), such that the Δ is suddenly getting larger (e.g., by network variations) which causes the motion model to fail (as it does not look far enough into the future), and the like. In some embodiments, when the virtual viewpoint is changed too quickly, the latency period (Δ) 820 (i.e., time between when a virtual viewpoint is changed and when the video stream is updated for the current virtual viewpoint) can increase, meaning there may be some loss of the user's field of view, the video stream may be "glitchy," and/or there may be a loss of specularity or resolution in particular region of the representation of the field of view. In such cases, the use of the null ray term can help prevent glitchiness and/or reduce the loss of video stream quality since the return of the null ray term will act as a backup when light field data 830 is not available for a particular ray by signaling to the instantiator that an alternative (synthetic) rendering engine or approach should be called up.

In particular, in some embodiments, the client-side device 850 can be operable to receive, use, and/or generate selective light field data 854, such as via any of the approaches or methods described herein, and can be operable to receive, use, and/or generate backup data for the rendering of an alternative representation 852 in instances in which the null ray term is returned for a particular ray during instantiation. In some embodiments, the server-side device 810 can be operable to transmit or otherwise supply the selective light field data 854 and the backup alternative representation data 852 as video stream data to the client-side device 850.

FIG. 15 provides a more detailed diagram of the adaptive light field streamer 840. As illustrated, the adaptive light field streamer is operable to transmit one or more video streams to multiple client-side devices 850a-d. In some embodiments, the approach 800 can comprise creating one or more groups for compatible viewers 843, which includes aggregating viewers that have similar viewpoints and/or directions, and takes into account typical viewer behavior. For instance, viewers that are highly dynamic in their motion (change in viewpoint over time) might be grouped together while more static viewers are also aggregated into a separate group. In some embodiments, an error rate can be used to make sure that each viewer can have an experience quality above a threshold and to optimize the experience quality (video stream quality) for the one or more viewers in each group, rather than simply optimizing the group. In other words, a balance is struck both in group formation and in setting a minimum video stream quality for a group between a) computational complexity/bandwidth requirements and b) optimizing the video stream quality for a group without sending light field data for every light ray in the current and/or "highly light" field of view for every user.

In some embodiments, the output of the Group Compatible Viewers 843 block is a statistical aggregation of the requested virtual viewpoints for the individual users within that group. The individual user/viewer behavior can be taken into account along with each individual user/viewer's latency period (Δ) 820 in order to derive an estimate of the dynamicity of the viewpoint associated with the aggregate group of users in the near future. The near future can be any suitable time in the future, including between one latency period and a hundred latency periods, including any values and ranges therebetween. In some embodiments, user/viewer properties can also be taken into account that might reflect the preferences of the user/viewer. For instance, a user's preference related to a minimum video stream quality relative to the bandwidth expense or certain service level agreements (SLAs) in place for that particular service and/or user. For instance, a particular video streaming service may have an SLA that dictates a minimum 99% uptime and a minimum video quality (e.g., 90%+ of near-field light rays will be rendered using light field data, a minimum specularity value, a minimum resolution, etc.). In such instance, it can be helpful to group any user/viewer that is subject to a particular SLA or user preference into groups based on similarity of virtual viewpoint such that users with no or lesser video stream quality demands can be grouped separately and overall bandwidth can be lessened.

In some embodiments, once the compatible users have been grouped 843, a representation that reflects the viewpoints of a particular group can be transmitted to a group-based weight prediction block 845. In some embodiments, a function $W(x, y, z, \theta, \varphi)$ can be created at this point that represents, for a particular light ray, a representation of the likelihood that it will be needed (i.e., called up during instantiation) by the users within the particular group. In order to build this function, a sample representation can be created and interpolated in order to get a continuous result. In other words, the function $W(x, y, z, \theta, \varphi)$ can be a representation of the likelihood that $L(x, y, z, \theta, \varphi)$, the particular light ray which the function is a representation of, will be used by the grouped viewers.

In some embodiments, when the function $W(x, y, z, \theta, \varphi)$ has been constructed, it can be passed to the null ray injection block 841. The null ray injection block 841 will generate the light field with null rays $[L_s(x, y, z, \theta, \varphi)]$ from the input light field data 830 and the function $W(x, y, z, \theta, \varphi)$. For instance, an implementation of this approach may be as follows:

$$L_s(x, y, z, \theta, \varphi) = \begin{cases} W(x, y, z, \theta, \varphi) \geq T : L(x, y, z, \theta, \varphi) \\ W(x, y, z, \theta, \varphi) < T : \emptyset \end{cases}$$

with T threshold value.

In some embodiments, the threshold value T is a predetermined value, however it can also be chosen dynamically based upon certain optimization criteria. For instance, the threshold value T could be used to apply rate control in order to satisfy certain bandwidth constraints, or certain computational constraints towards the user(s).

In some embodiments, once the selective light field data $L_s(x, y, z, \theta, \varphi)$ has been constructed, the light field data can be encoded by a light field encoder 842 and sent to one or more user devices 850*a-d*. In some embodiments, an alternative representation can be generated and/or modified, if needed. In some embodiments, the light ray $L_s(x, y, z, \theta, \varphi)$ can be sent to an alternative representation generator 846 along with the function $W(x, y, z, \theta, \varphi)$ associated with that particular light ray. The alternative representation generator 846 can then generate a representation that can be used by the user device 850*a-d* to generate alternative rays when a null-ray is encountered in the encoded light field data. There is a wide array of possibilities for this alternative representation, such as described elsewhere herein. In some embodiments, when the light field is sourced from synthetic 3D data, for instance, a mesh-based alternative representation may be generated from this synthetic 3D data, the mesh-based alternative representation being a lower quality video stream that can be sent along with the encoded light field data to the client-side devices 850*a-d*. Alternatively, in some embodiments, an alternative representation can be generated directly from the light field by projecting the light field on a geometric shape (e.g., a sphere) around the viewers. In some embodiments, a lower quality light field can be used as the alternative representation.

In some embodiments, before transmitting the alternative representation data to the client-side devices 850*a-d*, the alternative representation data can be encoded by an alternative representation encoder 847. As described elsewhere herein, a client-side device (e.g., 850*a-d*) that renders a light field using $L_s(x, y, z, \theta, \varphi)$ can now replace null rays in the light field data with rays that are generated from the alternative representation. As such, the benefits of light fields can be exploited in a flexible manner by combining the light field rendering approach with traditional rendering approaches with minimal impact to video stream quality, processing complexity, and bandwidth requirements. Such an approach can allow a VR/AR or other such video stream rendering approach to be scalable without unnecessarily reducing video stream quality or significantly increasing processing complexity and bandwidth requirements.

In some embodiments, an approach for grouping compatible viewers and for group-based weight prediction can include aggregating users from the same group into a single statistical viewpoint. In some embodiments, the impact of the viewpoints on the different users can be weighted by the inverse of the error rate in order to make sure that users that have higher error rates receive a better quality video stream in the future. In other words, in a dynamic process by which ongoing error rates are tracked and compared against other users in the same group, the viewpoint is shifted for the whole group to reduce error rate for the users with the highest error rates, while making sure that the error rate for other users in the group does not experience a corresponding increase. By tracking the users in a group with the highest error rate and changing the viewpoint to reduce those user's error rate, not only is the video stream quality increased for those users, but as an ongoing process the video stream quality for the whole group of users will be increased.

By way of example only, the input to the group compatible viewers 843 block can be V1: $\{x1, y1, z1, \theta1, \varphi1, \Delta1, \varepsilon1\}$, V2: $\{x2, y2, z2, \theta2, \varphi2, \Delta2, \varepsilon2\}$, ..., VN: $\{xN, yN, zN, \theta N, \varphi N, \Delta N, \varepsilon N\}$ for viewers V1 through VN where N is the number of viewers in the group. In some embodiments, a weight function can be used to transform the error rate into a weight that is usable for a clustering process. A simple function could be $w(\varepsilon)=w_{min}+(1-w_{min})*norm(\varepsilon)$ with $norm(\varepsilon)=min(max(\varepsilon, \varepsilon_{min}), \varepsilon_{max})/(\varepsilon_{max}-\varepsilon_{min})$ where $w_{min}$, $w_{max}$, $\varepsilon_{min}$ and $\varepsilon_{max}$ are application specific constants. This function will return $w_{min}$ for $\varepsilon<=\varepsilon_{min}$; this means that viewers with a low error rate will get a lower weight than viewers with a high error rate.

In some embodiments, after the weight function has been used to transform the error rate into a weight that is usable for a clustering process, the clustering process can be carried out using these weights. The clustering process can be used to assign data into groups of similar items. For instance, a weighted clustering process can be carried out to group viewers together (e.g., according to the maximum cluster center distance). In some embodiments, an algorithm, such as a weight responsive algorithm, a weight sensitive algorithm, a weight robust algorithm, a weight considering algorithm, a partitioned clustering algorithm, k-means, single-linkage, average-linkage, k-clustering algorithm, hierarchical clustering algorithm, linkage-based algorithms, a Ward's method algorithm, or the like can be used to carry out the weighted clustering process. In some embodiments, the number of clusters can be an input or can be adaptively generated, e.g., according to a maximum cluster center distance. In some embodiments, the result of the clustering step is the cluster centers along with the input vectors belonging to each cluster.

In some embodiments, the approach can further include a statistical viewpoint determination. In some embodiments, for each of the clusters identified as part of the clustering process, a statistical viewpoint may be determined. In some embodiments, the weighted average can be calculated for the viewpoint location and orientation. In some embodiments, parameters for a statistical model can be determined that model the changes compared to this average within the group. For instance, in some embodiments this approach can determine a variance for both location and orientation, however more complex statistical models are also possible.

In some embodiments, this statistical viewpoint can then be sent to the group-based weight prediction block 845. In some embodiments, a goal of group-based weight prediction can be to create a function $W(x, y, z, \theta, \varphi)$ that represents, for a particular ray, a representation of the likelihood that the particular ray will be needed (called up) by the viewers within that viewer group. In some embodiments, the probability from the variance of both location and orientation can be used directly in such an approach, for example as:

$$W(x, y, z, \theta, \varphi) = \max_{a \in \{x,y,z,\theta,\varphi\}} \frac{1}{\sqrt{2\pi\sigma_a^2}} e^{-\frac{(a-\mu_a)^2}{2\sigma^2}}$$

with $\sigma_a$ being the standard deviation (square root of variance) and $\mu_a$ being the average for the relevant entity a (which is either x, y, z, $\theta$, or $\varphi$).

In some embodiments, such an approach can typically work well when the viewing area is relatively small. In some embodiments, there is a likelihood that multiple viewpoints can be grouped into a single statistical one based at least upon viewpoint location and orientation. With a smaller viewing area, however, changes for groupings into a single statistical viewpoint are smaller and the alternative approach described below may be more effective. Viewers looking at a similar point in the light field can thus be grouped together, even when the viewers do so from a different location or a different orientation. In other words, the grouping is more subject oriented than viewpoint oriented according to such an approach.

An alternative approach according to some embodiments can use a property of a light field that states that a ray does not change along its path as long as there are no occlusions. As such, this second implementation has an additional restriction that the viewing area cannot have occlusions (which is typically the case). Instead of clustering viewpoints based on the viewpoint location and rotation, the approach can instead cluster viewpoints based on their viewing cone (or other geometrical shape that can model the virtual camera field of view) overlap. In some embodiments, highly overlapping cones may have more chance to be aggregated as opposed to non-overlapping or sparsely overlapping cones. In some embodiments, the direction of the captures rays may be important in a case in which a light field is used. In some embodiments, determining the overlap can be done on the edge of the viewing area. For instance, in some embodiments the overlap can consist of at least two factors in this example: a percentage of overlap and an agreement on light direction. In some embodiments, these two factors will result in a distance metric between the two viewpoints.

Referring now to FIG. 16, an approach 945 is illustrated for calculating the distance metric between viewpoints $V_x$ and $V_y$. In some embodiments, the approach 945 can include projecting the incoming rays onto the edge of the viewing area (shown as the dashed line). In some embodiments, the approach 945 can include calculating the distance as follows:

$$D(V_x, V_y) = \int_{x_0}^{x_1} d(x, V_x, V_y) dx$$

$$d(x, V_x, V_y) = \max(0, \cos(P(V_x, x) - P(V_y, x)))$$

with $P(V_x, x)$ being the projection angle in radians relative to the viewing area normal (exact calculation depends on a viewing area definition).

In some embodiments, calculating this pair-wise distance between viewpoints $V_x$ and $V_y$ for each of the viewpoints results in a symmetric distance matrix M. In some embodiments, a clustering algorithm can be sued to readily work with such a distance matrix, or first convert the distance matrix to a coordinate matrix, and use more traditional clustering algorithms (e.g., k-means) from this data. In some embodiments, after this clustering operation, the resulting group data cannot be modelled in the same manner as with the first implementation because the viewpoints do not necessarily need to be near each other in the spatial or angular domain. In some embodiments, the aggregated data can simply consist of forwarding the contributing viewpoints (e.g., $V_x$, $V_y$, . . . , $V_n$) for use later in the process. Alternatively, in some embodiments, a statistical representation can be made of the intersecting rays through the viewing area, illustrated as the partial dashed circle in FIG. 16.

In some embodiments, implementing the group-based weight prediction 845 can be modified for instances in which the rays can be traced throughout the viewing area since there are no occlusions within the viewing area. In some embodiments, each of the functions $W(x, y, z, \theta, \varphi)$ associated with each of the individual viewpoints in the group can be cast to determine whether it is required by that viewpoint. In some embodiments, an approach according to this implementation may result in more non-null rays because the light rays that are traced forward along each of the groups viewpoints are marked as non-null (in the direction of the particular viewpoint), such that the inherent redundancy in this representation can be exploited using an effective light field encoder since there is effectively only one ray to be encoded in the complete path, and thus can result in a significant reduction in data size of that particular ray.

An apparatus and method are described herein that enables streaming of light field data in a flexible manner by combining light fields with less computationally demanding and smaller bandwidth representations. Such apparatuses and methods can allow for scalability of various properties: bandwidth requirements, processing complexity, and/or video stream quality. Such apparatuses and methods may exhibit a relatively fine granularity for performing the scalability operation and uses the concept of null ray term described hereinabove that is use for other applications.

An apparatus of an example embodiment can be configured for selectively transmitting light field data for rendering of a new image of a scene. In some embodiments, the apparatus can comprise at least one processor and at least one memory including computer program instructions. In some embodiments, the at least one memory and the computer program instructions, with the at least one processor, can be configured to cause the apparatus at least to provide information related to a plurality of light rays, the plurality of light rays defined by a plenoptic function comprising positional terms (x, y, z) and directional terms ($\theta$, $\varphi$), the plenoptic function for a first portion of the plurality of light rays being extended to include a null ray term (Ø), the null ray term (Ø) indicating that a corresponding light ray should be rendered using a synthetic renderer rather than a light field renderer. In some embodiments, the at least one memory and the computer program instructions, with the at least one processor, can be configured to cause the apparatus at least to determine a virtual viewpoint within the scene for each user from among a plurality of users, a corresponding region of the scene being viewed by each user from among the plurality of users, a second portion of the plurality of light rays that are viewable by each user from among the plurality of users within the corresponding region of the scene, and a third portion of the plurality of light rays that are outside of the corresponding region of the scene. In some embodiments, the at least one memory and the computer program instructions, with the at least one processor, can be configured to cause the apparatus at least to determine a latency period for sending and receiving communications between the apparatus and a user device. In some embodiments, the at least one memory and the computer program instructions, with the at least one processor, can be configured to cause the apparatus at least to determine, based upon at least the virtual viewpoint of the user within the scene, the corresponding region of the scene being viewed by the user, and the latency period for sending and receiving communications between the apparatus and the user device, one or more light rays that from both the first portion and the third portion of the plurality of light rays that are likely to be viewable by the user within the corresponding region within a predetermined time. In some embodiments, the at least one memory and the computer program instructions, with the at least one processor, can be configured to cause the apparatus at least to provide the one or more light rays as light field data to an output of said apparatus. In some embodiments, the at least one memory and the computer program instructions, with the at least one processor, can be configured to cause the apparatus at least to group the plurality of users into one or more user groups based upon at least one of a user behavior and the virtual viewpoint. In some embodiments, the user behavior is a rate of change of the virtual viewpoint, wherein grouping the plurality of users comprises grouping the plurality of users into a first group of users having a rate of change of the virtual viewpoint below a predetermined threshold and a second group of users having a rate of change of the virtual viewpoint above the predetermined threshold. In some embodiments, grouping the plurality of users can comprise grouping the plurality of users into a first group of users having the virtual viewpoint within a predetermined distance of a first location and a second group of users having the virtual viewpoint within a predetermined distance of a second location. In some embodiments, the at least one memory and the computer program instructions, with the at least one processor, can be further configured to cause the apparatus at least to determine an error rate for each virtual viewpoint within a particular group of the one or more groups of users and apply a weight function to transform the error rate into a weight value associated with each virtual viewpoint in the particular group of users. In some embodiments, the at least one memory and the computer program instructions, with the at least one processor, can be configured to cause the apparatus at least to group the users from the particular group of users in one or more clusters based upon a maximum distance between the virtual viewpoints of the users and output cluster centers associated with the one or more clusters. In some embodiments, the at least one memory and the computer program instructions, with the at least one processor, can be configured to cause the apparatus at least to determine one or more parameters for a viewpoint location and a viewpoint orientation of the virtual viewpoints of the users. In some embodiments, the at least one memory and the computer program instructions, with the at least one processor, can be configured to cause the apparatus at least to calculate a weighted average of the one or more parameters for the viewpoint location and the viewpoint orientation of the virtual viewpoints of the users. In some embodiments, the at least one memory and the computer program instructions, with the at least one processor, can be configured to cause the apparatus at least to model changes in the one or more parameters for each virtual viewpoint relative to the weighted average of the one or more parameters. In some embodiments, the at least one memory and the computer program instructions, with the at least one processor, can be configured to cause the apparatus at least to determine, based upon at least the changes in the one or more parameters for each virtual viewpoint relative to the weighted average of the one or more parameters, the one or more light rays that from both the first portion and the third portion of the plurality of light rays that are likely to be viewable by the user within the corresponding region within the predetermined time. In some embodiments, the at least one memory and the computer program instructions, with the at least one processor, can be configured to cause the apparatus at least to extend the plenoptic function for the plurality of light rays to include a tag term (T), the tag term (T) indicative of a light field characteristic of the plurality of light rays.

A method for selectively transmitting light field data for rendering of a new image of a scene can comprise providing information related to a plurality of light rays, the plurality of light rays defined by a plenoptic function comprising positional terms (x, y, z) and directional terms (θ, φ), the plenoptic function for a first portion of the plurality of light rays being extended to include a null ray term (Ø), the null ray term (Ø) indicating that a corresponding light ray should be rendered using a synthetic renderer rather than a light field renderer. In some embodiments, the method can further comprise determining a virtual viewpoint within the scene for each user from among a plurality of users, a corresponding region of the scene being viewed by each user from among the plurality of users, a second portion of the plurality of light rays that are viewable by each user from among the plurality of users within the corresponding region of the scene, and a third portion of the plurality of light rays that are outside of the corresponding region of the scene. In some embodiments, the method can further comprise determining a latency period for sending and receiving communications between the apparatus and a user device. In some embodiments, the method can further comprise determining, based upon at least the virtual viewpoint of the user within the scene, the corresponding region of the scene being viewed by the user, and the latency period for sending and receiving communications between the apparatus and the user device, one or more light rays that from both the first portion and the third portion of the plurality of light rays that are likely to be viewable by the user within the corresponding region within a predetermined time. In some embodiments, the method can further comprise providing the one or more light rays as light field data to an output of said apparatus. In some embodiments, the method can further comprise grouping the plurality of users into one or more user groups based upon at least one of a user behavior and the virtual viewpoint. In some embodiments, the user behavior can be a rate of change of the virtual viewpoint, wherein grouping the plurality of users comprises grouping the plurality of users into a first group of users having a rate of change of the virtual viewpoint below a predetermined threshold and a second group of users having a rate of change of the virtual viewpoint above the predetermined threshold. In some embodiments, grouping the plurality of users comprises grouping the plurality of users into a first group of users having the virtual viewpoint within a predetermined distance of a first location and a second group of users having the virtual viewpoint within a predetermined distance of a second location. In some embodiments, the method can further comprise determining an error rate for each virtual viewpoint within a particular group of the one or more groups of users and applying a weight function to transform the error rate into a weight value associated with each virtual viewpoint in the particular group of users. In some embodiments, the method can further comprise grouping the users from the particular group of users in one or more clusters based upon a maximum distance between the virtual viewpoints of the users and outputting cluster centers associated with the one or more clusters. In some embodiments, the method can further comprise determining one or more parameters for a viewpoint location and a viewpoint orientation of the virtual viewpoints of the users. In some embodiments, the method can further comprise calculating a weighted average of the one or more parameters for the viewpoint location and the viewpoint orientation of the virtual viewpoints of the users. In some embodiments, the method can further comprise modeling changes in the one or more parameters for each virtual viewpoint relative to the weighted average of the one or more parameters. In some embodiments the method can further comprise determining, based upon at least the changes in the one or more parameters for each virtual viewpoint relative to the weighted average of the one or more parameters, the one or more light rays that from both the first portion and the third portion of the plurality of light rays that are likely to be viewable by the user within the corresponding region within the predetermined time. In some embodiments, the method can further comprise extending the plenoptic function for the plurality of light rays to include a tag term (T), the tag term (T) indicative of a light field characteristic of the plurality of light rays.

An apparatus of an example embodiment can be configured for selectively transmitting light field data for rendering of a new image of a scene. In some embodiments, the apparatus can comprise means, such as at least one processor and at least one memory including computer program instructions, for providing information related to a plurality of light rays, the plurality of light rays defined by a plenoptic function comprising positional terms (x, y, z) and directional terms (θ, φ), the plenoptic function for a first portion of the plurality of light rays being extended to include a null ray term (Ø), the null ray term (Ø) indicating that a corresponding light ray should be rendered using a synthetic renderer rather than a light field renderer. In some embodiments, the apparatus can comprise means for determining a virtual viewpoint within the scene for each user from among a plurality of users, a corresponding region of the scene being viewed by each user from among the plurality of users, a second portion of the plurality of light rays that are viewable by each user from among the plurality of users within the corresponding region of the scene, and a third portion of the plurality of light rays that are outside of the corresponding region of the scene. In some embodiments, the apparatus can comprise means for determining a latency period for sending and receiving communications between the apparatus and a user device. In some embodiments, the method can further comprise determining, based upon at least the virtual viewpoint of the user within the scene, the corresponding region of the scene being viewed by the user, and the latency period for sending and receiving communications between the apparatus and the user device, one or more light rays that from both the first portion and the third portion of the plurality of light rays that are likely to be viewable by the user within the corresponding region within a predetermined time. In some embodiments, the apparatus can comprise means for providing the one or more light rays as light field data to an output of said apparatus. In some embodiments, the method can further comprise grouping the plurality of users into one or more user groups based upon at least one of a user behavior and the virtual viewpoint. In some embodiments, the user behavior can be a rate of change of the virtual viewpoint, wherein grouping the plurality of users comprises grouping the plurality of users into a first group of users having a rate of change of the virtual viewpoint below a predetermined threshold and a second group of users having a rate of change of the virtual viewpoint above the predetermined threshold. In some embodiments, grouping the plurality of users comprises grouping the plurality of users into a first group of users having the virtual viewpoint within a predetermined distance of a first location and a second group of users having the virtual viewpoint within a predetermined distance of a second location. In some embodiments, the method can further comprise determining an error rate for each virtual viewpoint within a particular group of the one or more groups of users and applying a weight function to transform the error rate into a weight value associated with each virtual viewpoint in the particular group of users. In some embodiments, the apparatus can comprise means for grouping the users from the particular group of users in one or more clusters based upon a maximum distance between the virtual viewpoints of the users and outputting cluster centers associated with the one or more clusters. In some embodiments, the apparatus can comprise means for determining one or more parameters for a viewpoint location and a viewpoint orientation of the virtual viewpoints of the users. In some embodiments, the apparatus can comprise means for calculating a weighted average of the one or more parameters for the viewpoint location and the viewpoint orientation of the virtual viewpoints of the users. In some embodiments, the apparatus can comprise means for modeling changes in the one or more parameters for each virtual viewpoint relative to the weighted average of the one or more parameters. In some embodiments, the apparatus can comprise means for determining, based upon at least the changes in the one or more parameters for each virtual viewpoint relative to the weighted average of the one or more parameters, the one or more light rays that from both the first portion and the third portion of the plurality of light rays that are likely to be viewable by the user within the corresponding region within the predetermined time. In some embodiments, the apparatus can comprise means for extending the plenoptic function for the plurality of light rays to include a tag term (T), the tag term (T) indicative of a light field characteristic of the plurality of light rays.

A computer program product of an example embodiment for selectively transmitting light field data for rendering of a new image of a scene can comprise instructions stored thereon for at least providing information related to a plurality of light rays, the plurality of light rays defined by a plenoptic function comprising positional terms (x, y, z) and directional terms (θ, φ), the plenoptic function for a first portion of the plurality of light rays being extended to include a null ray term (Ø), the null ray term (Ø) indicating that a corresponding light ray should be rendered using a synthetic renderer rather than a light field renderer. The computer program product can be further configured for at least determining a virtual viewpoint within the scene for each user from among a plurality of users, a corresponding region of the scene being viewed by each user from among the plurality of users, a second portion of the plurality of light rays that are viewable by each user from among the plurality of users within the corresponding region of the scene, and a third portion of the plurality of light rays that are outside of the corresponding region of the scene. The computer program product can be further configured for at least determining a latency period for sending and receiving communications between the apparatus and a user device. The computer program product can be further configured for at least determining, based upon at least the virtual viewpoint of the user within the scene, the corresponding region of the scene being viewed by the user, and the latency period for sending and receiving communications between the apparatus and the user device, one or more light rays that from both the first portion and the third portion of the plurality of light rays that are likely to be viewable by the user within the corresponding region within a predetermined time. The computer program product can be further configured for at least grouping the plurality of users into one or more user groups based upon at least one of a user behavior and the virtual viewpoint. In some embodiments, the user behavior can be a rate of change of the virtual viewpoint, wherein grouping the plurality of users comprises grouping the plurality of users into a first group of users having a rate of change of the virtual viewpoint below a predetermined threshold and a second group of users having a rate of change of the virtual viewpoint above the predetermined threshold. In some embodiments, grouping the plurality of users comprises grouping the plurality of users into a first group of users having the virtual viewpoint within a predetermined distance of a first location and a second group of users having the virtual viewpoint within a predetermined distance of a second location. The computer program product can be further configured for at least determining an error rate for each virtual viewpoint within a particular group of the one or more groups of users and applying a weight function to transform the error rate into a weight value associated with each virtual viewpoint in the particular group of users. The computer program product can be further configured for at least grouping the users from the particular group of users in one or more clusters based upon a maximum distance between the virtual viewpoints of the users and outputting cluster centers associated with the one or more clusters. The computer program product can be further configured for at least determining one or more parameters for a viewpoint location and a viewpoint orientation of the virtual viewpoints of the users. The computer program product can be further configured for at least calculating a weighted average of the one or more parameters for the viewpoint location and the viewpoint orientation of the virtual viewpoints of the users. The computer program product can be further configured for at least modeling changes in the one or more parameters for each virtual viewpoint relative to the weighted average of the one or more parameters. The computer program product can be further configured for at least determining, based upon at least the changes in the one or more parameters for each virtual viewpoint relative to the weighted average of the one or more parameters, the one or more light rays that from both the first portion and the third portion of the plurality of light rays that are likely to be viewable by the user within the corresponding region within the predetermined time. The computer program product can be further configured for at least extending the plenoptic function for the plurality of light rays to include a tag term (T), the tag term (T) indicative of a light field characteristic of the plurality of light rays.

An apparatus of an example embodiment can be configured for selectively transmitting light field data for rendering of a new image of a scene. In some embodiments, the apparatus can comprise at least one processor and at least one memory including computer program instructions. In some embodiments, the at least one memory and the computer program instructions, with the at least one processor, can be configured to cause the apparatus at least to receive light field data from a light field data source, said light field data comprising a plurality of light rays, each light ray of the plurality of light rays defined by a plenoptic function comprising positional terms (x, y, z) and directional terms (θ, φ)) related to a scene. In some embodiments, the at least one memory and the computer program instructions, with the at least one processor, can be configured to cause the apparatus at least to receive round trip time information related to communication between said apparatus and said user device associated with a user. In some embodiments, the at least one memory and the computer program instructions, with the at least one processor, can be configured to cause the apparatus at least to receive from said user device field of view information related to a particular field of view of said scene. In some embodiments, the at least one memory and the computer program instructions, with the at least one processor, can be configured to cause the apparatus at least to determine, based upon at least said round trip time information and said field of view information, a part of said plurality of light rays pertaining to a region of said scene which is determined to be viewable by said user with a predetermined probability within a predetermined time. In some embodiments, the at least one memory and the computer program instructions, with the at least one processor, can be configured to cause the apparatus at least to transmit data related to said part of light rays to said user device. In some embodiments, the at least one memory and the computer program instructions, with the at least one processor, can be configured to cause the apparatus at least to transmit a null ray term for each light ray of a remaining part of said plurality of light rays not belonging to said part as a null ray together with an alternative representation of a remaining portion of said scene not pertaining to said region to said user device. In some embodiments, the at least one memory and the computer program instructions, with the at least one processor, can be are further configured to cause the apparatus at least to receive other round trip time information related to communication between said apparatus and one or more other user devices associated with one or more other users. In some embodiments, the at least one memory and the computer program instructions, with the at least one processor, can be configured to cause the apparatus at least to receive from said one or more other user devices other field of view information related to one or more other particular fields of view of said scene. In some embodiments, the at least one memory and the computer program instructions, with the at least one processor, can be configured to cause the apparatus at least to determine, based upon at least said round trip information, said field of view information, said other round trip information, and said other field of view information, the part of said plurality of light rays pertaining to said region which is determined to be viewable by said user and said one or more other users with the predetermined probability within the predetermined time. In some embodiments, the at least one memory and the computer program instructions, with the at least one processor, can be configured to cause the apparatus at least to transmit data related to said part of light rays to said user device and said one or more other user devices. In some embodiments, the at least one memory and the computer program instructions, with the at least one processor, can be configured to cause the apparatus at least to transmit data related to light rays of the remaining part of said plurality of light rays not belonging to said part as the null ray together with the alternative representation of the remaining portion of said scene not pertaining to said region to said user device and said one or more other user devices. In some embodiments, the at least one memory and the computer program instructions, with the at least one processor, can be configured to cause the apparatus at least to group said user and said one or more other users into one or more user groups based upon at least one of a user behavior and a field of view difference. In some embodiments, the user behavior can be a rate of change of the particular field of view. In some embodiments, grouping said user and said one or more other users can comprise grouping said user and said one or more other users into a first group of users having a rate of change of the particular field of view below a predetermined threshold and a second group of users having a rate of change of the particular field of view above the predetermined threshold. In some embodiments, grouping the user and the one or more other users can comprise grouping the user and the one or more other users into a first group of users having a virtual viewpoint within a predetermined distance of a first location within the scene and a second group of users having the virtual viewpoint within a predetermined distance of a second location within the scene. In some embodiments, the at least one memory and the computer program instructions, with the at least one processor, are further configured to cause the apparatus at least to determine an error rate for each particular field of view within a particular group of the one or more groups of users. In some embodiments, the at least one memory and the computer program instructions, with the at least one processor, can be configured to cause the apparatus at least to apply a weight function to transform the error rate into a weight value associated with each particular field of view in the particular group of users. In some embodiments, the at least one memory and the computer program instructions, with the at least one processor, can be configured to cause the apparatus at least to group the users from the particular group of users in one or more clusters based upon a maximum distance between the virtual viewpoints of the users. In some embodiments, the at least one memory and the computer program instructions, with the at least one processor, can be configured to cause the apparatus at least to output cluster centers associated with the one or more clusters. In some embodiments, the at least one memory and the computer program instructions, with the at least one processor, can be configured to cause the apparatus at least to determine one or more parameters for a viewpoint location and a viewpoint orientation of the virtual viewpoints of the users. In some embodiments, the at least one memory and the computer program instructions, with the at least one processor, can be configured to cause the apparatus at least to calculate a weighted average of the one or more parameters for the viewpoint location and the viewpoint orientation of the virtual viewpoints of the users. In some embodiments, the at least one memory and the computer program instructions, with the at least one processor, can be configured to cause the apparatus at least to model changes in the one or more parameters for each virtual viewpoint relative to the weighted average of the one or more parameters. In some embodiments, the at least one memory and the computer program instructions, with the at least one processor, can be configured to cause the apparatus at least to determine, based upon at least the changes in the one or more parameters for each virtual viewpoint relative to the weighted average of the one or more parameters, the one or more light rays that from both the first portion and the third portion of the plurality of light rays that are likely to be viewable by the user within the corresponding region within the predetermined time.

In some embodiments, an apparatus, such as a user device, can comprise at least one processor and at least one memory including computer program instructions, the at least one memory and the computer program instructions. In some embodiments, the at least one processor can be configured to cause the user device at least to receive light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the at least one memory and the computer program instructions, with the at least one processor, can be configured to cause the apparatus at least to analyze said light field information to determine a field of view of the scene based on an orientation and a location of a virtual viewpoint of a user within the scene. In some embodiments, the at least one memory and the computer program instructions, with the at least one processor, can be configured to cause the apparatus at least to provide data related to said field of view to said apparatus. In some embodiments, the at least one memory and the computer program instructions, with the at least one processor, can be configured to cause the apparatus at least to render a first portion of a new image of the scene based upon at least said light field data. In some embodiments, the at least one memory and the computer program instructions, with the at least one processor, can be configured to cause the apparatus at least to render a second portion of the new image of the scene based upon at least said alternative representation.

A method for selectively transmitting light field data for rendering of a new image of a scene can comprise receiving light field data from a light field data source, said light field data comprising a plurality of light rays, each light ray of the plurality of light rays defined by a plenoptic function comprising positional terms (x, y, z) and directional terms ($\theta$, $\phi$) related to a scene. In some embodiments, the method can further comprise receiving round trip time information related to communication between said apparatus and said user device associated with a user. In some embodiments, the method can further comprise receiving from said user device field of view information related to a particular field of view of said scene. In some embodiments, the method can further comprise determining, based upon at least said round trip time information and said field of view information, a part of said plurality of light rays pertaining to a region of said scene which is determined to be viewable by said user with a predetermined probability within a predetermined time. In some embodiments, the method can further comprise transmitting data related to said part of light rays to said user device. In some embodiments, the method can further comprise transmitting a null ray term for each light ray of a remaining part of said plurality of light rays not belonging to said part as a null ray together with an alternative representation of a remaining portion of said scene not pertaining to said region. In some embodiments, the method can further comprise receiving other round trip time information related to communication between said apparatus and one or more other user devices associated with one or more other users. In some embodiments, the method can further comprise receiving from said one or more other user devices other field of view information related to one or more other particular fields of view of said scene. In some embodiments, the method can further comprise determining, based upon at least said round trip information, said field of view information, said other round trip information, and said other field of view information, the part of said plurality of light rays pertaining to said region which is determined to be viewable by said user and said one or more other users with the predetermined probability within the predetermined time. In some embodiments, the method can further comprise grouping said user and said one or more other users into one or more user groups based upon at least one of a user behavior and a field of view difference.

In some embodiments, the method can further comprise determining an error rate for each particular field of view within a particular group of the one or more groups of users. In some embodiments, the method can further comprise applying a weight function to transform the error rate into a weight value associated with each particular field of view in the particular group of users.

A method for rendering a new image of a scene based on selective light field data and an alternative representation can be carried out. In some embodiments, the method can comprise receiving light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the method can further comprise analyzing said light field information to determine a field of view of the scene based on an orientation and a location of a virtual viewpoint of a user within the scene. In some embodiments, the method can further comprise providing data related to said field of view to said apparatus. In some embodiments, the method can further comprise rendering a first portion of a new image of the scene based upon at least said light field data. In some embodiments, the method can further comprise rendering a second portion of the new image of the scene based upon at least said alternative representation.

An apparatus of an example embodiment can be configured for selectively transmitting light field data for rendering of a new image of a scene. In some embodiments, the apparatus can comprise means, such as at least one processor and at least one memory including computer program instructions, for receiving light field data from a light field data source, said light field data comprising a plurality of light rays, each light ray of the plurality of light rays defined by a plenoptic function comprising positional terms (x, y, z) and directional terms (θ, ϕ) related to a scene. In some embodiments, the apparatus can further comprise means for receiving round trip time information related to communication between said apparatus and said user device associated with a user. In some embodiments, the apparatus can further comprise means for receiving from said user device field of view information related to a particular field of view of said scene. In some embodiments, the apparatus can further comprise means for determining, based upon at least said round trip time information and said field of view information, a part of said plurality of light rays pertaining to a region of said scene which is determined to be viewable by said user with a predetermined probability within a predetermined time. In some embodiments, the apparatus can further comprise means for transmitting data related to said part of light rays to said user device. In some embodiments, the apparatus can further comprise means for transmitting a null ray term for each light ray of a remaining part of said plurality of light rays not belonging to said part as a null ray together with an alternative representation of a remaining portion of said scene not pertaining to said region. In some embodiments, the apparatus can further comprise means for receiving other round trip time information related to communication between said apparatus and one or more other user devices associated with one or more other users. In some embodiments, the apparatus can further comprise means for receiving from said one or more other user devices other field of view information related to one or more other particular fields of view of said scene. In some embodiments, the apparatus can further comprise means for determining, based upon at least said round trip time information, said field of view information, said other round trip information, and said other field of view information, the part of said plurality of light rays pertaining to said region which is determined to be viewable by said user and said one or more other users with the predetermined probability within the predetermined time. In some embodiments, the apparatus can further comprise means for grouping said user and said one or more other users into one or more user groups based upon at least one of a user behavior and a field of view difference. In some embodiments, the apparatus can further comprise means for determining an error rate for each particular field of view within a particular group of the one or more groups of users. In some embodiments, the apparatus can further comprise means for applying a weight function to transform the error rate into a weight value associated with each particular field of view in the particular group of users.

An apparatus of an example embodiment can be configured for selectively transmitting light field data for rendering of a new image of a scene. In some embodiments, the apparatus can comprise means, such as at least one processor and at least one memory including computer program instructions, for receiving light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the apparatus can further comprise means for analyzing said light field information to determine a field of view of the scene based on an orientation and a location of a virtual viewpoint of a user within the scene. In some embodiments, the apparatus can further comprise means for providing data related to said field of view to said apparatus. In some embodiments, the apparatus can further comprise means for rendering a first portion of a new image of the scene based upon at least said light field data. In some embodiments, the apparatus can further comprise means for rendering a second portion of the new image of the scene based upon at least said alternative representation.

A computer program product of an example embodiment for selectively transmitting light field data for rendering of a new image of a scene can comprise instructions stored thereon for at least receiving light field data from a light field data source, said light field data comprising a plurality of light rays, each light ray of the plurality of light rays defined by a plenoptic function comprising positional terms (x, y, z) and directional terms (θ, ϕ) related to a scene. In some embodiments, the computer program product can further comprise instructions for receiving round trip time information related to communication between said apparatus and said user device associated with a user. In some embodiments, the computer program product can further comprise instructions for receiving from said user device field of view information related to a particular field of view of said scene. In some embodiments, the computer program product can further comprise instructions for determining, based upon at least said round trip time information and said field of view information, a part of said plurality of light rays pertaining to a region of said scene which is determined to be viewable by said user with a predetermined probability within a predetermined time. In some embodiments, the computer program product can further comprise instructions for transmitting data related to said part of light rays to said user device. In some embodiments, the computer program product can further comprise instructions for transmitting a null ray term for each light ray of a remaining part of said plurality of light rays not belonging to said part as a null ray together with an alternative representation of a remaining portion of said scene not pertaining to said region.

A computer program product of an example embodiment for selectively transmitting light field data for rendering of a new image of a scene can comprise instructions stored thereon for at least receiving light field information related to a scene from an apparatus, said light field information comprising light field data for light rays that are viewable by a user within a predetermined probability within a predetermined time, a null ray for other light rays that are not viewable by the user within the predetermined probability within the predetermined time, and an alternative representation of the other light rays that are not viewable by the user within the predetermined probability within the predetermined time. In some embodiments, the computer program product can further comprise instructions for analyzing said light field information to determine a field of view of the scene based on an orientation and a location of a virtual viewpoint of a user within the scene. In some embodiments, the computer program product can further comprise instructions for providing data related to said field of view to said apparatus.

Any element of any embodiment described herein can be incorporated into any other embodiment or modified in such a way as to use the null ray term (Ø) to signal that light field data associated with a ray should be omitted from transmission to the client-side device and/or the instantiator should call up an alternative rendering engine (e.g., the synthetic rendering engine) to render an alternative representation of those light rays for a particular user for a particular viewpoint.

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

As used herein, the term "about" and "approximately" generally mean plus or minus 10% of the value stated, for example about 250 µm would include 225 µm to 275 µm, approximately 1,000 µm would include 900 µm to 1,100 µm.

Conventional terms in the fields of computer science and software engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. An apparatus for selectively transmitting light field data to a user device, the apparatus comprising at least one processor and at least one memory including computer program instructions, the at least one memory and the computer program instructions, with the at least one processor, configured to cause the apparatus at least to:
   receive light field data from a light field data source, said light field data comprising a plurality of light rays, each light ray of the plurality of light rays defined by a plenoptic function comprising positional terms (x, y, z) and directional terms ($\theta$, $\phi$) related to a scene;
   receive round trip time information related to communication between said apparatus and said user device associated with a user;
   receive from said user device field of view information related to a particular field of view of said scene;
   determine, based upon at least said round trip time information and said field of view information, a part of said plurality of light rays that has a probability of being requested for rendering within a predetermined time that satisfies a predetermined probability threshold;
   transmit, to said user device, data related to said part of said plurality of light rays; and
   transmit, to said user device, a null ray term for each light ray of a remaining part of said plurality of light rays not belonging to said part as a null ray together with an alternative representation of a corresponding portion of said scene.

2. The apparatus of claim 1, wherein the at least one memory and the computer program instructions, with the at least one processor, are further configured to cause the apparatus at least to:
   receive other round trip time information related to communication between said apparatus and one or more other user devices associated with one or more other users;
   receive from said one or more other user devices other field of view information related to one or more other particular fields of view of said scene; and
   determine, based upon at least said round trip information, said field of view information, said other round trip information, and said other field of view information, the part of said plurality of light rays that has a probability of being requested for rendering within the predetermined time that satisfies a predetermined probability threshold.

3. The apparatus of claim 2, wherein the at least one memory and the computer program instructions, with the at least one processor, are further configured to cause the apparatus at least to:
   transmit data related to said part of light rays to said user device and said one or more other user devices; and
   transmit, to said user device and said one or more other user devices, data related to light rays of the remaining part of said plurality of light rays not belonging to said part as the null ray together with the alternative representation of the corresponding portion of said scene.

4. The apparatus of claim 2, wherein the at least one memory and the computer program instructions, with the at least one processor, are further configured to cause the apparatus at least to:
   group said user and said one or more other users into one or more user groups based upon at least one of a user behavior and a field of view difference.

5. The apparatus of claim 4, wherein the user behavior is a rate of change of the particular field of view, wherein grouping said user and said one or more other users comprises grouping said user and said one or more other users into a first group of users having a rate of change of the particular field of view below a predetermined threshold and a second group of users having a rate of change of the particular field of view above the predetermined threshold.

6. The apparatus of claim 4, wherein grouping the user and the one or more other users comprises grouping the user and the one or more other users into a first group of users having a virtual viewpoint within a predetermined distance of a first location within the scene and a second group of users having the virtual viewpoint within a predetermined distance of a second location within the scene.

7. The apparatus of claim 4, wherein the at least one memory and the computer program instructions, with the at least one processor, are further configured to cause the apparatus at least to:
   determine an error rate for each particular field of view within a particular group of the one or more groups of users; and
   apply a weight function to transform the error rate into a weight value associated with each particular field of view in the particular group of users.

8. The apparatus of claim 7, wherein the at least one memory and the computer program instructions, with the at least one processor, are further configured to cause the apparatus at least to:
   group the users from the particular group of users in one or more clusters based upon a maximum distance between the virtual viewpoints of the users; and
   output cluster centers associated with the one or more clusters.

9. The apparatus of claim 8, wherein the at least one memory and the computer program instructions, with the at least one processor, are further configured to cause the apparatus at least to:
  determine one or more parameters for a viewpoint location and a viewpoint orientation of the virtual viewpoints of the users;
  calculate a weighted average of the one or more parameters for the viewpoint location and the viewpoint orientation of the virtual viewpoints of the users; and
  model changes in the one or more parameters for each virtual viewpoint relative to the weighted average of the one or more parameters.

10. The apparatus of claim 9, wherein the at least one memory and the computer program instructions, with the at least one processor, are further configured to cause the apparatus at least to:
  determine, based upon at least the changes in the one or more parameters for each virtual viewpoint relative to the weighted average of the one or more parameters, the one or more light rays from both the first portion and the third portion of the plurality of light rays that have said probability of being requested for rendering within the predetermined time that satisfies said predetermined probability threshold.

11. A user device comprising at least one processor and at least one memory including computer program instructions, the at least one memory and the computer program instructions, with the at least one processor, configured to cause the user device at least to:
  receive light field information related to a scene from an apparatus, said light field information comprising light field data for light rays that have a probability of being requested for rendering within a predetermined time that satisfies a predetermined probability threshold, a null ray for other light rays that have a probability that does not satisfy said predetermined probability threshold, and an alternative representation of a portion of said scene corresponding to said other light rays have a probability that does not satisfy said predetermined probability threshold;
  analyze said light field information to determine a field of view of the scene based on an orientation and a location of a virtual viewpoint of a user within the scene; and
  provide data related to said field of view to said apparatus.

12. The user device of claim 11, wherein the at least one memory and the computer program instructions, with the at least one processor, are further configured to cause the user device at least to:
  render a first portion of a new image of the scene based upon at least said light field data; and
  render a second portion of the new image of the scene based upon at least said alternative representation.

13. A method for selectively transmitting light field data to a user device, the method comprising:
  receiving light field data from a light field data source, said light field data comprising a plurality of light rays, each light ray of the plurality of light rays defined by a plenoptic function comprising positional terms (x, y, z) and directional terms ($\theta$, $\phi$) related to a scene;
  receiving round trip time information related to communication between said apparatus and said user device associated with a user;
  receiving from said user device field of view information related to a particular field of view of said scene;
  determining, based upon at least said round trip time information and said field of view information, a part of said plurality of light rays that has a probability of being requested for rendering within a predetermined time that satisfies a predetermined probability threshold;
  transmitting, to said user device, data related to said part of said plurality of light rays; and
  transmitting, to said user device, a null ray term for each light ray of a remaining part of said plurality of light rays not belonging to said part as a null ray together with an alternative representation of a corresponding portion of said scene.

14. The method of claim 13, further comprising:
  receiving other round trip time information related to communication between said apparatus and one or more other user devices associated with one or more other users;
  receiving from said one or more other user devices other field of view information related to one or more other particular fields of view of said scene; and
  determining, based upon at least said round trip information, said field of view information, said other round trip information, and said other field of view information, the part of said plurality of light rays that has a probability of being requested for rendering within the predetermined time that satisfies a predetermined probability threshold.

15. The method of claim 13, further comprising:
  grouping said user and said one or more other users into one or more user groups based upon at least one of a user behavior and a field of view difference.

16. The method of claim 15, further comprising:
  determining an error rate for each particular field of view within a particular group of the one or more groups of users; and
  applying a weight function to transform the error rate into a weight value associated with each particular field of view in the particular group of users.

17. A method comprising:
  receiving light field information related to a scene from an apparatus, said light field information comprising light field data for light rays that have a probability of being requested for rendering within a predetermined time that satisfies a predetermined probability threshold, a null ray for other light rays that have a probability that does not satisfy said predetermined probability threshold, and an alternative representation of a portion of said scene corresponding to said other light rays have a probability that does not satisfy said predetermined probability threshold;
  analyzing said light field information to determine a field of view of the scene based on an orientation and a location of a virtual viewpoint of a user within the scene; and providing data related to said field of view to said apparatus.

18. The method of claim 17, further comprising:
  rendering a first portion of a new image of the scene based upon at least said light field data; and
  rendering a second portion of the new image of the scene based upon at least said alternative representation.

19. A computer program product comprising a non-transitory storage medium having instructions stored thereon for performing at least the following:
  receiving light field data from a light field data source, said light field data comprising a plurality of light rays, each light ray of the plurality of light rays defined by a plenoptic function comprising positional terms (x, y, z) and directional terms (θ, φ) related to a scene;

receiving round trip time information related to communication between said apparatus and said user device associated with a user;

receiving from said user device field of view information related to a particular field of view of said scene;

determining, based upon at least said round trip time information and said field of view information, a part of said plurality of light rays that has a probability of being requested for rendering within a predetermined time that satisfies a predetermined probability threshold;

transmitting, to said user device, data related to said part of said plurality of light rays; and transmitting, to said user device, a null ray term for each light ray of a remaining part of said plurality of light rays not belonging to said part as a null ray together with an alternative representation of a corresponding portion of said scene.

20. A computer program product comprising a non-transitory storage medium having instructions stored thereon for performing at least the following:

receiving light field information related to a scene from an apparatus, said light field information comprising light field data for light rays that have a probability of being requested for rendering within a predetermined time that satisfies a predetermined probability threshold, a null ray for other light rays that have a probability that does not satisfy said predetermined probability threshold, and an alternative representation of a portion of said scene corresponding to said other light rays have a probability that does not satisfy said predetermined probability threshold;

analyzing said light field information to determine a field of view of the scene based on an orientation and a location of a virtual viewpoint of a user within the scene; and providing data related to said field of view to said apparatus.

* * * * *